US005454067A

United States Patent [19]
Tsai

[11] Patent Number: 5,454,067
[45] Date of Patent: * Sep. 26, 1995

[54] METHOD AND APPARATUS FOR CONVERTING A CONVENTIONAL COPIER INTO AN ELECTRONIC PRINTER

[76] Inventor: Irving Tsai, 435 E. 70th St., Apt. 16K, New York, N.Y. 10021

[ * ] Notice: The portion of the term of this patent subsequent to Feb. 25, 2009 has been disclaimed.

[21] Appl. No.: 977,288

[22] Filed: Jan. 4, 1993

Related U.S. Application Data

[62] Division of Ser. No. 918,150, Jul. 24, 1992, abandoned, which is a continuation of Ser. No. 840,808, Feb. 25, 1992, abandoned, which is a continuation-in-part of Ser. No. 437,254, Nov. 16, 1989, Pat. No. 5,091,747.

[51] Int. Cl.[6] ............................ C03G 15/04; C03G 15/00
[52] U.S. Cl. ............................................ 395/106; 355/202
[58] Field of Search ...................................... 395/117, 119, 395/101, 106; 355/202

[56] References Cited

U.S. PATENT DOCUMENTS

| | | | |
|---|---|---|---|
| 5,113,396 | 5/1992 | Kagami | 370/110 |
| 5,124,809 | 6/1992 | Koishikawa | 358/400 |
| 5,228,128 | 7/1993 | Kim | 395/275 |
| 5,235,674 | 8/1993 | Cohen-Skalli et al. | 395/101 |
| 5,255,312 | 10/1993 | Koshiishi | 379/100 |
| 5,282,054 | 1/1994 | Oahn et al. | 358/906 |

Primary Examiner—Mark R. Powell
Assistant Examiner—Steven P. Sax
Attorney, Agent, or Firm—Weil, Gotshal & Manges

[57] ABSTRACT

A "conversion" device is described that enables a conventional, dedicated copier 4 designed for the singular purpose of making copies to be employed additionally as an electronically-driven printing apparatus, thereby offering a standard issue copier 4 the added functionality of a computer printer or facsimile machine.

14 Claims, 40 Drawing Sheets

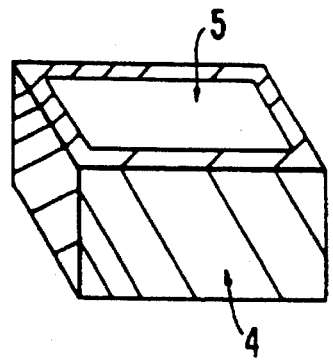
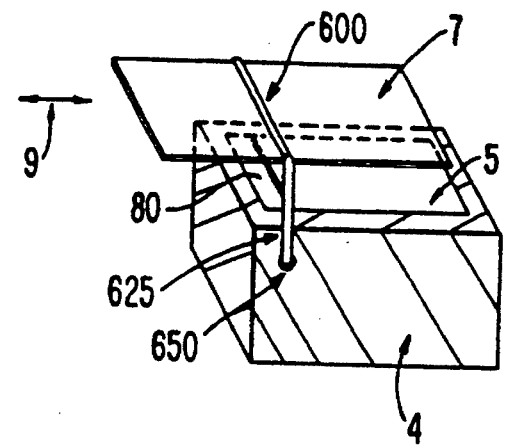
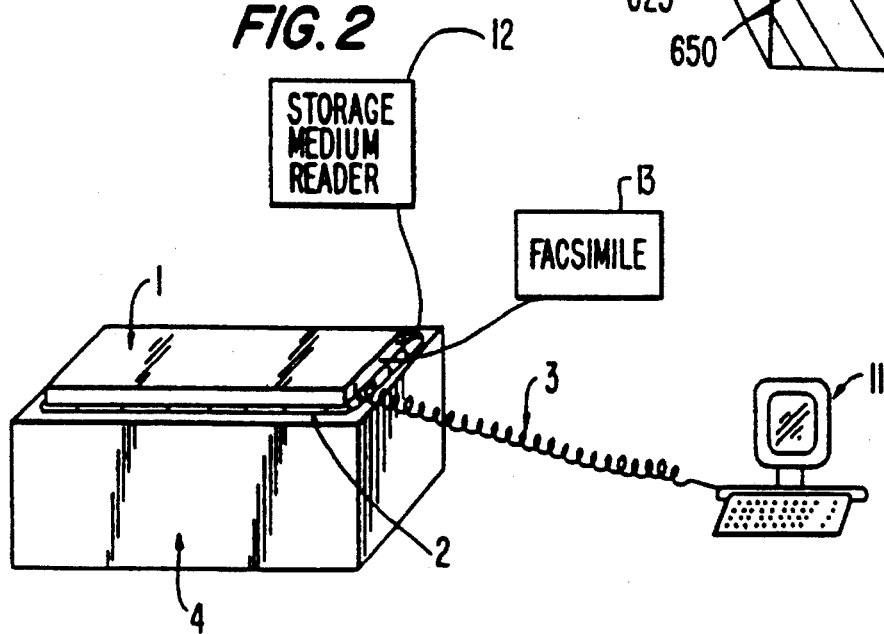
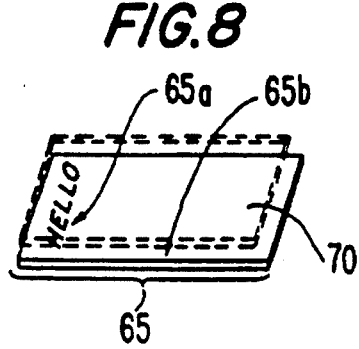

FIG. 12
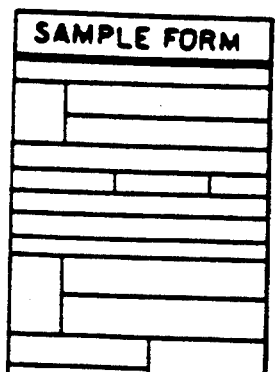
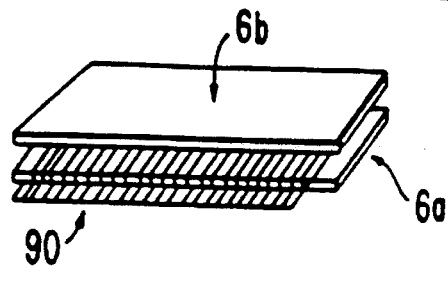
FIG. 13
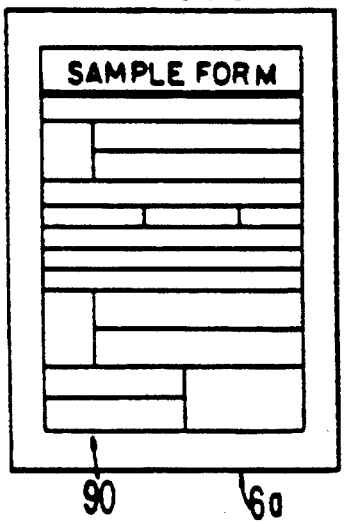
FIG. 14
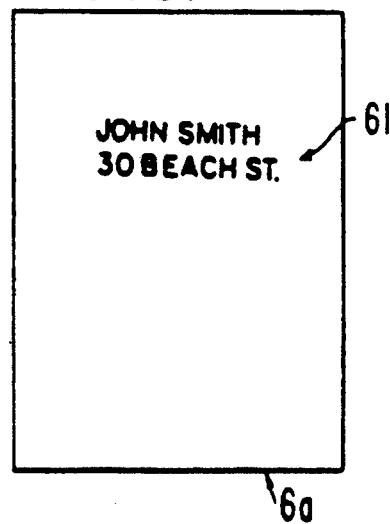
FIG. 15
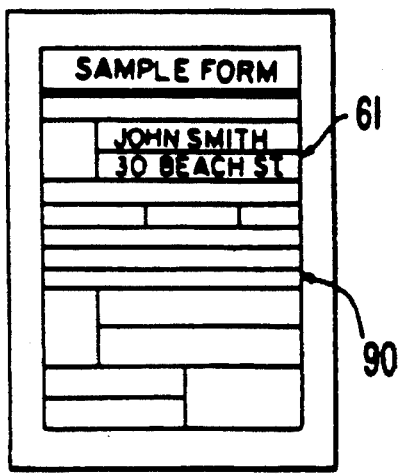
FIG. 16
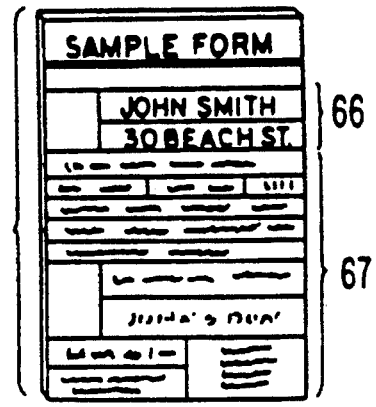

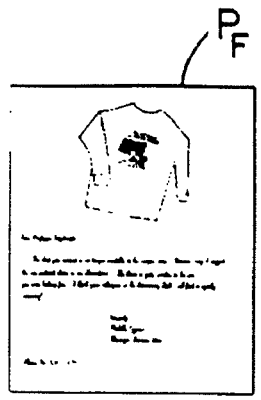
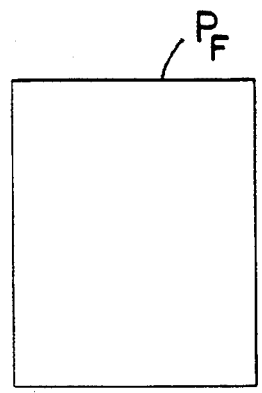
FIG.44(a)　　　　FIG.44(b)
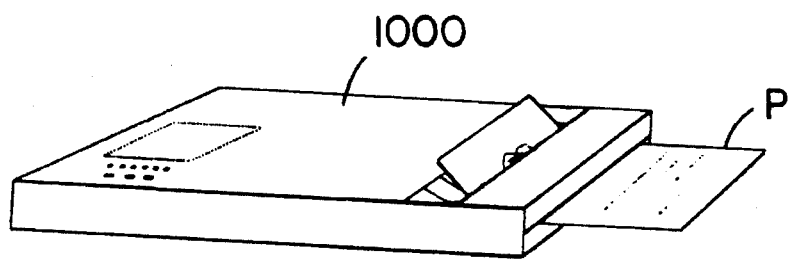
FIG.44(c)
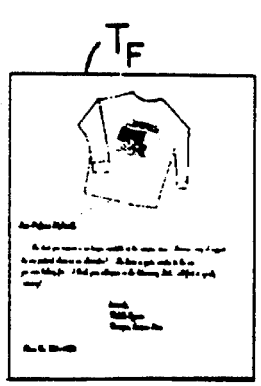
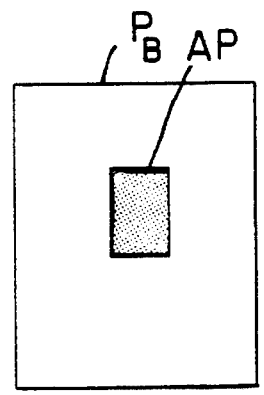
FIG.44(d)　　　　FIG.44(e)

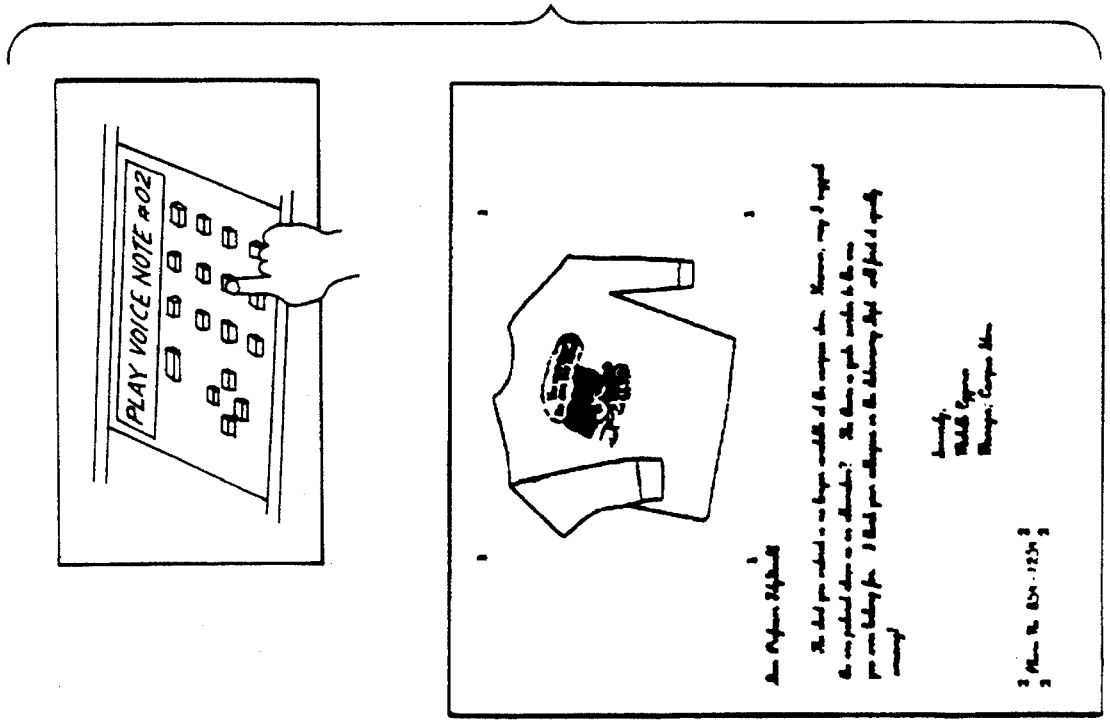
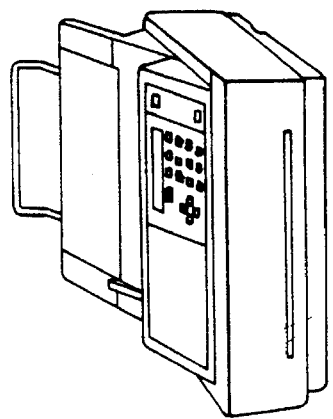
FIG. 50

METHOD AND APPARATUS FOR CONVERTING A CONVENTIONAL COPIER INTO AN ELECTRONIC PRINTER

The present application is a divisional application of U.S. application Ser. No. 07/918,150, filed on Jul. 24, 1992, and now abandoned itself a file wrapper continuation of application Ser. No. 07/840,808, filed on Feb. 25, 1992 and now abandoned, which is itself a continuation-in-part of application Ser. No. 07/437,254 filed on Nov. 16, 1989 and now U.S. Pat. No. 5,091,747.

BACKGROUND OF THE INVENTION

1. Field of the Invention

The present invention relates to a method and apparatus for enabling a conventional, dedicated copier to operate as an electronically driven printing apparatus such as a laser printer or facsimile machine.

2. Description of Related Art

It is recognized that the notion of constructing dual purpose copier/printers has been contemplated by industry. Such devices generally comprise a standard copier module and a standard electronically driven printing module, combined in an appropriate fashion so that both modules reside within a single structural enclosure.

It is also recognized that liquid crystal devices have been used as optical shutters by certain manufacturers of what have commonly come to be known as "laser printers". However, such devices are still dedicated printers.

Also known to exist are copier attachments, most commonly used with color copiers, that allow 35 mm photographic slides to be projected onto a copier for reproduction. Such accessories, however, are essentially extensions of the focusing elements of the copier and do not embrace the capabilities of the present invention. Their functional objective is to permit replication of photographic representations that are graphically accurate only to transmitted (rather than reflected) light, and only after considerable magnification has been provided.

Whereas the above-described attachment is fundamentally a slide projector (from a structural perspective), it is an object of the present invention to provide an electronic image-forming apparatus that enables a standard copier to perform as a printer which is the functional equivalent of a dedicated computer printer, facsimile printer, or other type of dedicated electronically driven printer.

SUMMARY OF THE INVENTION

In accordance with the present invention, this and other objectives are achieved by providing a conversion device that enables equipment designed for the purpose of making copies to be utilized additionally as electronically driven printers.

An embodiment of the present invention includes an image forming member capable of providing a graphical image that can be detected and reproduced by a copier, means for translating electrical signals representative of an image into a perceptible rendition on the image forming member, and means for receiving such electrical signals from a remote source such as a computer, or else means to furnish such signals by directly reading from a storage medium such as a magnetic diskette, tape, or optical disc. The electrical signals that define the image may originate from a computer, or from any kind of source or electronic apparatus capable of generating, manipulating, storing, or conveying electrical signals containing graphical information.

One advantage of an embodiment of the present invention is that it offers owners of copying equipment the option of using their existing equipment as flexible, electronic printers.

Another advantage is portability. Embodiments of the present invention are reasonably portable, and so enable quality electronic printing in settings where only a computer and copier, or only a mere copier is present. This aspect is particularly convenient to individuals whose work takes them to environments where specialized printing equipment is unavailable, or where the available equipment is incompatible with their needs. As copiers tend to be more ubiquitous, the present invention makes use of them to enable a computer printout or a facsimile printout to be obtained in the total absence of such equipment.

Yet another advantage of embodiments of the present invention is that it can be used with copying equipment designed for large volume or high speed operation, as well as with those possessing elaborate paper handling capabilities such as collation and stapling. Dedicated electronic printers generally do not possess complex document handling features.

A further advantage of embodiments of the present invention arises from its modularity of design. Modularity permits a single apparatus according to the invention to emulate an array of traditionally single purpose devices. Depending on the choice of Device Emulation Module selected, it is possible to mimic equipment such as: a facsimile machine, a "Postscript" printer, a "PCL" printer, a print spooler.

With respect to computer printer emulation, one advantage arising from the modular approach is the transfer of interpretation of the "page description language" external to the actual printing hardware. For instance, printers are sometimes described as being designed for the "Macintosh Environment" or for the "PC Environment". Because the various "Environments" are not compatible, there has been a tendency for certain brands of computers to be paired with specific classes of printers constructed expressly to accommodate them. Recently, efforts have been made via software, hardware add-on cards, and in a few instances, through hardware incorporated into printers to address this matter. These efforts, however, are still somewhat limited in the scope of their accomplishments.

The benefit derived from placing the interpreter in a module completely apart and separable from the actual printing hardware is cost efficiency and expanded flexibility. Modularity permits different interpreters to operate with the same printing hardware, and thereby enables a solitary printing engine to serve an array of different computers. In the case of the present invention, the most expensive component, the actual printing hardware, does not even figure into the cost of the apparatus of the present invention—it is conveniently furnished by the copier. The user has the power to choose which copier to employ and hence has added control over the creation of output. Finally, output may be made to appear as if it originated from any of a wide assortment of printers, depending on the choice of printer chosen to be emulated.

BRIEF DESCRIPTION OF THE DRAWINGS

A detailed description of preferred embodiments of the invention will be made with reference to the accompanying drawings, wherein like numerals designate corresponding parts in the several figures.

FIG. 1 illustrates a known copying apparatus in schematic form.

FIG. 2 depicts a preferred embodiment of the present invention mounted on top of the window of the copying apparatus illustrated in FIG. 1.

FIG. 7 illustrates an embodiment of the invention that can be used with copiers possessing moving copy-boards, which are common to many low cost "personal" copiers.

FIG. 8 illustrates an alternate embodiment to that depicted in FIG. 5 in which the image-forming element is of the emissive variety.

FIG. 12 illustrates an embodiment specially adapted for "forms handling"—that is, the computer assisted completion of forms, wherein a form (or application) is being inserted between an image forming element and a reflective back-layer.

FIG. 13 is a view of a "blank form" as seen through the image forming member.

FIG. 14 illustrates an image forming member bearing information pertinent to completion of the "blank form" generated on it.

FIG. 15 depicts the information appearing in FIG. 14 superimposed on the "blank form".

FIG. 16 shows a "completed form" that was created by the apparatus of an embodiment of the present invention.

FIGS. 43(a)–43(d) and 44(a)–44(e) illustrate an example of the creation of a hardcopy fax document including an audio message.

FIG. 50 illustrates an example of a voice capable desktop fax unit containing an image display screen that is not touch sensitive.

DESCRIPTION OF THE PREFERRED EMBODIMENT

Figure 3:
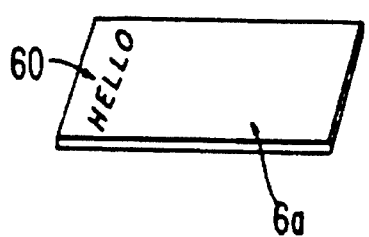
FIG. 3 illustrates a preferred embodiment of the image-forming components of the present invention.

The following detailed description is of the best presently contemplated mode of carrying out the invention. This description is not to be taken in a limiting sense, but is made merely for the purpose of illustrating the general principles of the invention. The scope of the invention is best defined by the appended claims.

The general form of the invention comprises a device capable of generating an image derived from an electrical representation of an image. The device possessing the capacity to be mounted or otherwise placed in such relationship relative to a copier that said copier can reproduce the image onto a substrate such as paper.

The electrical signals defining the image may originate from a computer, magnetic storage device, optical storage device, or from any kind of source or electronic apparatus capable of generating, manipulating, storing, or conveying electrical signals representing displayable information. The internal components and the manner of operation of these devices are well known in the art and, in the interest of simplifying the present disclosure, will not be discussed in the present disclosure.

Embodiments of the invention, in a sense, can be likened to "electronic paper" since it is usually a sheet of paper, bearing an image on it, that is placed on a copier for the purpose of being duplicated. Embodiments of the present invention, however, permit images to be easily altered or manipulated as they are of electrical origin. The function of the copier is to transform the "electronic paper" image into one on "real paper" or one on other suitable substrates.

As those skilled in the art of electronic information display are aware, there are numerous means by which an image, emanating from an electrical signal representative of that image, may be fashioned. Numerous strategies embraced by that technological family may be applicable to the reduction to practice of the present invention. Examples of potential image forming systems are: liquid crystal devices, gas plasma devices, fluorescent displays, cathode ray tubes, electrophoretic displays, and filed emission displays. The particular image forming technology used to implement the invention will influence the additional components needed to enable the image forming element to function as intended; impact the resolution, contrast, and quality of the printed output; and affect the overall configuration of the apparatus. For instance, electrophoretic displays would not require back-lighting. The aforementioned considerations are appreciable to those skilled in the art.

Depicted in FIG. 1 is a representation of a known copying apparatus, such as a copier. The known copying apparatus includes a body 4 and a copier window 5. In one embodiment, the invention is in the form of an image-forming tablet. As shown in FIG. 2, the image-forming tablet 1 may be placed on top of a conventional copier like an ordinary document, with the copier window 5, shown in FIG. 1, immediately beneath the tablet 1. An electrical cable 3 may be used to convey the signal representative of the image to the tablet 1 from a signal source 11. As described above, the signal source 11 may include a variety of devices, such as a computer, a magnetic storage device, an optical storage device, etc. A light shield 2 may serve to reduce the leakage of ambient light through the copier window 5, and may be constructed of any suitable, compliant material.

An image forming element of the liquid crystal variety is pictured in FIG. 3. The liquid crystal image forming element includes a liquid crystal image forming layer 6a, capable of forming an image 60 (in this particular example, a set of alphabetical characters assembled into the word "Hello").

Figure 4:
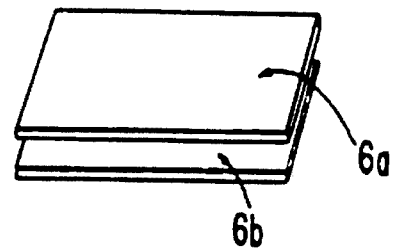
FIG. 4 illustrates a reflective layer that is disposed adjacent to or near the image-forming element of FIG. 3.

FIG. 4 illustrates a reflective back-layer 6b which may be provided adjacent to the liquid crystal image forming layer 6a. For purposes of clarity, the liquid crystal image forming layer 6a and the reflective back-layer 6b are depicted as being spatially separated by a significant distance in FIG. 4. However, in most embodiments of the invention these layers would be relatively closely disposed to each other.

The reflective back-layer 6b may be applied directly to the back surface of the liquid crystal image forming layer 6a in the form of a coating. A primary function of the reflective back-layer 6b is to provide an albedo in the non-imaged areas of the liquid crystal layer 6a that is optically distinct from the imaged areas of the liquid crystal layer. Non-imaged areas of the liquid crystal layer 6a are substantially optically transparent to radiation of wavelengths within the domain of concern. It is also possible to substitute for the reflective back-layer 6b an active, light emitting source, such as an electroluminescent panel. Back-lighting, however, increases the power consumption level.

Figure 5:
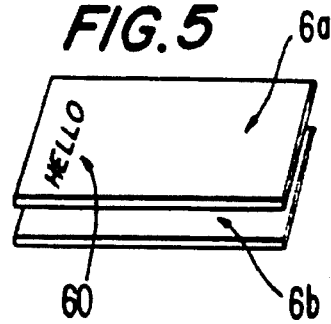
FIG. 5 illustrates the structures shown in FIG. 4 with an image present on the image-forming member (in this particular example, a set of alphabetical characters assembled into the word "Hello").

FIG. 5 depicts the elements of FIG. 4 with the inclusion of an alphabetic character string formed on the liquid crystal layer 6a.

Figure 6:
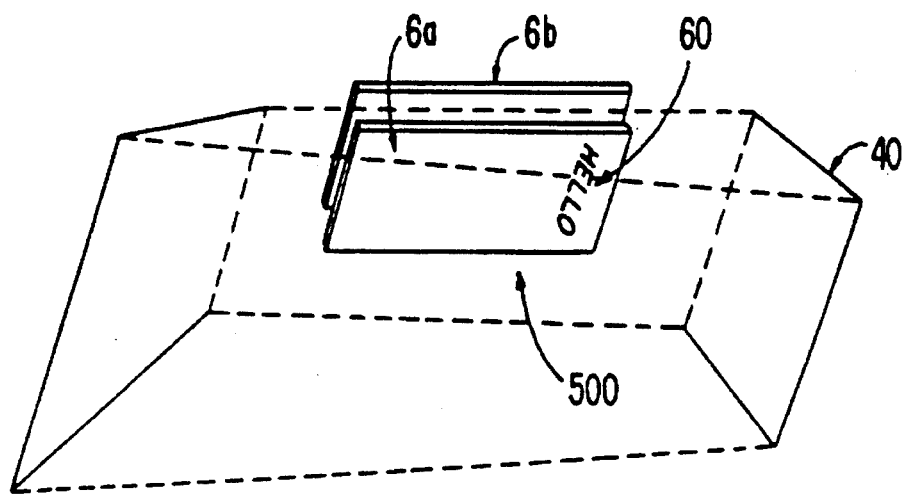
FIG. 6 is a perspective view from below the copier window of the structure in FIG. 5, when the illustrated embodiment of the present invention is mounted on the copy board of a copier.

FIG. 6 shows a schematic view from beneath the copier window 500 of an ordinary copying apparatus 40. The structures illustrated in FIG. 5 are shown positioned on top of the copier window 500, in the manner that they would be during the process of duplicating the image 60 formed by the image forming layer 6a.

The tablet shaped embodiment of the invention described above is fully capable of being used with low cost "personal" copiers possessing moving copy boards. An embodiment of the invention specially adapted for use with such copiers is illustrated in FIG. 7. As depicted in FIG. 7, the imaging element along with its supporting members is in the form of a strip 600. The strip 600 may be held in place by a structural support 625, which in turn may be mounted to the body of the copier 4 by a fastener 650. Beneath the copier window 5 can be seen that part of the copier 80 which is sensing the pattern formed by the strip 600 for reproduction onto a substrate. Interposed between the image forming element 600 and the copier window 5 is a transparent copy board 7 which is the part of the copying apparatus that undergoes translational motion, and is the member upon which any document to be copied is ordinarily placed.

FIG. 7 is intended to demonstrate one configuration of the present invention that may be used in conjunction with low cost "personal" copiers possessing moving copy boards. It will be recognized by those skilled in the art that numerous alternative configurations are possible for such use.

FIG. 8 illustrates an embodiment of the invention in which the image forming element is of the emissive variety; that is, of the type which emits radiation, e.g., light. Such an image forming element may, for example, employ a fluorescent display, a gas plasma display, etc. The image forming element 65, during the course of operation, may include one or more portions 65a that are not emitting light and one or more portions 65b that are emitting light. It is the sum of the non-light emitting areas 65b that collectively comprises the image to be printed.

In FIG. 8 the non-emitting areas 65a are seen to compose the character string "HELLO" against the background of emitting areas 65b. The photoconductor of a copier will be discharged by the light emitting portions 65b, to leave behind on the photoconductor a latent image charge pattern substantially identical to that defined by regions 65a. Also shown in FIG. 8 is an anti-reflective layer 70. The function of this anti-reflective layer is to reduce the amount of light emanating from the copier's internal light source that is back-reflected off of the surface of the image forming member of the apparatus of the present invention. In practice the anti-reflective layer is more likely to be present as a surface coating on the image forming member. An anti-reflective layer may be included in other embodiments, such as those employing liquid crystal components.

Figure 9:
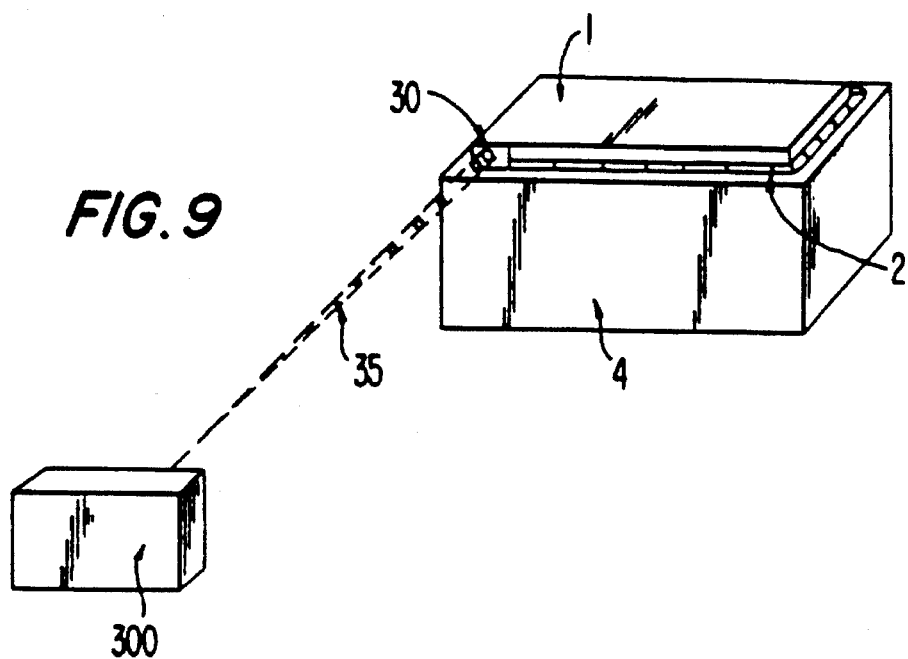
FIG. 9 illustrates an embodiment of the invention in which the signal representative of the image to be printed is transmitted to the image-forming member by an "intangible mechanism" such as an infra-red beam, rf-signal, etc. (in contrast to a cable or electrical wire).

FIG. 9 is a diagrammatic representation of an arrangement where the electrical signals defining the image to be printed are transmitted by an infrared beam, rf-carrier, or other "intangible medium" from a source 300 to the apparatus of the present invention 1. The point of reception of the information-bearing signal is shown as 30. The "intangible medium" that substitutes for the electrical cable or connector is indicated by 35. The copying apparatus is designated as 4; and the webbing which shields ambient light from leaking through the tablet/copier interface is identified as 2.

Figure 11:
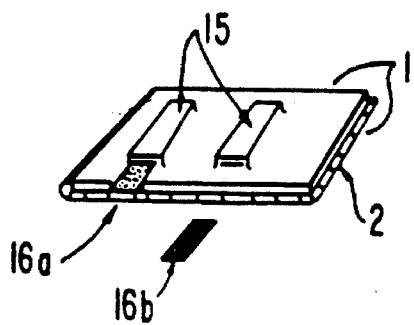
FIG. 11 illustrates an installation of two different and optional Device Emulation Modules, which impart to the apparatus additional capabilities such as facsimile machine emulation.

FIG. 11 illustrates the installation of two Device Emulation Modules into "Module Bays" 15. In FIG. 11, a first module, 16a, is designed to perform a first function, and a second module, 16b, designed to perform a second, different function. An example of a function which a module 16a or 16b may perform is that of facsimile machine emulation, as described in further detail below. Whereas two Modules are shown in FIG. 11, the apparatus of the present invention is not restricted to this number. Also, while some embodiments contain data storage devices such as disk drives, these are not represented in FIG. 11.

Some embodiments incorporate into the apparatus the means to read directly from data storage media such as magnetic diskettes, magnetic tapes, or optical discs. This facility permits text or graphical information to be directly loaded into the apparatus and obviates the need for connection to another device such as a computer. As some embodiments of the invention may be powered by batteries, certain versions, especially when coupled with the capability to read directly from data storage media are highly self-contained and portable: requiring for operation only a conventional copier and a diskette (for instance) containing material to be printed.

An embodiment specially adapted for "forms printing" includes a modification to the spacing between image forming element 6a and reflective back-layer 6b (which were discussed earlier in connection with FIGS. 4 through 6).

As illustrated in FIG. 12, a blank form 90 is inserted between members 6a and 6b, with the front of the blank form facing 6a. The actual spacing between members 6a and 6b may be changeable so as to accommodate forms of different thicknesses; and means may be provided to adjust the spacing to suit the inserted form. Additional means may be provided to alter the relative positions of layers 6a and 6b to facilitate insertion and removal of blank forms, as well as to insure their proper alignment within the tablet.

FIG. 13 demonstrates how blank form 90 would appear viewed through image forming member 6a, which is the copier's perspective during the reproduction process. FIG. 14 depicts the image forming member, 6a, with alphanumeric information, 61, generated on it. In the illustrated example, the information comprises two data fields that are pertinent to completion of blank form 90: a name, and a street address. The information may be derived from a software package such as a data base manager, a spreadsheet, or a word processor. FIG. 15 portrays the visual overlay that results when blank form 90 is situated behind image forming member 6a, and displayable information is present on member 6a.

Exhibited in FIG. 16 is the printed output of a copier that has been used in combination with the tablet of an embodiment of the present invention operating in "forms printing" mode. It can be seen that the original blank form, 90, has been duplicated and that the data discussed in connection with FIGS. 14 and 15 have been imprinted on the replica; they are indicated by 66. Other information, 67, relevant to the completion of blank form 90 has, in a similar manner, likewise been imprinted. The "filled out form" output by the copier is labelled 99.

In addition to serving as a portable conversion device that enables a conventional copier to function as an electronic printer, high speed printing matching and even exceeding the capability of dedicated electronic printers can be achieved by using the present invention in concert with high performance copying equipment. Further, other benefits provided by such equipment including large volume printing, and elaborate paper handling facilities like collation and stapling can be conveniently tapped.

Not only do embodiments of the present invention permit an ordinary copier to be utilized as a computer printer, but it also enables the conventional copier to function as a "receiving end" facsimile printer. In one embodiment a facsimile module can be plugged into the tablet to enable fax data transmitted over standard telephone lines to be intercepted, interpreted, and converted into displayable form. Once present on the image forming member, the graphical data can be reproduced by a copier. Further, it should be noted that the facsimile information can be directly viewed off of the image forming member, and thus need not be printed unless desired. In this manner the present invention provides for both "optical fax" and conventional "hardcopy fax", and permits the user to inspect a transmitted document in entirety before deciding whether all or only portions are to be printed. Variations on this theme include embodiments possessing document scanning capabilities, so that data transmission is possible, in addition to data reception. Other embodiments are equipped with storage means so that incoming data can be saved, then printed in a time-shifted fashion at another moment.

Figure 10:
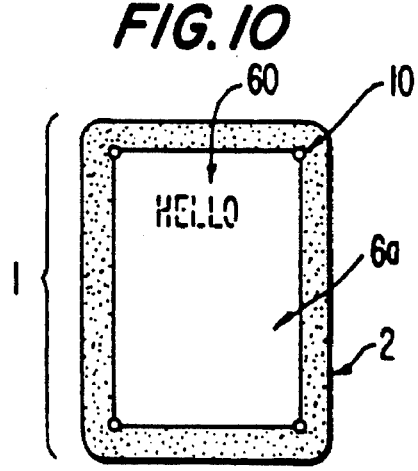
FIG. 10 illustrates one possible arrangement of photodetectors on an image forming tablet.

Embodiments of the invention may possess means to detect when a copier has completed its scan cycle; that is, when an image to be duplicated has been successfully captured by the copier. An example of a detection means is a photosensor 10 shown in FIG. 10. Shortly after the photosensor 10 detects the flash from the copier's source of illumination, the next image, or page, is formed on the image forming member. With the next image present, the succeeding copy cycle prints the next page of information. Multiple copies of each page are handled by counting the number of flashes emanating from the copier; when the count reaches the number of copies desired for that page, the next page is formed on the image forming member. The copier must be set to the total number of pages that are to be printed.

In practice it is convenient to employ four photodetectors positioned approximately at the corners of the image forming tablet. After all four photodetectors register exposure to the copier's source of illumination, "page flipping" on the image forming member takes place. "Page flipping" does not take place if all of the photodetectors do not register an exposure, since such a situation may be the result of an error condition: for example, the page on the image forming member may not have been completely scanned by the copier. As would be clear to individuals skilled in the art of circuit design, the above-described operation is easily accomplished by simple logic circuitry; which is preferably incorporated into the tablet of the present invention. The method described for controlling "page flipping" applies to copiers with scanning light sources and copiers with flash type light sources with equal facility. Manual "page flipping" is also possible, but requires the sustained presence of an operator. Furthermore, it will be recognized that other types of detection means for detecting when a copying operation is being, or has been, performed may be employed (e.g., thermal sensors, current or voltage sensors, etc.).

While the placement of an image forming element of one of the kinds described herein within an otherwise typical, dedicated copying tablet is possible, it has not been the objective here to propose device modifications. In contrast, the goal of the present invention is to make use of existing conventional, dedicated copying equipment to print images created or stored in an electronic format that heretofore has necessitated the use of an tablet such as a "computer printer".

Examples of Option Modules, which provide device emulation means, are discussed ill greater detail below in connection with FIGS. 17 through 32. The following discussion is divided into two parts. First, examples of some general features and operational characteristics of a tablet featuring option modules are presented. Second, a treatment of some of the technical considerations involved for reducing this aspect of the invention to practice is provided.

I. EXAMPLES OF SOME OPTION MODULE CHARACTERISTICS

It is recognized that different computer platforms have different strengths. Individuals skilled in the use of more than one type of machine may feel inclined to migrate from one piece of equipment to another in an effort to maximally utilize available resources. This is especially true at universities and in research settings. One of the problems encountered by people who employ a multiplicity of platforms in their work is the need to return to each of the platforms used in order to produce hardcopy. This may mean returning to a number of different and geographically segregated sites. Another problem is that the software originally used to create each portion of the whole work must still be present (or available) on each of the platforms used. When hardware is shared among many users, it is not uncommon for software to be erased by people seeking to free-up disk space. This means having to re-install applications software—a potentially time consuming process.

One of the primary objectives of the present invention is to provide hardcopy of electronic format information arising from diverse origins. Another objective is to provide hardcopy of electronic format information arising from diverse origins in a manner that is flexible and accessible, even to people with non-technical backgrounds. Yet another objective of the present invention is to accomplish the above goals in a fashion that is economical and user-customizable. These and other objectives are facilitated by Option Modules.

Prior to the advent of the present invention, in order to obtain hardcopy of information generated by a particular type of equipment, one needed to return to, and to employ, that specific type of equipment. For instance, a diagram drawn on an Apple Macintosh computer would typically necessitate the use of an Apple Macintosh computer in order for a printout to be produced. A document written on a Smith Corona dedicated word processor would require the application of such a unit for print out to be obtained. A photograph taken by a still video camera would customarily make use of a video-floppy disk printer to make the journey from electrical signals to ink on paper. Because the inventory of equipment that generates electronic format data is enormous, and continuing to grow, the complexity of producing hardcopy is also increasing.

The present invention employs an ordinary copier as a source of a print engine. It then builds on this with the support of Option Modules which, by providing device emulation means, transforms an ordinary copier into a universal print engine. Furthermore, because the user interface has been tailored to people having non-technical backgrounds, information generated on a variety of computer platforms and devices is made accessible even to those who do not know how to operate the equipment that originally created the information.

Because a modular approach is employed, users can customize a tablet in accordance with the present invention to suit their particular printing needs. For example, one who only uses an Apple Macintosh computer can install a Macintosh-only option module for printing out Mac files saved on floppy diskettes. Similarly, for those whose computing needs are met exclusively by IBM/DOS machines, only an IBM/DOS option module need be used. University libraries, on the other end of the spectrum, are likely to have installed more costly multi-platform adapters so that files originating from a range of sources, such as IBM PC's, Macintoshes, Commodore Amiga's, Next Stations, Smith Corona word processors, etc. can all be printed using a library copier. Not only is the modular approach of the present invention functionally adaptable, but it is also economically flexible. Because different copiers can be used in conjunction with a single tablet, the overall system performance can be customized by the user. For example, a tablet might be used with a low cost "personal copier" for ordinary print jobs. The same tablet might later be used with a high speed collating copier to print archival data from a CD-ROM. And still later, that same tablet might be employed, for example, with a "blue print" machine to print an architectural blue print. Thus, the overall system can be tuned to meet specific printing needs by varying the choice of option module and print engine—the latter being conveniently and economically furnished by an ordinary copier.

Figure 17E:
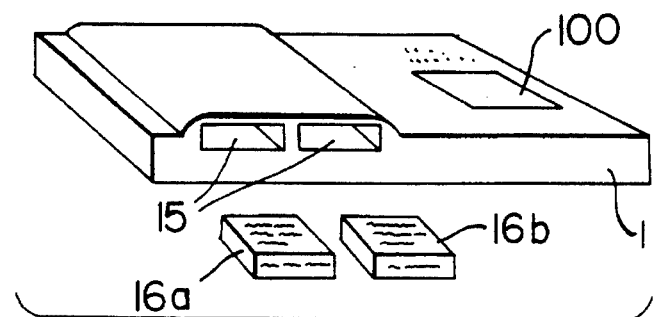
FIGS. 17(a)–(e) illustrate an example of a tablet equipped with device emulation module receiving means, into which option modules may be inserted.
Figure 17D:
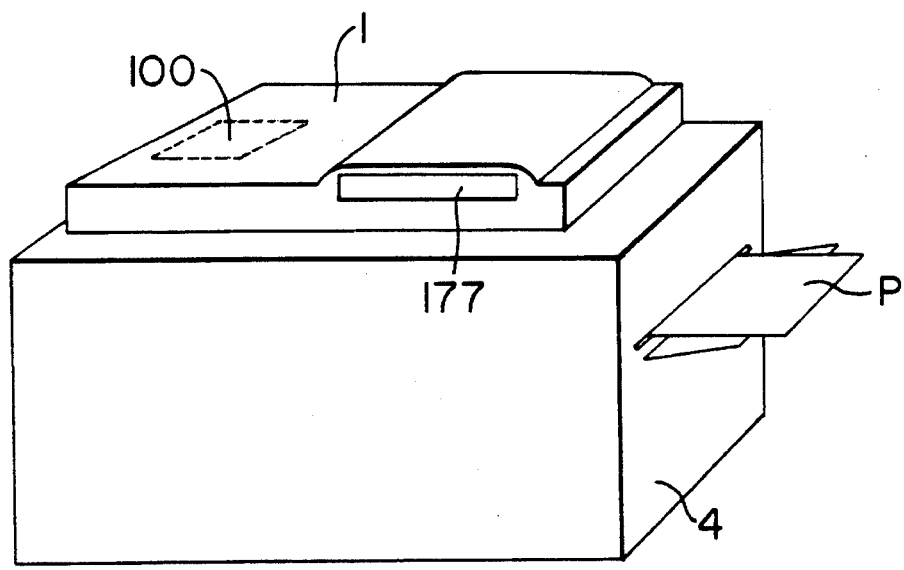
Figure 17A:
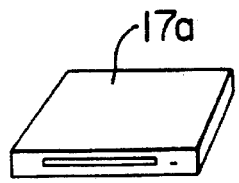
Figure 17B:
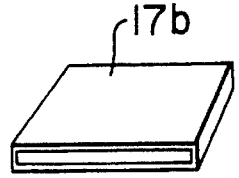
Figure 17C:
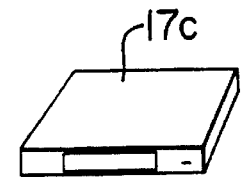

FIGS. 17(d) and (e) illustrate an example of a tablet 1 equipped with device emulation module receiving means 15, into which option modules 16a and 16b may be inserted. Additional receiving means 177 may also be supplied in some embodiments to allow data storage device modules such as 17a, 17b, or 17c to be installed. In FIGS. 17(a)-(c), the illustrated data storage device module 17a comprises a 3.5" floppy diskette drive; the illustrated data storage device module 17b comprises an optical storage unit such as a CD-ROM drive; and the illustrated data storage device module 17c comprises a tape drive.

The illustrated device emulation controller module 16a contains a storage device controller (e.g. an Apple Macintosh 3.5" diskette drive controller, an IBM 5.25" diskette drive controller, a Next machine 3.5" drive controller, etc. ) to control the data storage device module 17. Depending on the data storage device module 17 installed in the tablet 1, different storage device controllers may be used. The device emulation controller module 16a may also comprise a "multi-media" storage device controller, capable of controlling a range of storage device types, and thus of providing access to a plurality of data storage formats. If this is the case, then a single device emulation controller module 16a would be capable of controlling a plurality of data storage device modules 17. The device emulation controller module 16a will incorporate circuitry similar to that which may be currently found in diskette drive adapters, tape drive adapters, CD-ROM adapters, etc.

Also illustrated in FIG. 17(e) is a second device emulation module 16b which provides the means to translate data from one format into another. The source data format would typically be the "native format" of an applications software package, such as WordPerfect, Lotus 1-2-3, Paradox, etc. As used herein, the term "native format" means the default data storage format of the applications program that created the data. For instance, "Publisher's Paintbrush", a popular paint program for IBM-compatible platforms, has "PCX" as a native storage format.

The applications file interpreter module 16b operates in concert with the storage device controller present in the device emulation controller module 16a and the data storage device module 17. The applications file interpreter module 16b enables the tablet 1 to access and then to translate (or interpret) information stored in different native formats on various data storage media into a form that may be displayed on the image display screen of the tablet 1. Once in screen displayable form, such information may be printed, as on plain paper hardcopy output P by the copier 4, as illustrated in FIG. 17(d).

Additionally shown in FIGS. 17(d) and (e) is an example of an operator's console 100, which provides a graphical user interface for the apparatus and may be found on the back of the tablet 1. The operator's console 100 may include an ATM-style touch-sensitive operator's console screen, so that intuitive or "natural" operation of the tablet 1 may be facilitated.

Figure 18A:
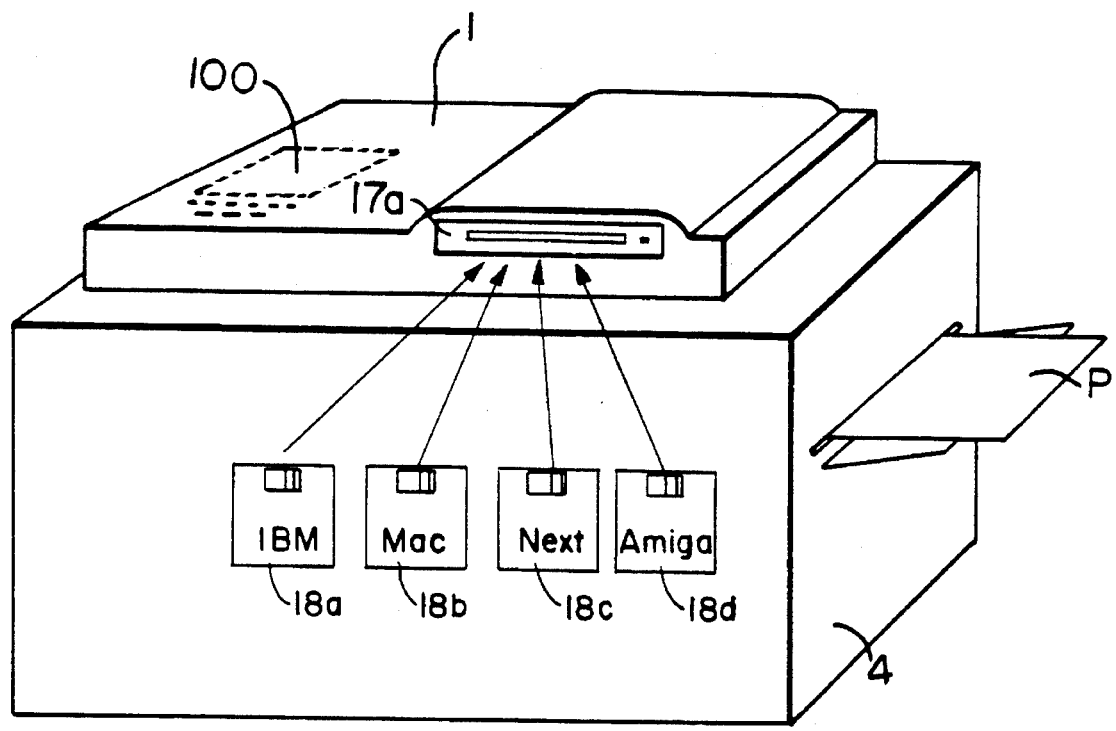
FIGS. 18(a)–(b) illustrate four floppy diskettes, generated by four different computer platforms, that may be inserted into a data storage device module of a tablet.
Figure 18B:
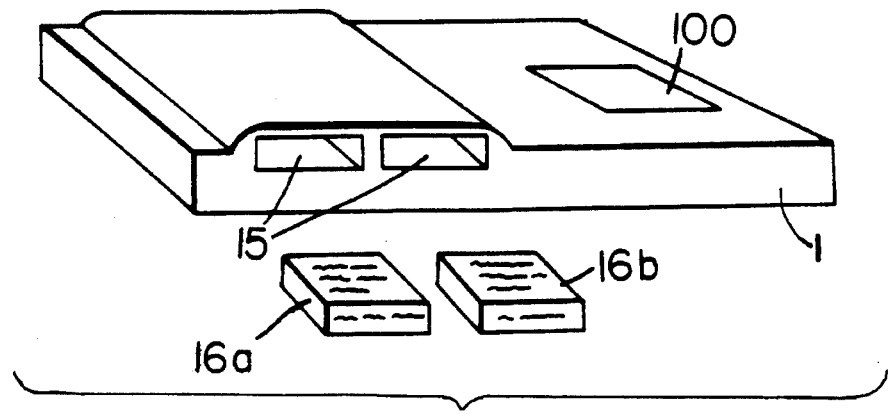

FIG. 18(a) illustrates four 3.5" floppy diskettes 18a-18d, generated by four different computer platforms, that may be inserted into the data storage device module 17a of the tablet 1. The illustrated 3.5" floppy diskettes 18a-18d contain data saved in a variety of different and mutually incompatible formats. For example, the data on the diskette 18a was created by an IBM/DOS machine, the data on the diskette 18b was created by an Apple Macintosh, the data on the diskette 18c was created by a Next machine, and the data on the diskette 18d was created by a Commodore Amiga.

In the illustrated example, the device emulation controller module 16a is preferably a multi-format storage device controller. This eliminates the need to plug in a different, dedicated controller module prior to the insertion of each different type of diskette. If, on the other hand, it is known that the tablet 1 will only be used to reproduce documents stored in, for example, IBM/DOS format, the device emulation controller module 16a may be equipped to read only IBM/DOS format diskettes.

Techniques for enabling a device emulation controller module 16a to operate as a multi-format storage device controller are well known to those skilled in the art. That is, the capability of reading diskettes of more than one format using a single disk drive are well known. As an example, disk drive controllers that permit both Apple Macintosh and IBM PC diskettes to be read have been available for some time. "Central Point Software, Inc." of Beaverton, Oregon has long been marketing a hardware adapter board for IBM compatible computers called the "Option Board" (and after 1988, the "Deluxe Option Board") that allows IBM compatible computers to read Apple Macintosh diskettes. There are other, similar diskette drive adapter manufacturers. In a somewhat similar fashion, Apple Macintoshes may also read IBM/DOS diskettes. Thus, the production of a device emulation controller module 16a which would enable the tablet 1 to read diskettes from a variety of different platforms, as shown by way of example in FIGS. 18(a) and (b), would be well within the purview of the skilled artisan.

The file interpreter module 16b performs the function of converting data from various source formats into the screen control codes used to generate displayable images on the image display screen 6a of the tablet 1. Electronic format data files are generally comprised of two components. First, there is the raw data itself. Second, there is the set of formatting instructions that describe how the raw data is to be made use of. Accessing a data storage medium, such as a magnetic diskette, is only half of the requirement for being able to print native format files saved on native storage media. Interpreting, or translating, the accessed native format file is the other half.

As a familiar example, consider a word processor data file. The file may be composed of the words that constitute the document. The file may also be composed of the formatting commands, or control codes, that describe how the words are to be arranged on each page of the document, how typefaces should appear and in what sizes, whether some words are underlined, and so forth. Similar concepts apply to other types of data files, whether they originate from spread sheet programs, data base managers, paint or draw programs, etc.

The file interpreter module 16b provides the means to make sense of the data files. That is, the file interpreter module 16b provides the means to apply the formatting rules of different software applications programs to the raw data contained in the data files created by such applications. The result of this action is the creation, in screen displayable form, of information formatted as it was intended to appear by the original author of the data file. The displayed information may subsequently be copied by a copier in accordance with the general principles of the present invention, as previously described.

FIGS. 19(a) through 19(g) illustrate an example of the process that might be involved in creating a hardcopy of a disk file using a tablet in accordance with the present invention. The illustrated process is extremely simple, and may be performed by people with non-technical backgrounds, including people who do not know how to use a computer.

FIGS. 19(a) through 19(g) illustrate the images that might appear on the operator's console screen 100 to guide a user in obtaining a printout P. The operator's console screen 100 depicted in FIGS. 19(a)–19(g) is a touch sensitive screen, similar to screens used in some automatic teller machines. The images displayed on the operator's console screen 100 lead the user through the process of selecting and printing files selected from a disk 18a inserted into the data storage device module 17a of the tablet 1.

Figure 19A:
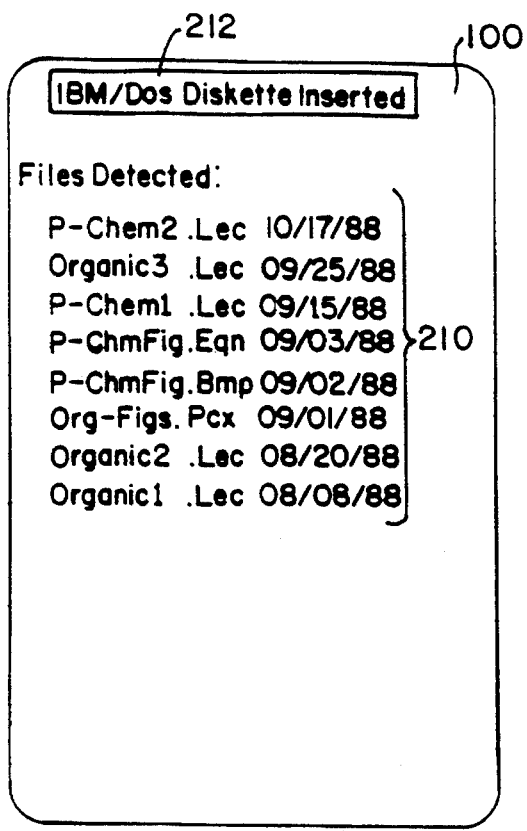
FIGS. 19(a)–19(g) illustrate an example of a process that might be involved in creating a hardcopy of a disk file using a tablet in accordance with the present invention.

The process begins with the insertion of a disk, such as an IBM/DOS format floppy disk, into a data storage device module 17a (see, for example, FIG. 18(a)). Then, as shown in FIG. 19(a), the operator's console screen 100 presents a listing 210 of the files detected on the inserted disk. Platform identification information 212 may also appear at the top of the operator's console screen 100.

Figure 19B:
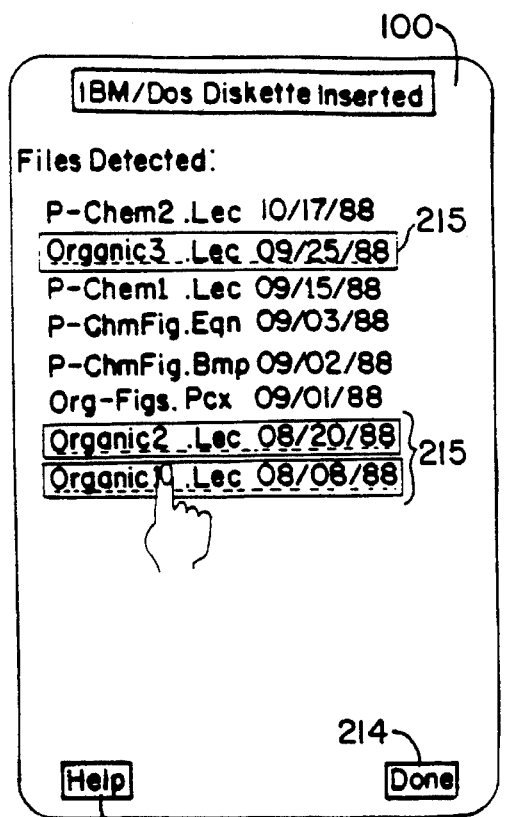

As shown in FIG. 19(b), the user may select the files to be printed by touching the touch sensitive operator's console screen 100. The selected files appear in highlight boxes 215. To de-select a chosen file, the user might simply touch the selection again. The selection would then toggle off. When the user has completed making selections, the "Done" screen-button 214 may be pressed. If the user is unsure about the procedure, or requires assistance, a "HELP" screen button 247 may be provided.

Figure 19C:
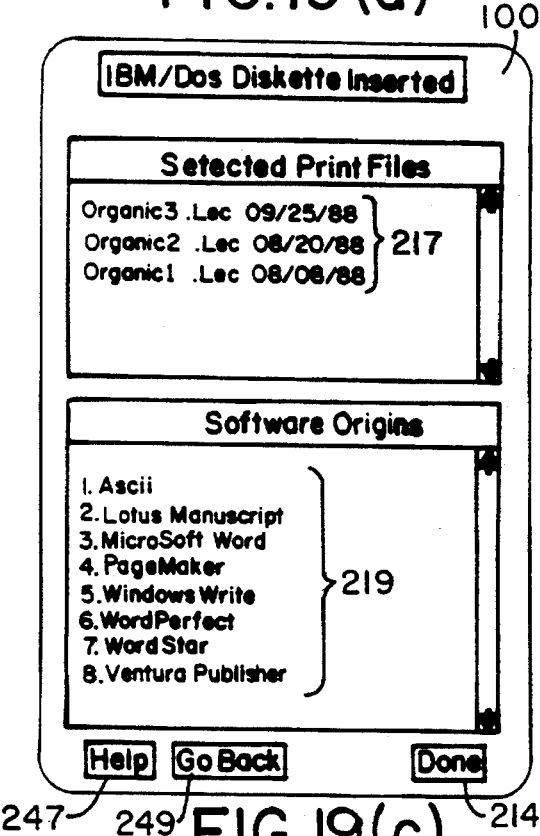
Figure 19D:
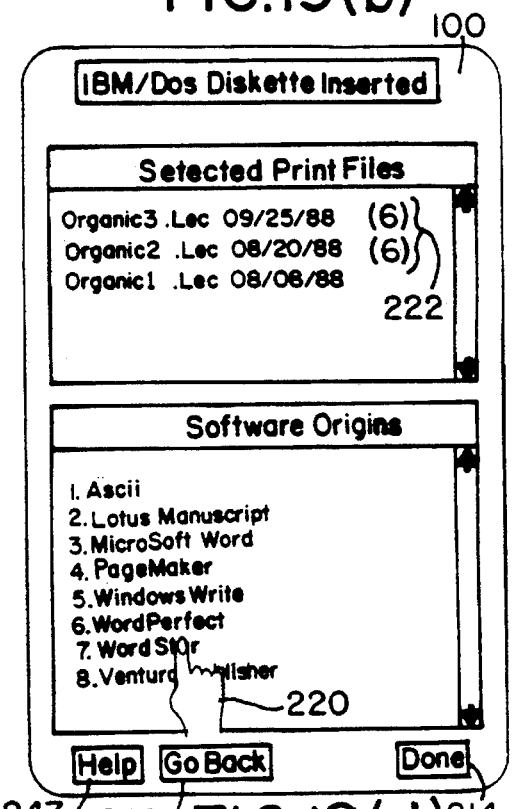

As shown in FIG. 19(c), a list of the selected files 217 may then be displayed, together with a list of applications software origins 219. The user may then indicate what software package was utilized to create the selected files, with the designated software origins being indicated in the form of numerals 222 alongside each selected file (see FIG. 19(a)). As illustrated in FIG. 19(d), for example, the files "Organic3.LEC" and "Organic2.LEC" represent files created using WordPerfect software. The origin number of these files would therefore be "6. WordPerfect". The file "Organic1.LEC" represents a file created using "Ventura Publisher" software. The origin number of this file would therefore be "8. Ventura Publisher". When the user has completed indicating what software package was utilized to create the selected files, the "Done" screen-button 214 may be pressed. (To return to a previous screen menu, the user may press the "Go Back" screen button 249.)

Figure 19E:
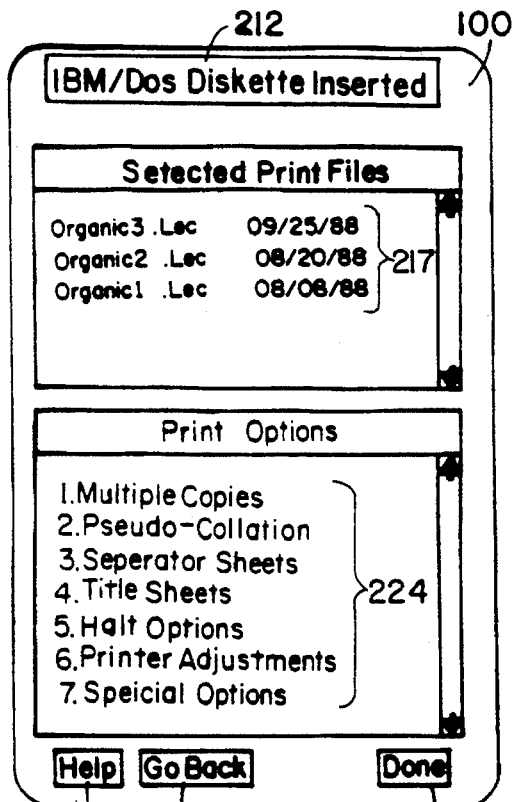

As shown in FIG. 19(e), a variety of print options 224 may then be presented as electives. These include, for example: multiple copies, a feature called "pseudo-collation" (described later in connection with FIG. 23), separator sheets, title sheets, print halt options, printer adjustment options, etc.

Figure 19F:
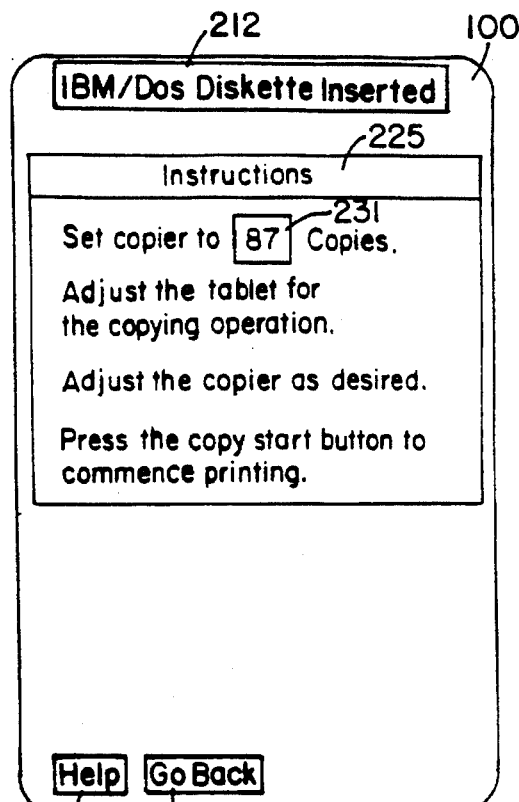

As shown in FIG. 19(f), the user may be presented with a print pre-commencement advisory screen 225. The advisory screen informs the user of the total number of pages that will be generated, so that the copier may be adjusted accordingly. As shown in FIG. 19(f), for example, the total page count is indicated as being 87. This page count includes all page-consuming special features, such as separator sheets. As indicated in the advisory screen 225, printing may be initiated by depressing a copy start button on the copier.

Figure 19G:
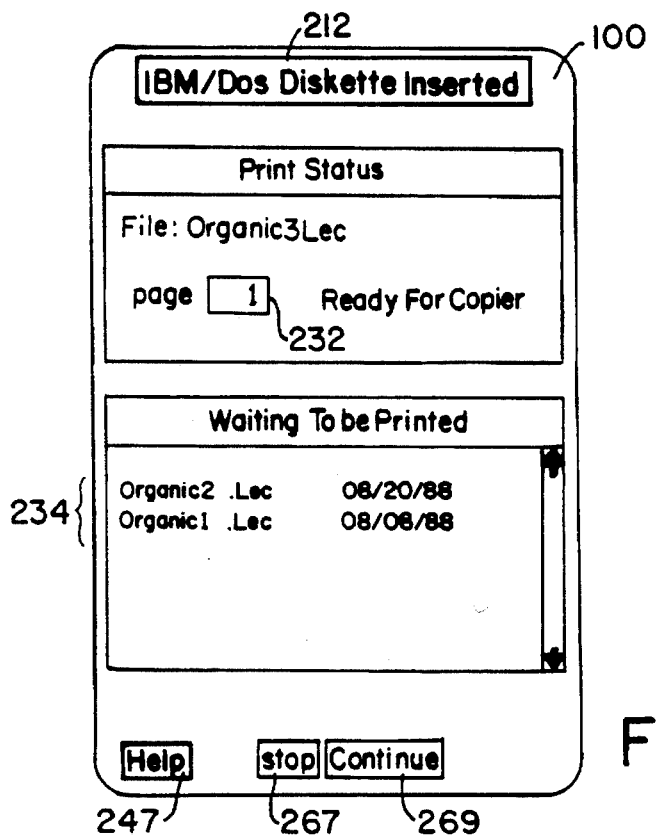

As shown in FIG. 19(g), the user may monitor print status during the printing process. The "page number box" 232 displays the page currently being displayed on the image-forming screen of the tablet. This allows the user to know the status of the print job while the print job is taking place. To suspend the printing process, the copy cycle may be interrupted at the copier. Since, in a preferred embodiment, the tablet follows the copier by "watching out" for copy execution via sensors, halting the copier will also place the tablet into suspended operation. Alternatively, a "Stop" screen button 267 may be provided to suspend printing. Resumption of printing may be initiated by depressing a "Continue" screen button 269. FIG. 19 (g) also shows a listing of files remaining in the print queue 234.

Figure 20A:
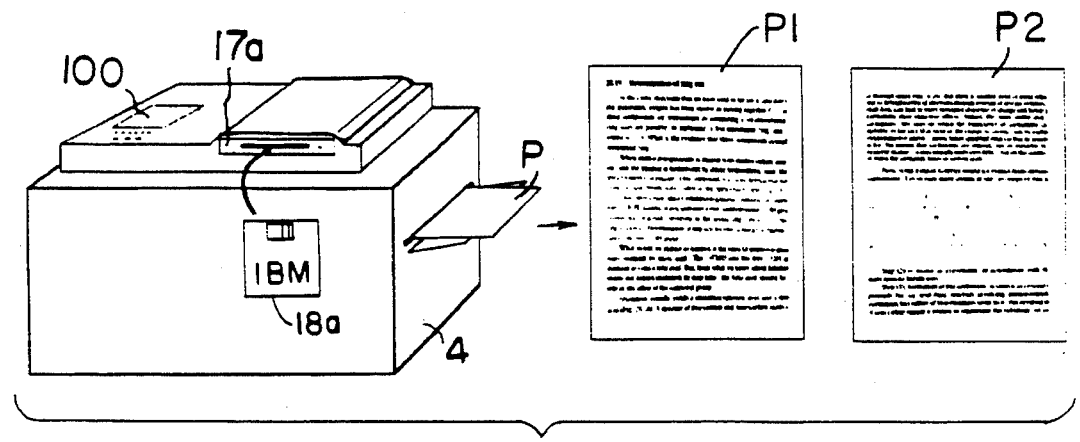
FIGS. 20(a)–(c) illustrate an example of the versatility afforded by an embodiment of the present invention.
Figure 20B:
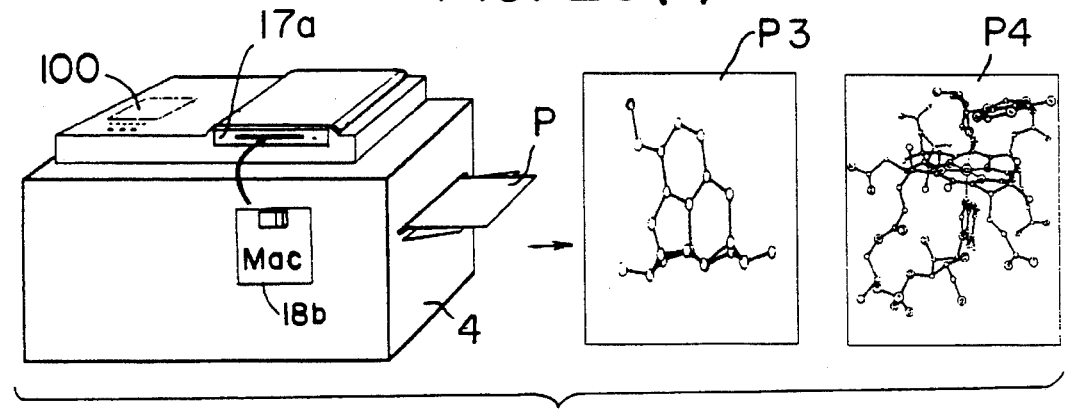
Figure 20C:
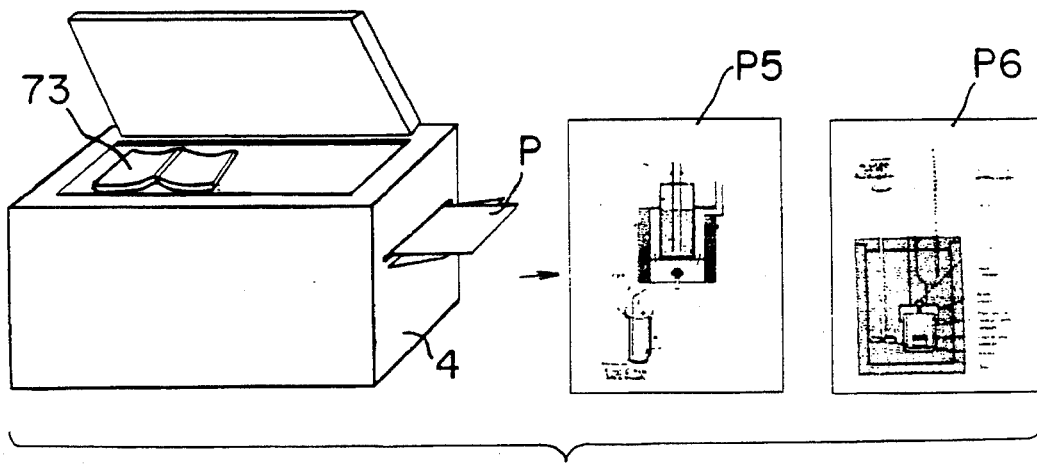

FIGS. 20(a)–(c) illustrate an example of the versatility afforded by an embodiment of the present invention. FIG. 20(a) shows a diskette 18a that may be inserted into a data storage device module 17a of a tablet 1. The diskette contains a word processor document that was created on an IBM/DOS machine. The hardcopy output P1 and P2 produced by the copier 4 comprises text material.

As shown in FIG. 20(b), another diskette 18b may subsequently be inserted into the same data storage device module 17a of the tablet 1. The second diskette 18b may contain drawings that were made on another computer platform, such as an Apple Macintosh, using a program such as "Beaker" which is not available to an IBM/DOS platform. The hardcopy output P3 and P4 produced by the copier 4 comprises molecular diagrams.

As shown in FIG. 20(c), an ordinary textbook 73 may be copied (printed) alongside any of the above-mentioned electronic format information. The hardcopy output P5 and P6 produced by the copier 4 comprises pages copied directly from the textbook 73.

All of the above printing of hardcopies P1–P6 may be accomplished at the same physical site, using the same equipment, and in a "continuous flow" that is both intuitive and user-friendly. Moreover, the present invention brings these capabilities to ordinary users because all of the required equipment is relatively affordable. The copier 4 may be a low-cost "personal copier". Still further, the present invention provides room for growth, as more expensive, higher performance copying equipment can be substituted at a future time. The present invention is therefore highly adaptable to one's needs and resources.

Figure 21:
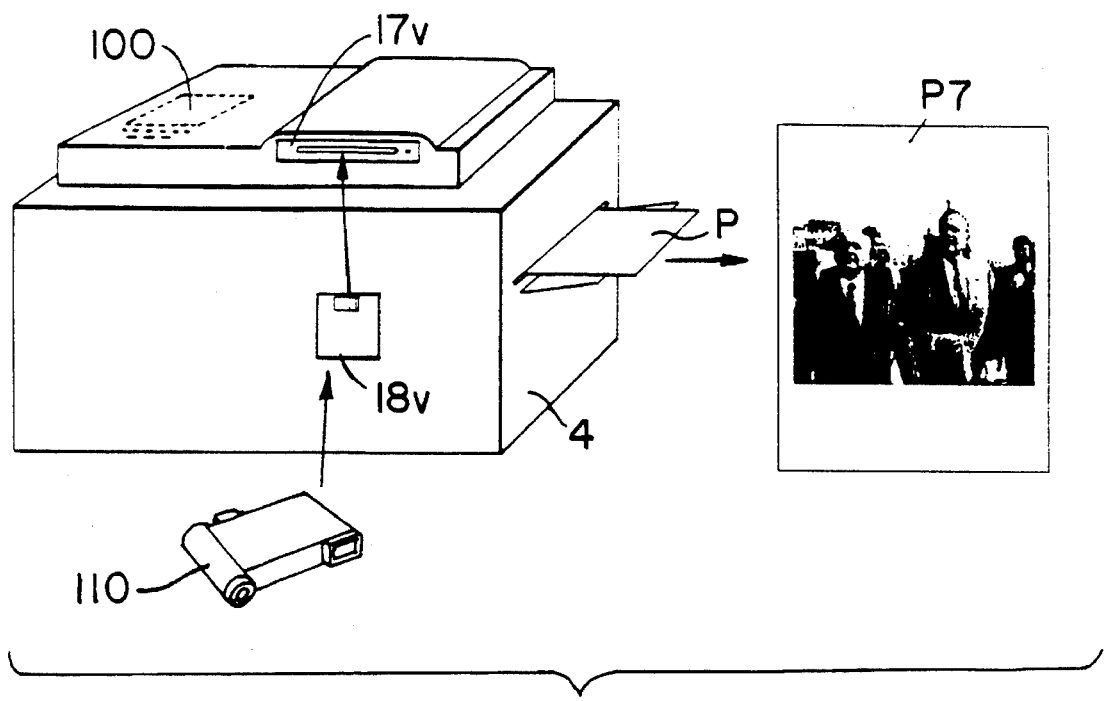
FIG. 21 illustrates an example of the use of a tablet in printing digital photographs taken by an electronic still camera.

FIG. 21 illustrates an example of the use of a tablet 1 in printing digital photographs taken by an electronic still camera 110. The illustrated electronic still camera 110 may store pictures on 2-inch video floppy disks 18V in a standard format defined by the "Electronic Still Camera Standardization Committee". The data storage device module 17V may comprise a video floppy disk reader installed in the tablet 1 to enable video floppy disks 18V to be read and printed. The hardcopy output P7 comprises a paper print specimen of a photograph taken by the camera 110. The ability to create rapid photographic proofs in this manner may be desirable to organizations such as news bureaus.

Figure 22:
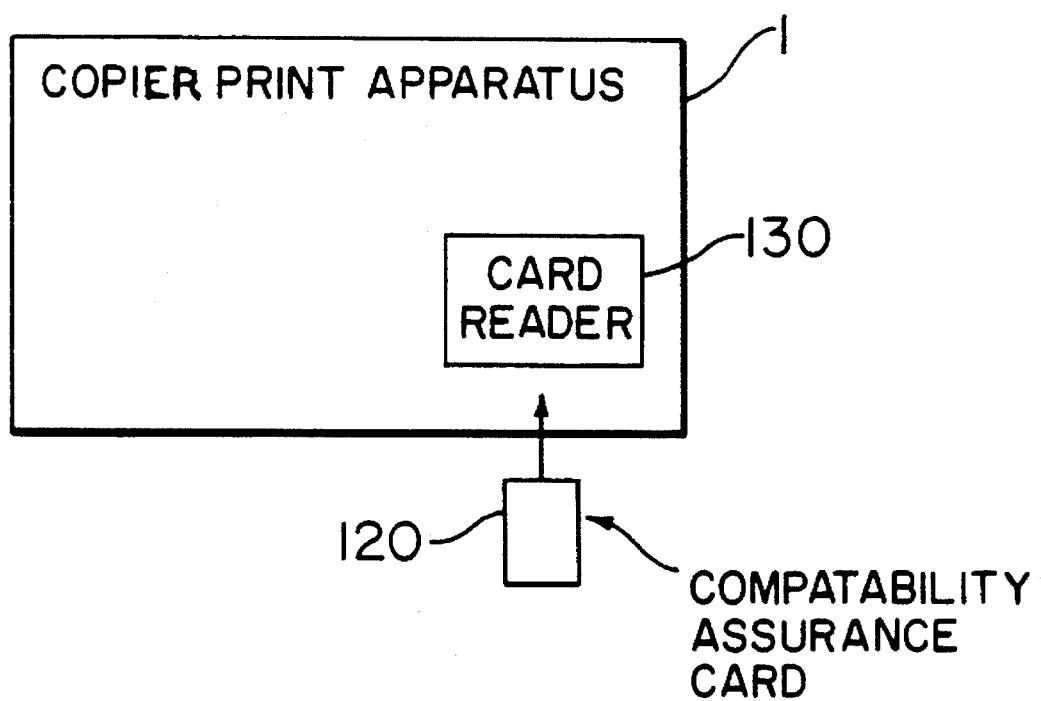
FIG. 22 illustrates an example of the incorporation of a compatibility assurance card reader into a tablet.

FIG. 22 illustrates an example of the incorporation of a compatibility assurance card reader 130 into the tablet 1. One purpose of a compatibility assurance card 120 is to insure that the tablet 1 may be used to print files created by various software packages. Another purpose is to accommodate changes in data storage formats by software manufacturers.

The compatibility assurance card 120 may comprise a credit-card sized element provided by software manufacturers to licensed owners of their products. For example, the manufacturer of a word processing software package might include a compatibility assurance card 120 in the package. The compatibility assurance card 120 may contain information on the data storage convention utilized by the latest release of the software. Each of the formatting and control characters used by the software program when writing data to disk files would be available on the card 120. By inserting the card 120 into the card reader 130, the tablet 1 may download the storage convention information from the card into the memory of the tablet 1. This information may then be used in place of, or as a supplement to, the information contained in an installed file interpreter module 16b.

A person who, for instance, utilizes a plurality of software packages in the course of conducting business might be provided with a plurality of compatibility assurance cards. In this fashion, such an individual would be assured of being able to print out data at suitably equipped copiers at field locations, at libraries, post offices, drug stores, etc. It is anticipated that most people would require three or fewer compatibility assurance cards: for example, one for a word processor, one for a spread sheet program, and one for a data base manager.

Compatibility assurance cards 120 may comprise plastic cards similar to credit cards, having a magnetic recording layer in which information such as symbol tables for data file translation may be retained. Compatibility assurance cards 120 may also comprise "smart cards", optical memory cards, or any other type of medium that is cost effective and that is capable of holding the required format translation instructions.

Figure 23:
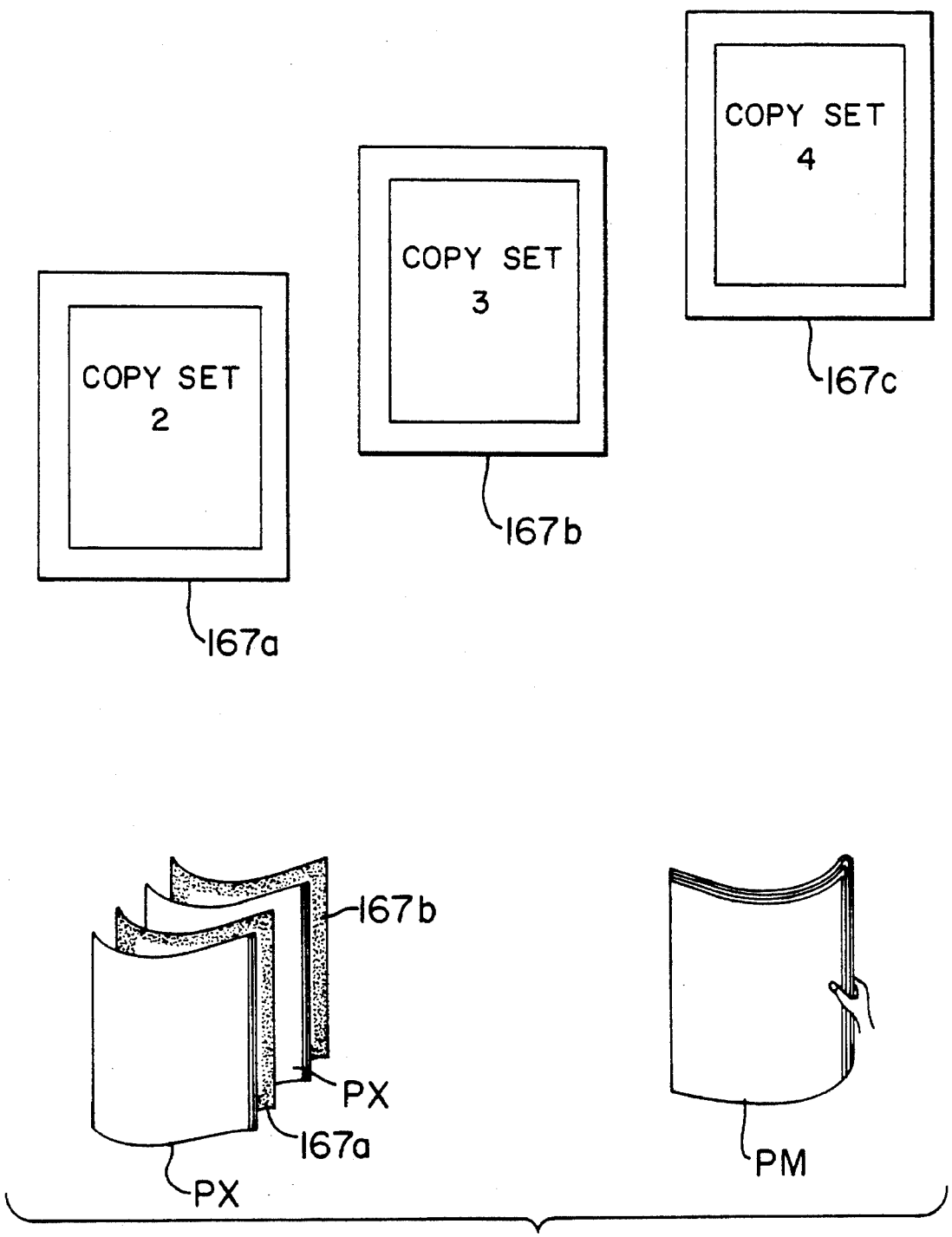
FIG. 23 illustrates an example of a feature referred to as "Pseudo-Collation".

FIG. 23 illustrates an example of a feature referred to as "Pseudo-Collation". "Pseudo-Collation" is a technique that permits low-end copiers that are not equipped with collating capability to simulate the benefits of collation. When a tablet in accordance with the present invention is used to print multiple copies of a single document, the tablet may handle the task as follows: the first document page is displayed and printed, the second document page is displayed and printed, the third document page is displayed and printed, and so on until the final document page is displayed and printed. The routine is then repeated a number of times, depending upon the number of copies desired.

Between displaying the final document page of one copy set and the first document page of the next copy set, a separator page may be displayed to the copier by the tablet. In FIG. 23, for example, the separator pages are illustrated as pages 167a, 167b and 167c. Also shown in FIG. 23 is a page Px preceding the separator page 167a and a page Px between the separator pages 167a and 167b. The pages Px denote complete document copy sets. In the illustrated example the borders of the separator pages 167a–167c are darkened. When a stack of printed pages Pm is fanned, the dark borders of the separator pages 167a and 167b facilitate location of the document copy sets preceding and following the separator pages. This allows low-end, non-collating copiers to produce multiple copy sets of documents in a fashion that approximates true collation.

II. EXAMPLES OF SOME TECHNICAL CONSIDERATIONS

Option Modules, which provide device emulation means, supply a mechanism by which users may customize, expand, upgrade, and modify a tablet in accordance with the present invention. For example, a print spooler might be installed to more effectively handle large volume print needs. Option Modules further provide the capability to directly access native format data files on the original medium of the devices that created them. Option Modules enable printout to be obtained using only a copier and a diskette (for example) containing data to be printed. A connection to a computer becomes unnecessary. Using a native format file reader as an illustrative example, examples of some Option Module implementations are discussed below.

Figure 24:
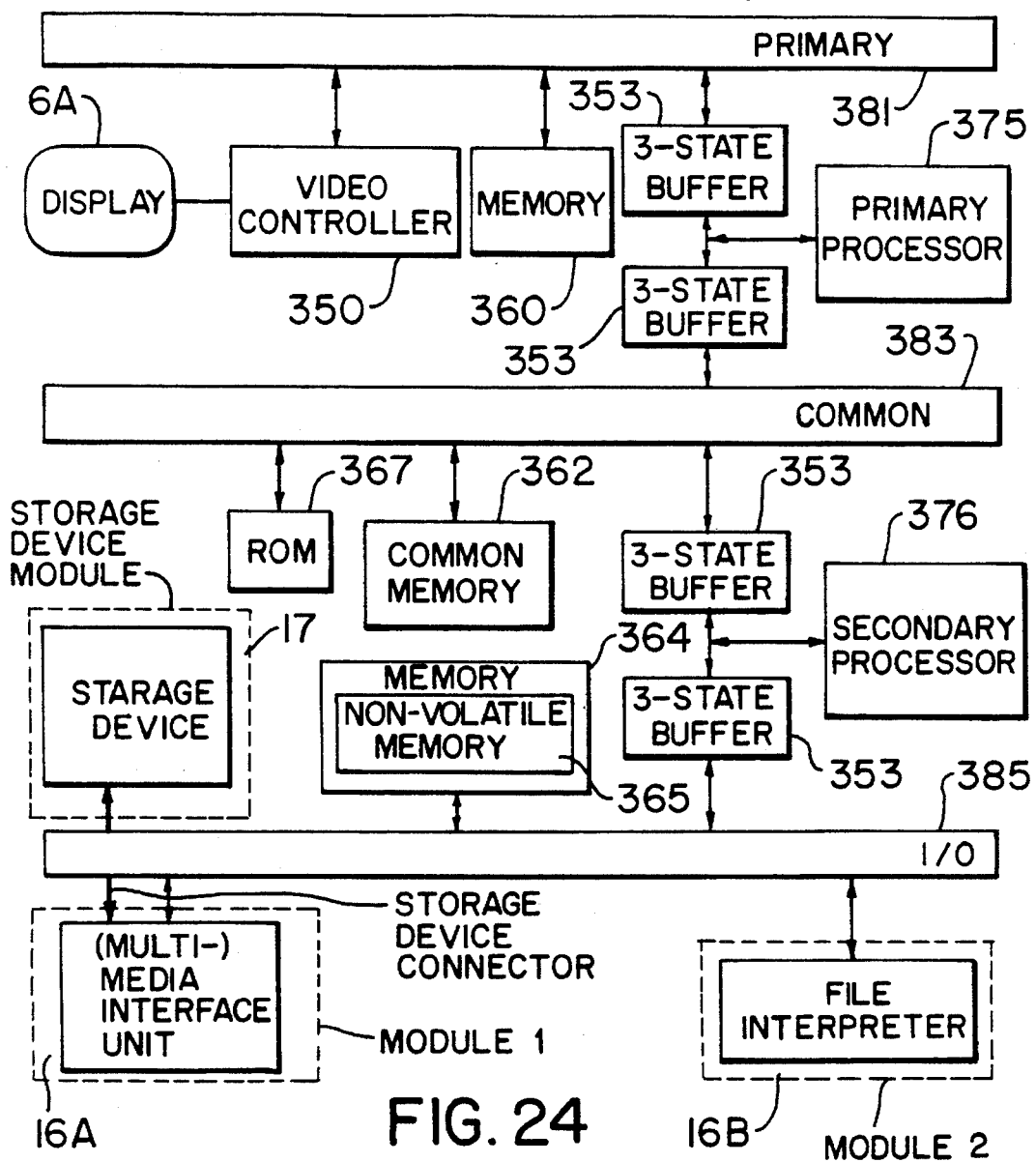
FIG. 24 illustrates an example of a hardware configuration in one embodiment of the present invention.

FIG. 24 illustrates an example of a hardware configuration in one embodiment of the present invention. In the illustrated embodiment, all of the components comprise part of the tablet, with the exception of the device emulation controller module 16a, the file interpreter module 16b, and the data storage device module 17, all of which are Option Modules.

In the illustrated example, the device emulation controller module 16a comprises a "multi-media" controller capable of controlling more than one type of storage device. The device emulation controller module 16a may, for instance, be capable of controlling an Apple Macintosh 3.5" diskette drive as well as an IBM/DOS format 3.5" diskette drive. The method of accomplishing this is known in the art. Several computer peripheral manufacturers have long been marketing products that enable a single 3.5" diskette drive to read and write in the storage format of more than a single computer platform. Examples of such manufacturers are numerous, but include Central Point Software of Beaverton, Ore., and Apple Computer, Inc. of Cupertino, Calif. (for use by Apple). The device emulation controller module 16a is connected to the storage device module 17, and is also connected via the I/O bus 385 to the tablet 1.

The file interpreter module 16b contains a native format file interpreter. The file interpreter module 16b is also plugged into the I/O bus 385 by virtue of being installed into the module receiving bay 15. The file interpreter module 16b performs the function of converting native format files into screen displayable form. The file interpreter module 16b may comprise a ROM. The ROM may include translation tables and interpreter instructions for translating data, appearing in the native format of various applications software packages, into a single target format. The target format will ordinarily be the screen control codes 305 used by the video controller 350 to generate images on the image display screen 6a of the tablet 1.

As appreciated by persons skilled in the art, the screen control codes 305 may comprise a graphics language, such as PostScript. (The screen control codes 305 may also comprise a bitmap, rather than a true language.) If the screen control language is PostScript, then translation may not even be required in some instances, since certain software programs permit data to be saved in this format as an output option. Techniques for translating data from one storage format into another are known in the art. Many software applications packages provide what are referred to as "Import" and "Export" facilities. These facilities are essentially software translators. Additionally, there are several software manufacturers that specifically market format conversion programs. Examples of such manufacturers are *Inset Systems*, which produces "HiJaak", and *SCC*, which produces "Software Bridge". The methods of data format conversion are therefore well established in the art.

Returning to FIG. 24, a secondary processor 376 is shown having access to both the I/O bus 385 and the common bus 383. As is standard practice when a single processor has dual bus access, buffers 353 are provided to enable bus selection. The buffers 353 are similarly present for the primary processor 375, which communicates with both the common bus 383 as well as primary bus 381. A memory block 364 is present on the I/O bus 385. A subset of the memory block 364 is reserved for non-volatile memory 365. When a storage medium, such as a diskette, is placed into the data storage device module 17, the device emulation controller module 16a, under the control of the secondary processor 376, may read data from the medium. The acquired data may be placed into the memory 364. Using format translation rules provided by the file interpreter module 16b, the processor 376 may translate the native format data read from the diskette into the screen control codes (language) used by the video controller 350. The translated screen control codes may be placed into the memory 362 by the secondary processor 376. The primary processor 375 moves the translated screen control codes from the memory 362 into the local memory 360. The video controller 350 is able to access the screen codes from the memory 360 in order to generate images 60 on the image display screen 6a. While the primary processor 375 is moving data from the common memory 362 to the system memory 360, the secondary processor 376 may continue retrieving and translating additional native format data from the data storage device module 17.

Also shown in FIG. 24 is a ROM unit 367, which contains instruction code for controlling basic system operation. An EPROM may be substituted for the ROM unit 367 in some embodiments, so that new system code can be incorporated into the tablet simply by downloading the new code from a diskette into the EPROM. A non-volatile memory block 365 may be used to retain translation instructions which are supplemental to the instructions found in the file interpreter module 16b. The supplemental instructions may be downloaded from data storage media such as diskettes, which may also be accessed using the data storage device module 17. The memory units (e.g. 362, 364, 365) may be used as shadow RAM for instruction code or translation code saved in ROM (e.g. 367, the file interpreter module 16b). This may offer an improvement in overall performance of the tablet.

Figure 25:
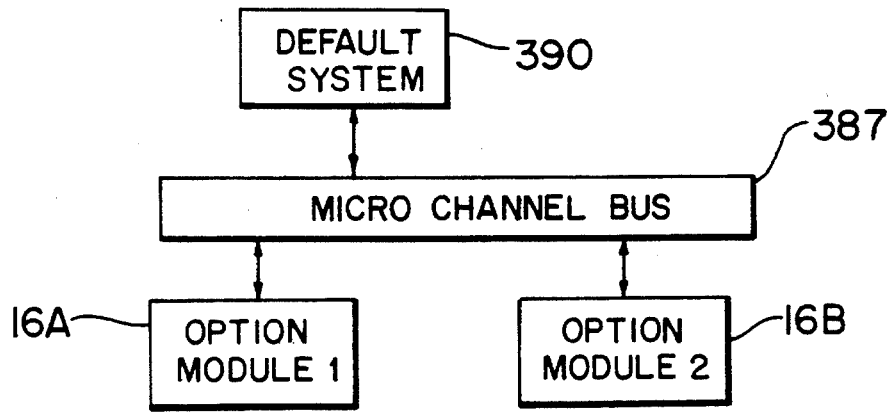
FIG. 25 illustrates an example of the application of MicroChannel Bus architecture by a tablet so that multiple masters can be effectively supported.

FIG. 25 illustrates an example of the application of MicroChannel Bus architecture by the tablet so that multiple masters Call be effectively supported. In this configuration either Option Module 1 or Option Module 2 can take control of the overall system from the default system 390 (master). Either Option Module 1 or Option Module 2 can control the function of the tablet. For example, an option module might be installed to operate the tablet as a "printer" that serves a computer network. In the illustrated example, option Module 1 corresponds to the device emulation controller module 16a and Option Module 2 corresponds to the file interpreter module 16b. However, the present invention does not require that the option Modules correspond identically to either the device emulation controller 16a or the file interpreter 16b.

Figure 26:
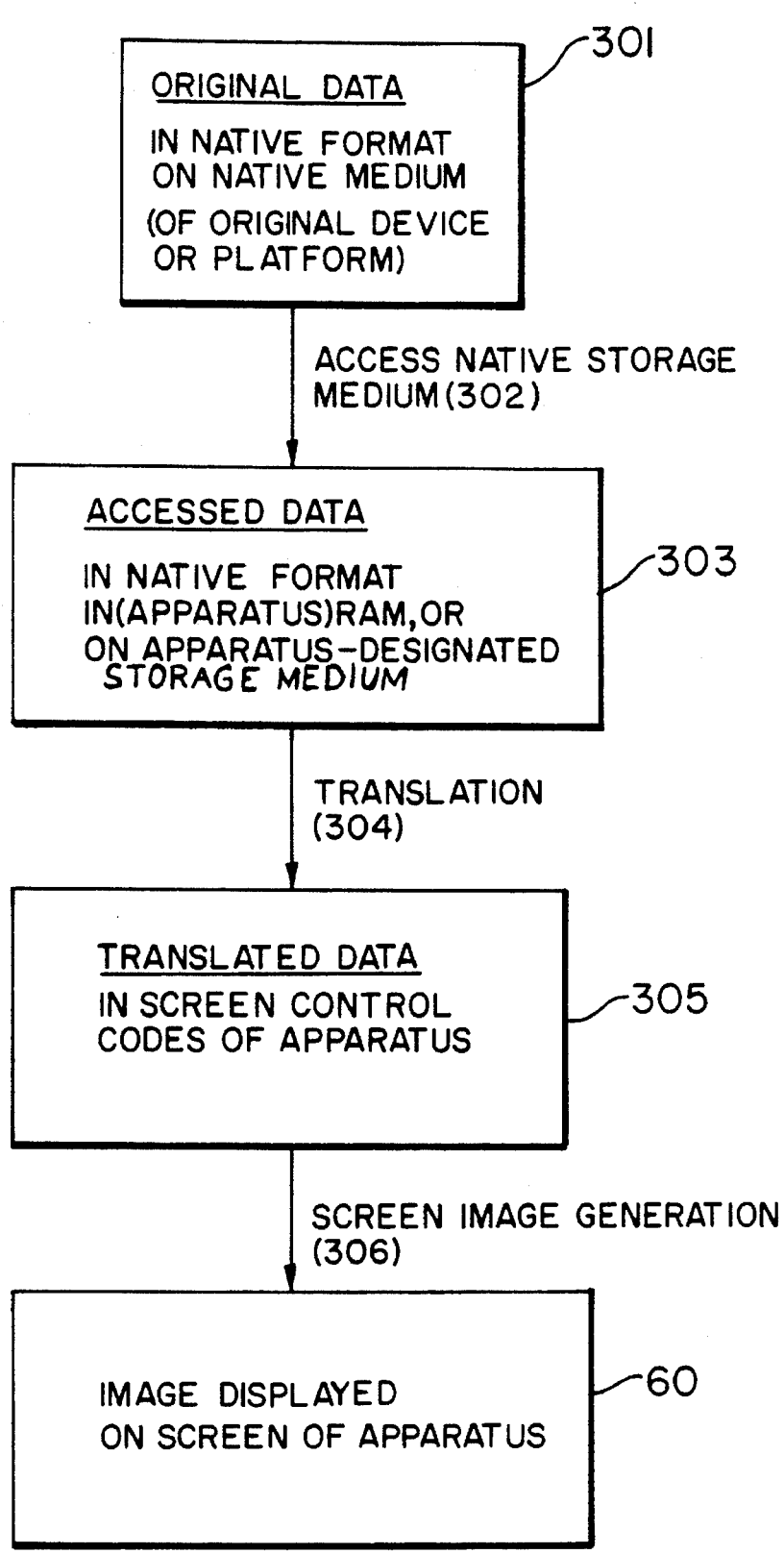
FIG. 26 illustrates an example of a process for obtaining hardcopy with a tablet from data created by a software package, that is saved on a medium such as a diskette.

FIG. 26 illustrates an example of a process for obtaining hardcopy with a tablet from data created by a software package, that is saved on a medium such as a diskette. In FIG. 26, element 301 represents a storage medium, such as a diskette, that contains a file that was created by an applications program. The data is in the "native" format of the applications program that created it. As used herein, the term "native" means the format customarily employed by the program for the storage of information.

Step 302 denotes the process of accessing a file on the native storage medium. This involves reading the storage medium (which may be, for example, a floppy diskette). Step 302 is accomplished by having a storage device controller, appropriate for the storage format of interest, control the storage device so as to be able to access the storage medium. For example, step 302 might entail employing hardware similar to an IBM/DOS floppy diskette drive "adapter" to control a 3.5" diskette drive, so that data stored on a 3.5" IBM/DOS format diskette may be read. The diskette drive "adapter" of this example may be included in the device emulation controller module 16a, and the 3.5" diskette drive may be furnished by the data storage device module 17. As mentioned earlier, the device controller module 16a may be a "multi-media" storage device controller capable of providing access to the storage media of more than one type of computer platform. Multi-media controllers are familiar in the art, and the manner of their application and construction would be known to skilled artisans.

In FIG. 26, element 303 represents data that has been read into the memory of the tablet. After being read into the tablet, the data may optionally be placed into another storage medium such as, for example, a fixed disk drive connected to the tablet. The data 303 is still in its native format. That is, for example, if the data 303 started out as a WordPerfect document file, it is still in WordPerfect file format.

Step 304 represents the step of translating the native format data into a form that can be displayed on the image forming screen of the tablet. The element 305 represents the screen control codes that the native format data is translated into in step 304. The screen control codes 305 may comprise the instructions of a display language, such as PostScript. The screen control codes 305 may also comprise the bitmap of the image that is to be displayed. In the latter case the screen control codes would not constitute a true language. The screen control codes 305 may also comprise the linguistic elements of numerous other techniques currently available for representing graphical information on display devices, including novel display languages fashioned specifically for use by the tablet.

The process of translating native format data into the screen control codes, or language, used by the tablet, would depend on the choice of screen language adapted by the particular embodiment of the tablet. The principles behind translation, however, are well known to software engineers. "Import" and "Export" functions provided by many software packages perform translation between different file formats. For example, users of MicroSoft Word may "Import" documents created by WordPerfect, and edit them using MicroSoft Word instead. Similarly, most graphics programs can read and write "BMP" "PCX" and "TIFF" file formats, regardless of the native format of the program itself. In addition to the "Import" and "Export" features built into most applications programs, are the software packages that specifically provide the service of format conversion. Examples are "Hijaak" by *Inset Systems,* and "Software Bridge" by *SCC.* The principles governing format conversion are thus familiar in the art.

Step 306 of FIG. 26 represents the step of image generation by the video hardware 350 of the tablet. An image 60 is displayed on the image display screen of the tablet. The process by which an image may be generated from data and displayed by video hardware is ubiquitously well known. The graphics adapters of all computers perform this function.

Figure 27:
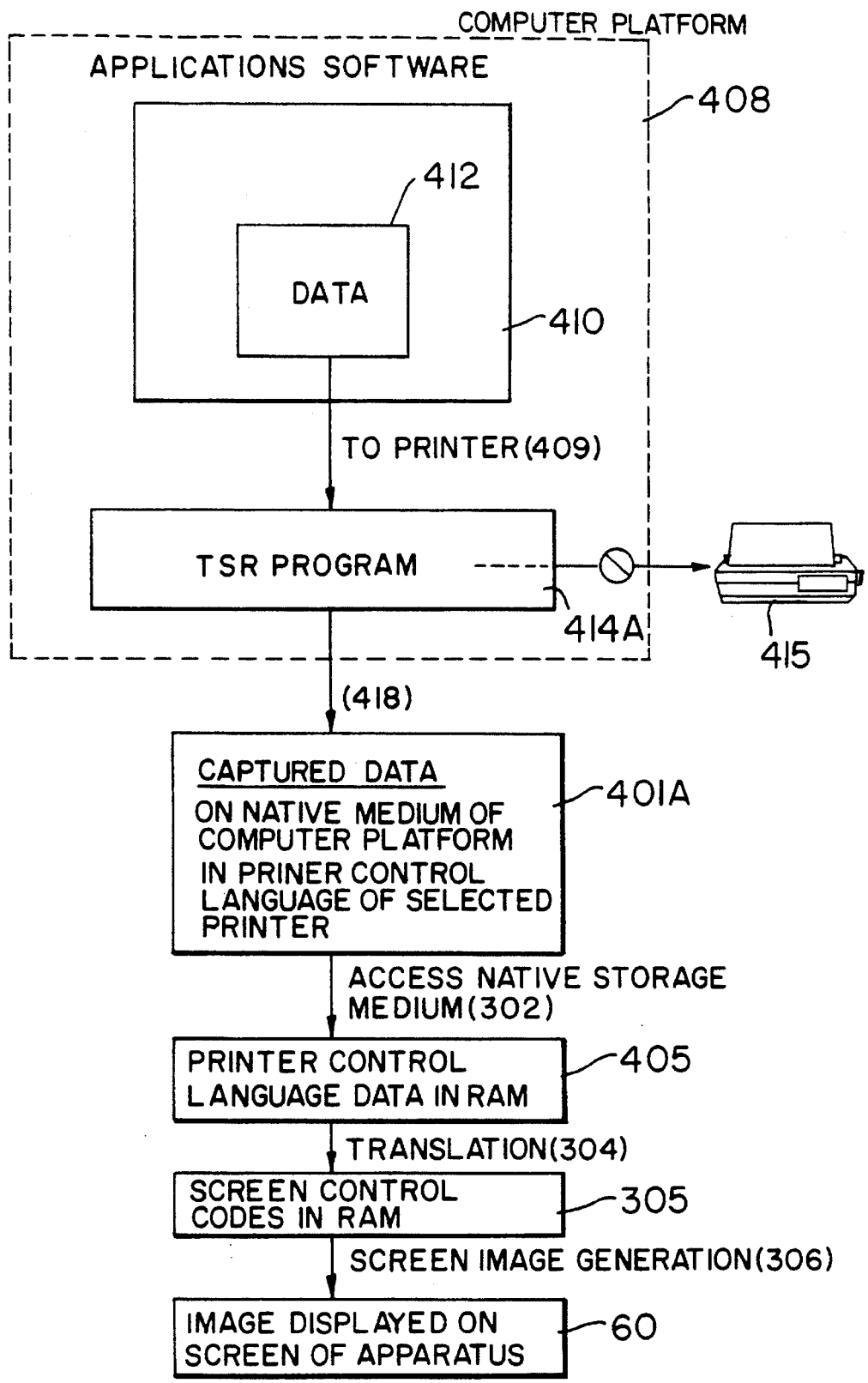
FIGS. 27 and 28 illustrate an example of an alternate method of getting data created by an applications program into a tablet.
Figure 28:
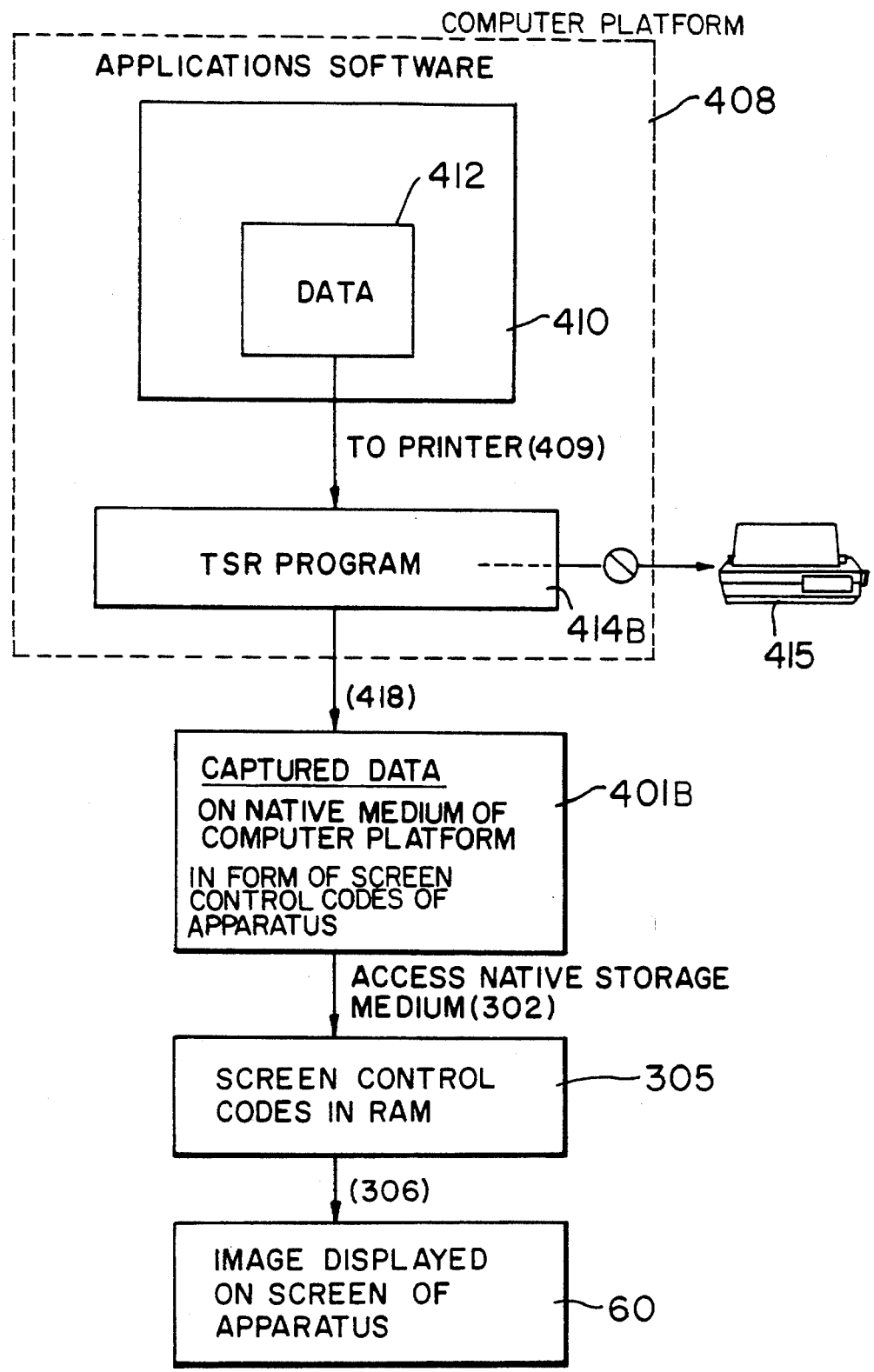

FIGS. 27 and 28 illustrate examples of alternate methods of getting data created by an applications program into the tablet. As illustrated in FIG. 27, a program 410 is run by a computer 408. As a result of running the program 410 on the computer 408, data 412 is created. The step 409 denotes the act of sending data to a printer 415, by way of executing a print command from within the program 410. The data 412, however, does not reach the printer 415, because it is intercepted by a TSR (Terminate but Stay Resident) Program 414a. The TSR program 414a redirects the print stream to a storage medium, such as a floppy diskette 401a. The data file recorded on the storage medium 401a may contain printer control language data, since the data stream was originally intended for a printer. The step 302 involves accessing the storage medium 401a, as in FIG. 26. When the storage medium 401a is read, the printer control codes are read into the memory of the tablet. The element 405 represents printer control codes in the RAM of the tablet. The step 304 involves translation of the printer control codes into the screen control codes 305. As in FIG. 26 screen image generation 306 causes the data to be displayed as an image 60 on the image display screen of the tablet.

FIG. 28 shows another technique for getting data into the tablet. As in FIG. 27, a computer 408 is shown running an applications program 410 (for instance, a spread sheet program) which generates data 412. The user executes a print command from within the program 410 to send the data to a printer 415. Step 409 represents the act of sending data to a printer from within the applications program. Instead of going to the printer 415, the data stream is translated by the computer 408 into the screen control codes 305 of the tablet 1 and then written to a storage medium. The element 401b represents a storage medium, such as a diskette, containing screen control codes representative of the data that was queued for printing. The element 414b represents a driver that emulates a printer driver, installed on the computer platform 408. Prior to executing the print command, the user selects from the printer setup menu of the applications program 410, "copier Printer" as the print device. The driver 414b is then invoked when the print command is issued from the applications program 410. Rather than sending a stream of printer control language codes to the printer 415, the driver 414b writes screen control codes 305 to a storage medium, such as a magnetic diskette. Step 418 represents writing captured data to a storage medium such as a diskette.

Drivers are commonly used by software. For example, on an IBM/DOS platform running MicroSoft "Windows" most applications programs have setup menus that permit the selection of any printers or devices that might be installed. By selecting a device from such a menu, a driver for controlling the selected device is selected behind the scene. When a print command is executed from within an application, the driver communicates the device control codes that operates the device. In the present case, a driver may be employed that emulates a printer driver and that sends screen control codes to a storage medium, such as a diskette, instead of sending printer control codes to a printer.

After the screen control codes have been placed onto a diskette, as in element 401b in FIG. 28, the information may be accessed by reading the diskette, as in step 302. Reading the diskette places the screen control codes 305 into the tablet RAM. Step 306 involves generating an image, using the data, onto the image display screen 6a of the tablet 1. Element 60 in FIG. 28 represents the displayed image.

Figure 29:
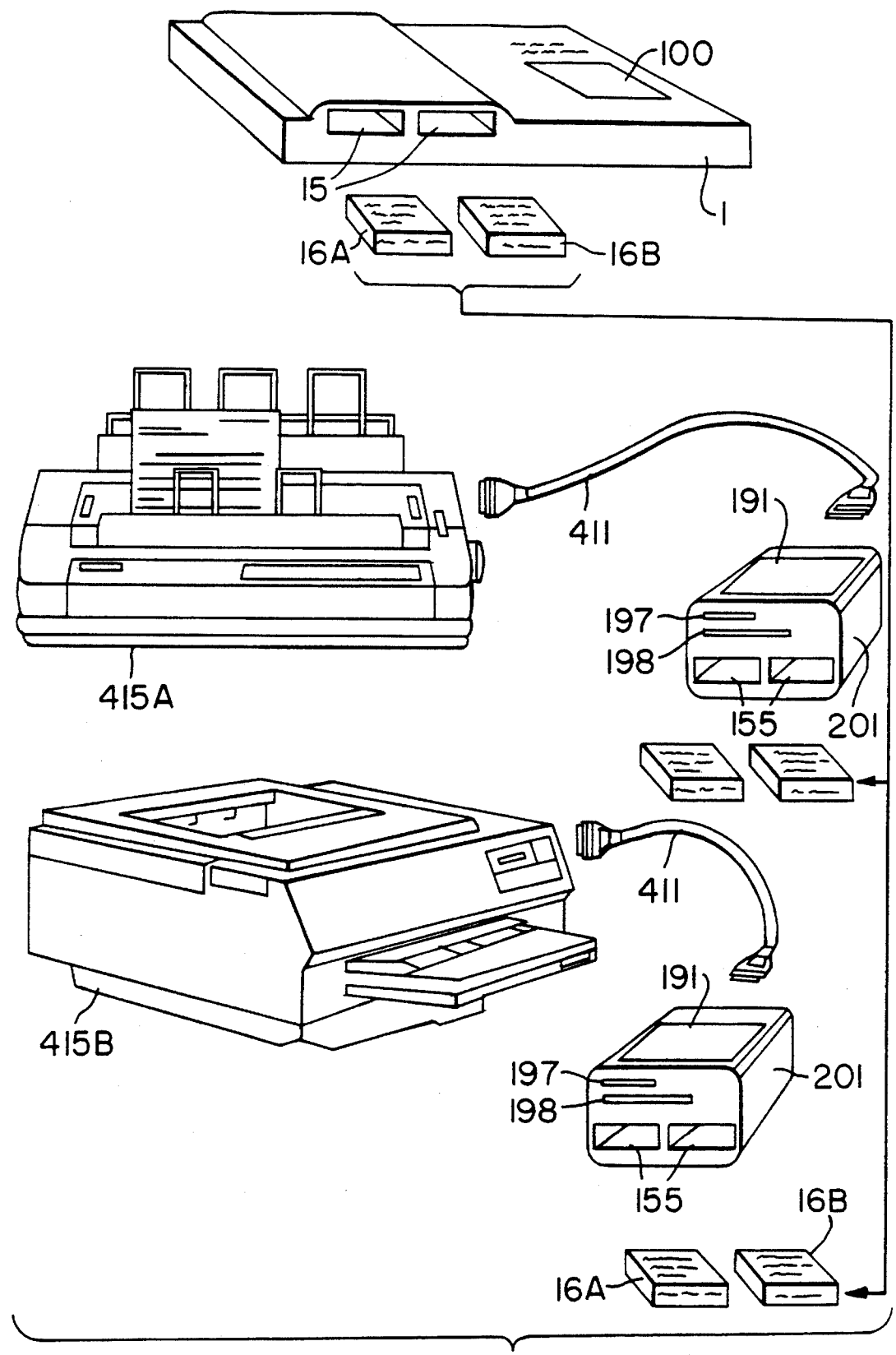
FIG. 29 illustrates an example of how a device controller module and a file interpreter module of a tablet might be "borrowed" by a conventional printer.

FIG. 29 illustrates an example of how the device controller module 16a and the file interpreter module 16b of the tablet 1 might be "borrowed" by a conventional printer. A printer interface adapter 201 is used to provide a means for the conventional printers 415a and 415b to acquire some of the functionality afforded by the option modules 16a and 16b. The printer interface adapter 201 is supplied with option module receiving means 155, which are analogous to the module receiving bays 15 found on tablet 1. In FIG. 29, the interface unit 201 is not furnished with storage device receiving means comparable to 177 of tablet 1. Instead, one 3.5" diskette drive 197 and one 5.25" diskette drive 198 are provided in a fixed mount. The dual format disk drives 197 and 198 may be of the 42 mm twin mount variety, to conserve space. An operator's console 191 may be found on the top of the unit 201. The operator's console 191 has similar characteristics to the operator's console 100 of tablet 1. The interface unit 201 is connected to a printer 415 by an electrical cable 411.

The device controller module 16a may supply the means to control diskette drives 197 and 198. The file interpreter module 16b may supply data interpretation means, so that the data files read by the disk drives 197 and 198 may be printed by the printers 415a and 415b. Because the file interpreter module 16b contains instructions for generating the screen control codes 305 of the tablet 1, a second level of translation may be required in order to properly control the printers 415a and 415b. The instructions for translating screen control codes into, for instance, HP-PCL (a printer control language) may be supplied by a user-installable ROM which may be installed at the outset, when the interface unit 201 is first attached to the printer 415b. Alternate embodiments of the file interpreter module 16b may, however, be equipped with "extended" interpretation capabilities that include instructions for translating native format data into either screen control codes, or printer control codes. When the screen control codes are comprised of a language such as Postscript, for example, and the printer control language is also Postscript, translation naturally would not be required. As would be recognized by persons skilled in the art, the principles of operation and construction of the interface unit 201 would be similar to the concepts presented above.

Figure 30A:
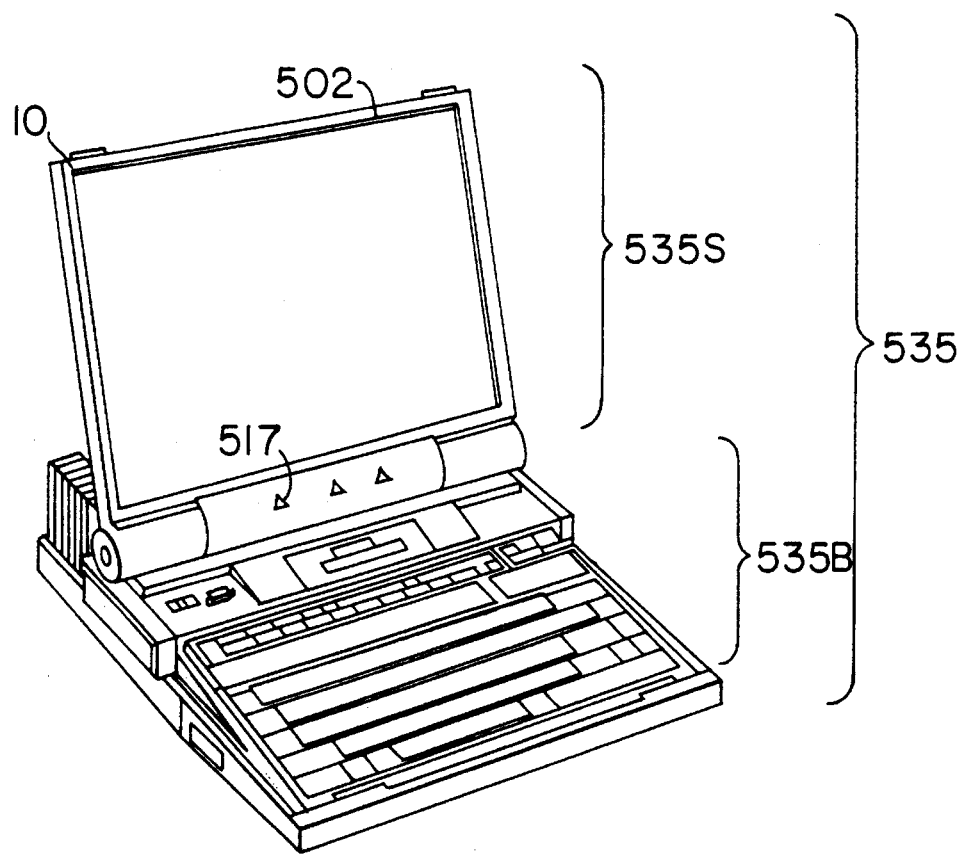
FIGS. 30(a)–30(c) through 32 illustrate an embodiment of a portable computer constructed specifically to permit data to be "printed" by using a display screen with a copier.
Figure 30B:
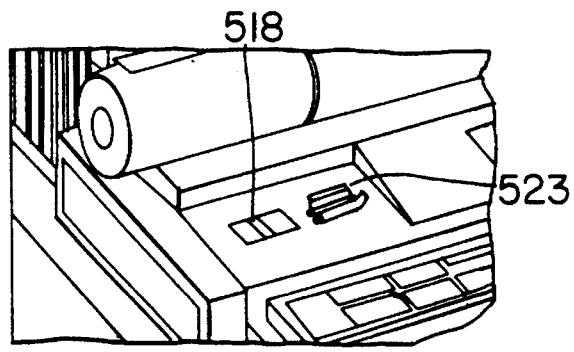
Figure 30C:
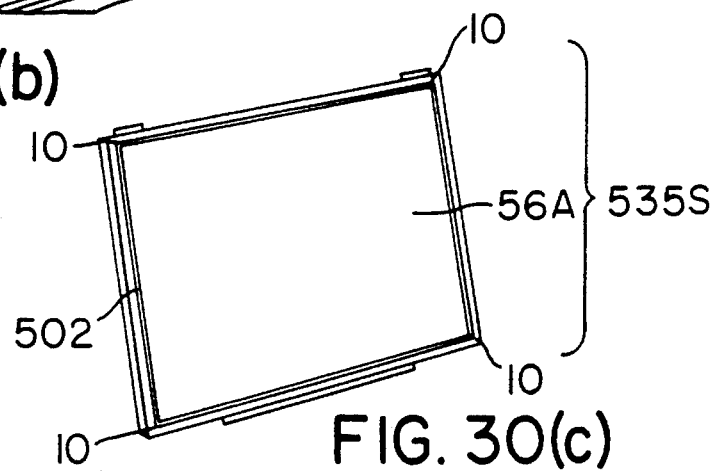
Figure 31:
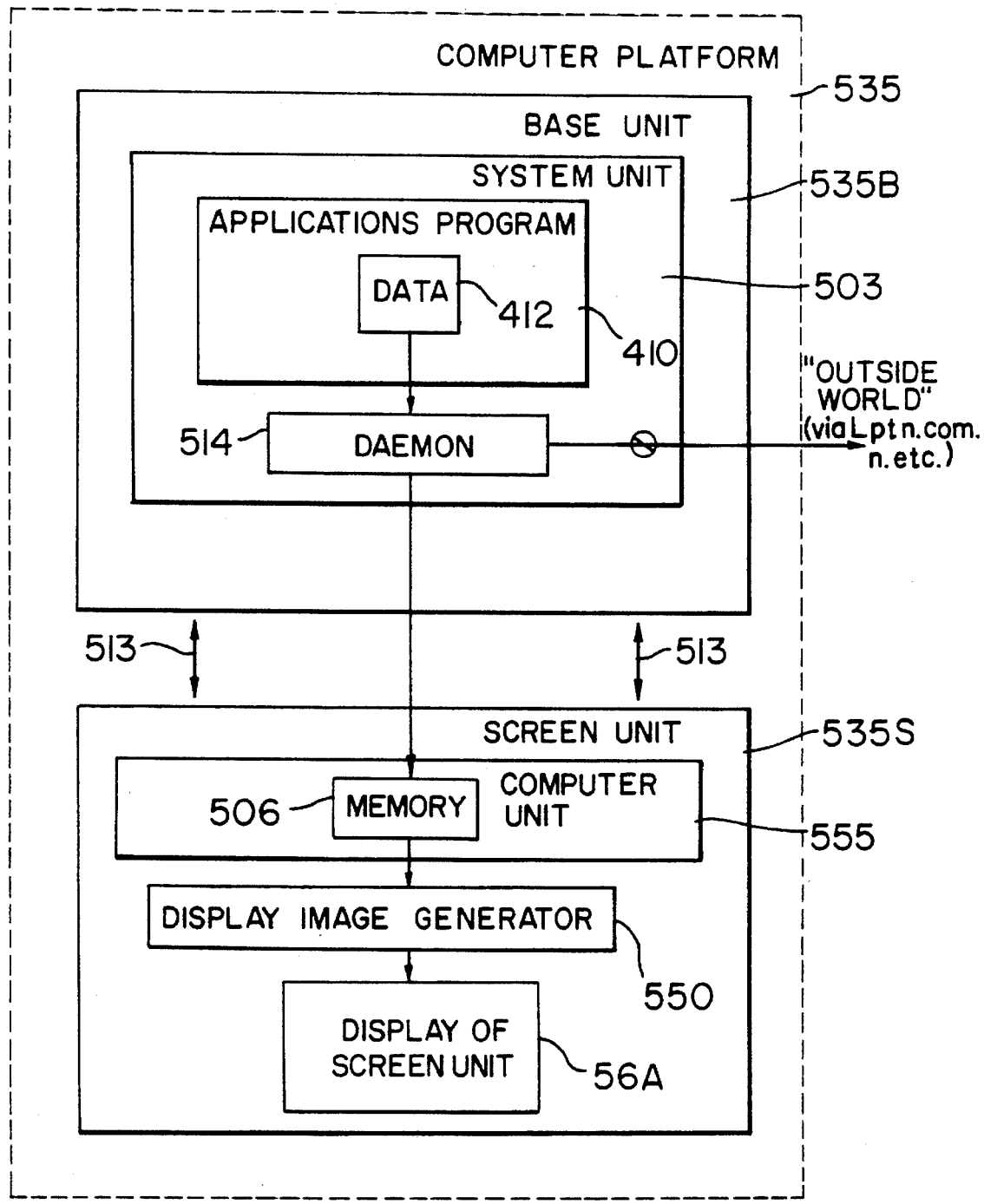
Figure 32:
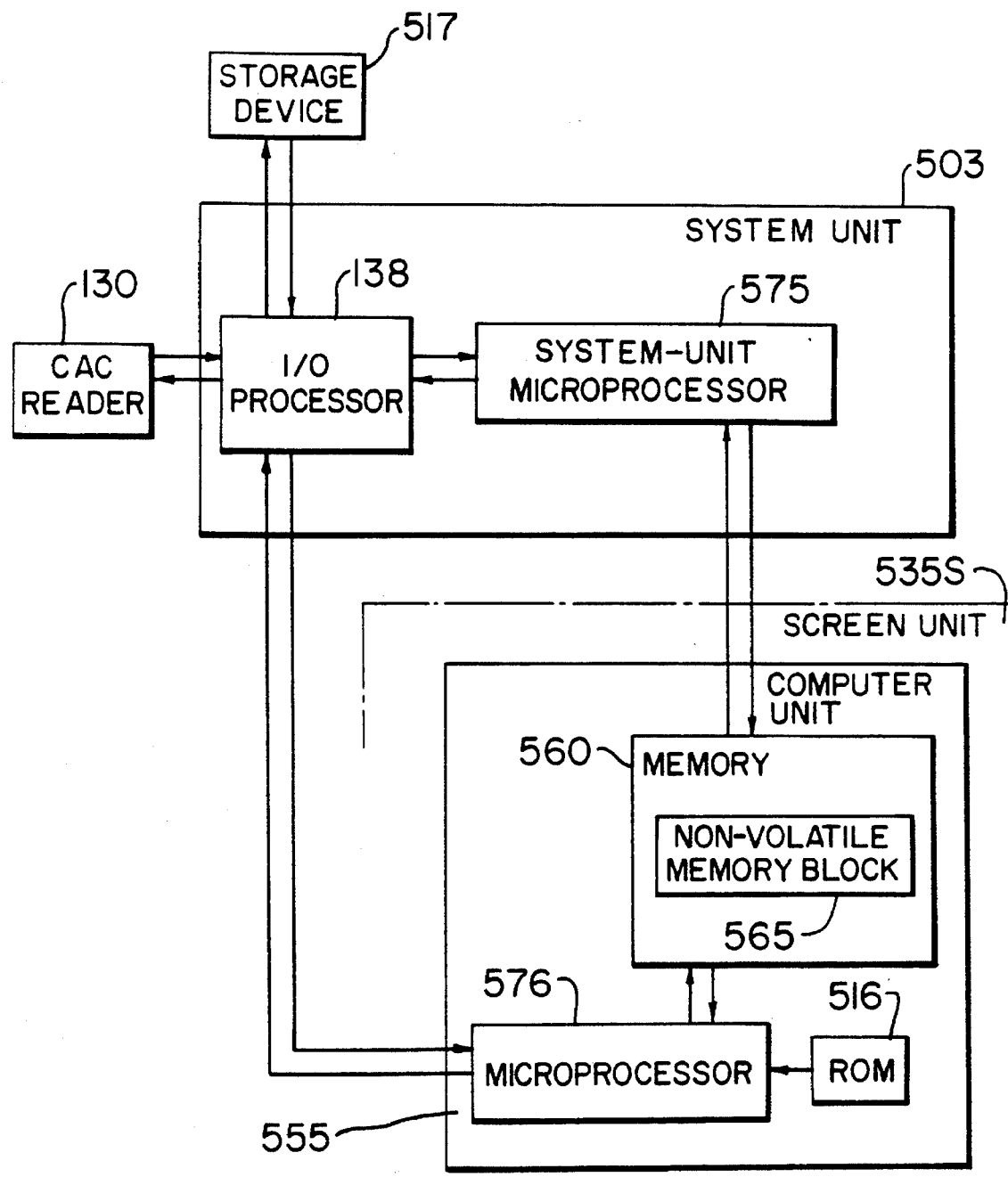

FIGS. 30 through 32 illustrate an embodiment of a portable computer constructed specifically to permit data to be "printed" by using its display screen with a copier. As shown in FIGS. 30(a) and 30(c), the portable computer 535 comprises a base unit 535B and a detachable screen unit 535S having a display 56A. Around the perimeter of the display element 56A is a light gasket 502 for keeping ambient light from leaking in between the display 56A and the copier window 5. The light gasket 502 may comprise any suitable, flexible material (e.g. rubber). At the corners of the display element 56A are a set of sensors 10 for detecting copy execution. A set of LED's 517 in the form of arrows point towards the screen unit 535S. Whenever print data is being diverted to the screen unit 535S, the LED's 517 blink to indicate that a data stream is being captured by the screen unit.

A spring-loaded switch 518 may be slid to the left or to the right of a detente, center position (see FIG. 30(b) ). The "normal" setting 521 of the switch 518 allows data queued for printout by the computer 535 to be routed to the parallel or serial ports of the computer. In the "normal" setting 521, the execution of a print command from within an applications program would cause the data stream intended for printout to be sent to whichever output port or device has been selected in software. This is similar to what conventionally occurs when a print command is executed on an ordinary computer. The switch position 523, located to the right of the center, detente position, and having a small copier icon associated with it, causes a data stream queued for printout to be diverted to the screen unit 535S.

FIG. 31 illustrates an example of the data capture process of the portable computer 535. As shown, the portable computer 535 comprises a base unit 535B and a screen unit 535S. The arrows 513 indicate that the screen unit 535S may be detached from the base unit 535B. The base unit 535B includes a system unit 503 for running applications software 410. The software program 410 creates the data 412. In screen capture mode, whenever the computer operator executes a print command from within applications program 410 to send the data 412 to the "outside world" 357 (e.g. via Lpt 1 or 2), the data stream is instead intercepted by a software daemon 514 and sent to a capture unit 555 in the screen unit 535S. "Daemons" are a member of a larger class of RAM resident software processes that "transparently" perform specific tasks in the background. Daemons and TSR's (Terminate but Stay Resident programs) may be invoked by "Hot-Key" sequences, interrupts, or by conditions that may arise during the course of normal system operation. The entire length of object code required to perform the task for which the daemon is responsible need not be RAM resident. Rather, there may be a smaller portion of the complete code which, when activated, would load the remainder of the code which would subsequently perform the function. These concepts are familiar to software engineers. An example of a TSR (or daemon) might be a program that handles facsimile reception on a computer. When the facsimile hardware detects a call on its phone line, the TSR (or daemon) is invoked to service the incoming fax transmission. In the present case, the daemon 514 is invoked by the execution of a print command, or by an attempt to place data onto a serial or parallel port of the computer 535. The data stream that is queued for output via the serial or parallel port is instead sent to a capture unit, identified as 555 in FIG. 31. The capture unit 555 is described further in connection with FIG. 32.

Data sent to the memory 560 of the capture unit 555 may be in a number of different possible formats. It is possible to construct the daemon 514 to write the actual screen control codes 305 used by the video adapter into the memory 560. For instance, the daemon 514 may include a software driver that emulates a printer driver, but which is used to generate screen control codes instead of printer control codes. This is similar to a technique used by some computer facsimile programs to capture a print stream and to transmit it as a fax document, rather than to an actual printer. The Fax TSR of such devices includes a driver that writes the print data as transmission-ready fax data, rather than as a stream of printer control codes used to drive a printer. In the present case, where screen control codes are placed into the memory 560 of the screen unit 535S, the capture unit 555 would not have to perform further translation on the data before it may be interpreted by the video hardware. The capture unit may, in such instances, merely comprise the memory 560. In contrast, in some embodiments it may be preferable to have the daemon 514 place into the memory 560 print stream data in an intermediate format. For example, it may be desirable to perform compression on the data before it is placed into the memory unit 560. The purpose of writing compressed, intermediate format data into the screen unit memory may be to permit lengthier documents to be loaded into the detachable screen unit 535S. This intermediate format data would then need to be converted into usable screen control codes by the capture unit. Also shown in FIG. 31 are a video adapter 550 and a display screen 56A of the computer 535. The video adapter 550 uses the screen control codes 305 to generate displayable images on the display 56A.

FIG. 32 illustrates an embodiment of the computer 535 in which the capture unit 555 includes logic for converting intermediate format capture data into usable screen control codes. Such may be the case where the daemon print stream diverter 514 does not write usable screen control codes into the memory 560. The top of FIG. 32 illustrates the system unit 503 and some peripheral devices with which it may communicate. The peripheral devices include a storage device 517, such as a fixed disk drive, and a compatibility assurance card reader 130 (an example of which is described above in connection with FIG. 22). Also included is an I/O Processor 138, which acts as an intermediary between the peripheral devices 130 and 517 and the rest of the system. The capture unit 555 is illustrated as being within the detachable screen unit 535S. In the illustrated configuration, the capture unit 555 includes a microprocessor 576, a ROM 516, and a memory block 560. The applications software 410 shown in FIG. 31 may, in fact, be run by the system unit microprocessor 575. Moreover, the software daemon 514 may also be run by microprocessor 575. When daemon 514 re-directs print data to the capture unit 555, it is actually causing the microprocessor 575 to place the data into the memory unit 560. Using the instructions contained in the ROM 516, the capture unit processor 576 translates the captured data, that was earlier placed into the memory 560, into the usable screen control codes 305. Also present in FIG. 32 is a block of non-volatile memory 565. The non-volatile memory 565 may be used to retain supplements to the instructions stored in the ROM unit 516. Supplemental or update information may be introduced into the non-volatile memory 565 from a diskette, or it may come from a compatibility assurance card. In the latter case, the compatibility assurance card would be inserted into, and read by, the CAC reader 130.

The present invention enables detection of the amount of misalignment between a tablet and a copier window. The present invention further enables the use of image reorientation techniques, so that an image displayed by a tablet may be reoriented and printed by a copier as if the tablet and the copier window were in alignment, even if the tablet is initially misaligned relative to the copier window. Examples of systems for optimizing the orientation of a hardcopy image generated by a tablet are discussed in greater detail below in connection with FIGS. 33 through 38.

Figure 33:
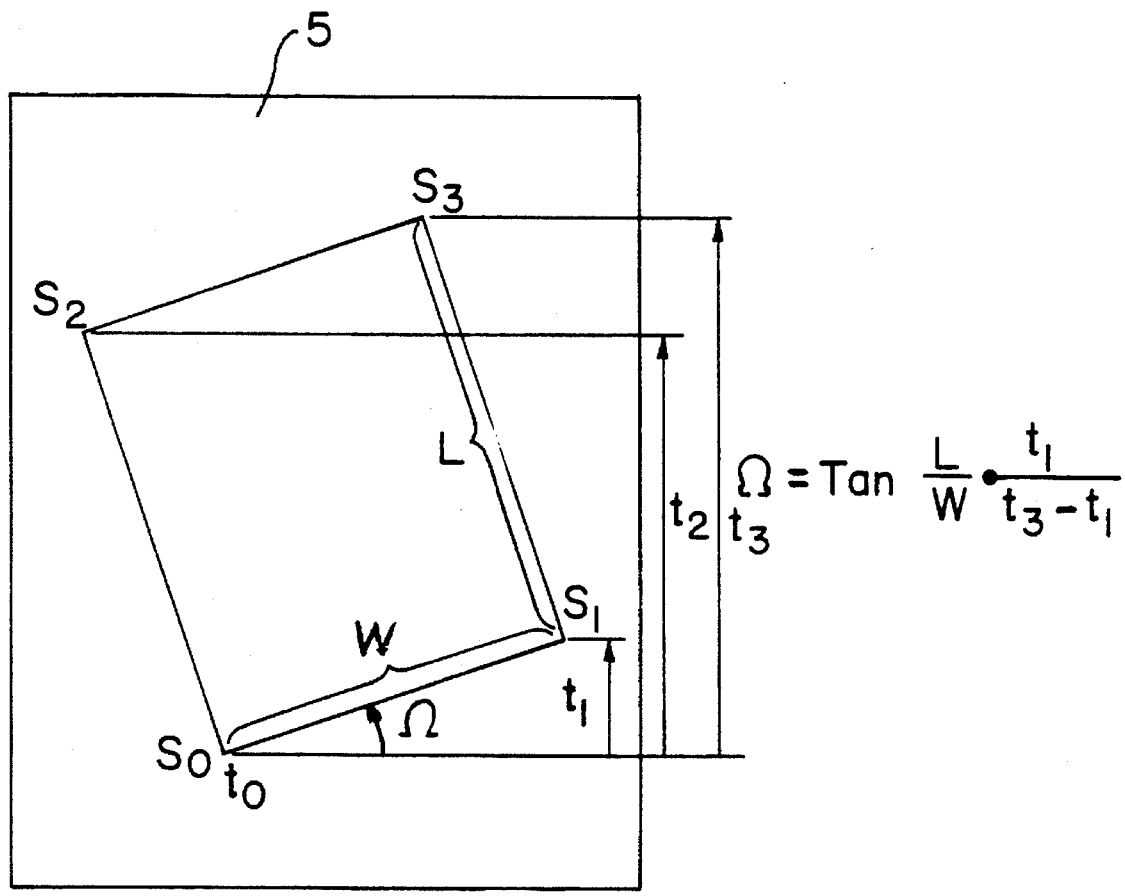
FIG. 33 illustrates an example of a system for optimizing the angular orientation of a hardcopy image generated by an image display screen of a tablet.

FIG. 33 illustrates an example of a system for optimizing the angular orientation of a hardcopy image generated by an image display screen of a tablet. FIG. 33 shows, in schematic form, the image display screen 6 of a tablet 1 in position on top of a copier window 5. The relative position of the image display screen 6 and the copier window 5 may be different each time the tablet 1 is placed on the copier window 5. Consequently, the image displayed by the tablet 1 may occasionally be skewed or misaligned relative to the copier window 5.

As shown in FIG. 33, the tablet 1 defines a rectangle. Each of the four corners of the rectangle may be provided with a corresponding light detecting sensor S. Each one of the four sensors S may provide information to the tablet's microprocessor.

As further shown in FIG. 33, the angle of skew or misalignment between the tablet 1 and the copier window 5 may be designated by $\Omega$. If there is virtually no misalignment between the tablet 1 and the copier window 5, then $\Omega$ is approximately equal to zero.

In the embodiment illustrated in FIG. 33, the light source of the copier scans across the copier window 5 in an upward direction, from the bottom of the page towards the top of the page (as shown by the upward pointing arrows $t_1$, $t_2$ and $t_3$). Consequently, each of the four sensors S is first exposed to light from the copier light source at a different point in time.

As shown in FIG. 33, for example, light from the copier light source will expose sensor $S_0$ first, sensor $S_1$ second, sensor $S_2$ third and sensor $S_3$ fourth. The time intervals between exposure of the different sensors S will be determined by the length L, width W and angular orientation of the tablet 1.

The time at which the first sensor $S_0$ is exposed to the copier 4 light source may be represented by $t_0$. The elapsed time between exposure of the first sensor $S_0$ and exposure of the second sensor $S_1$ may be represented by $t_1$. Similarly, the elapsed time between exposure of the first sensor $S_0$ and the third sensor $S_2$ may be represented by $t_2$, and the elapsed time between exposure of the first sensor $S_0$ and the fourth sensor $S_3$ may be represented by $t_3$.

The width W and length L of the tablet 1 are known constants that may be stored in the tablet's microprocessor. The angle $\Omega$ between the actual angular position of the image and the desired angular position of the image may be calculated by the microprocessor, based upon the information received from the sensors S, in accordance with the following formula:

$$\Omega = \operatorname{Tan}^{-1}(L/W) * (t_1/(t_3 - t_1))$$

The microprocessor thus uses the information received from the sensors S to electronically calculate the angle $\Omega$. Once $\Omega$ has been determined, the tablet 1 may be physically rotated by the calculated angle $\Omega$ to thereby move the image to the desired angular orientation. Alternatively, the microprocessor may use the information received from the sensors S to electronically rotate the image by an angle $\Omega$, from the image's present angular orientation to the image's desired angular orientation. Any number of known techniques may be used to electronically rotate the image by the calculated angle $\Omega$.

Figure 34:
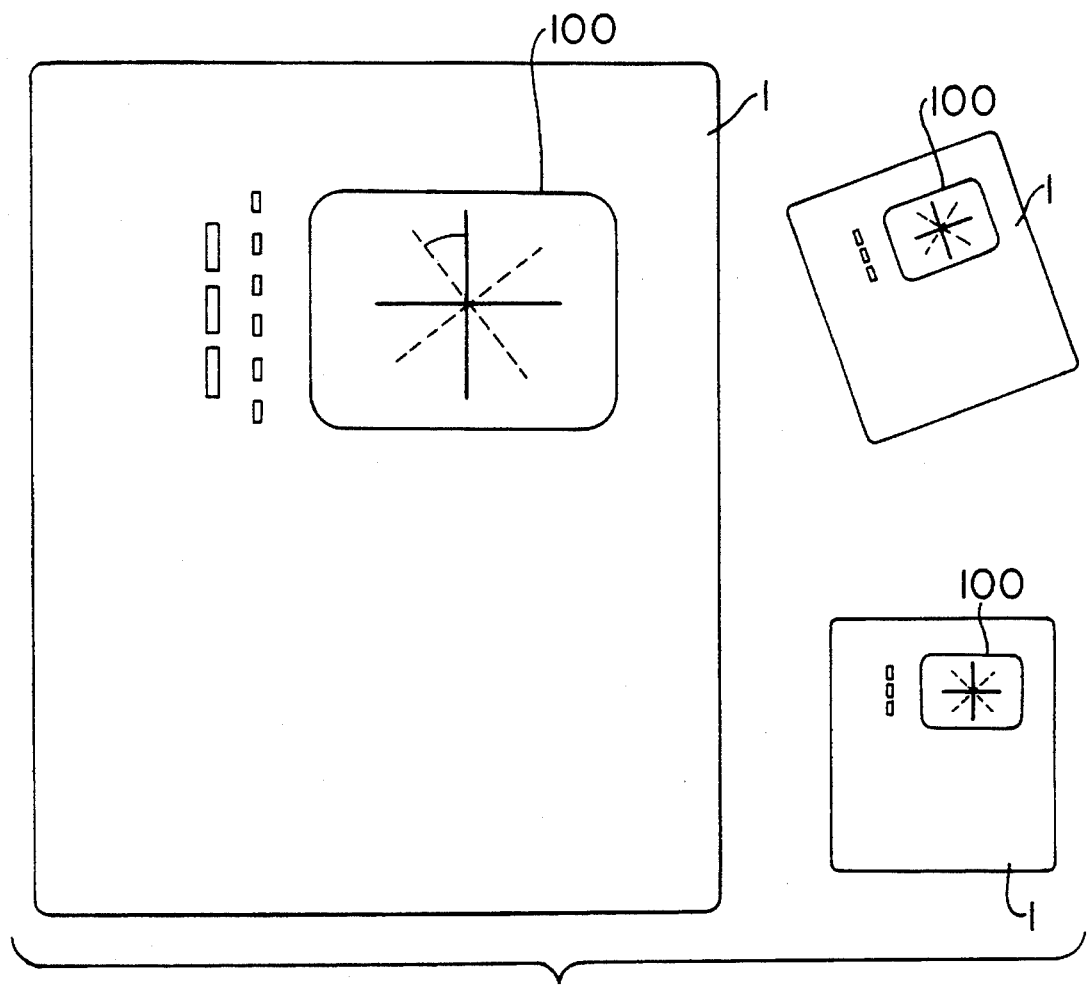
FIG. 34 illustrates an example of an operator's console screen that may be provided on the back of a tablet to visually illustrate a calculated skew angle $\Omega$.

FIG. 34 illustrates an example of an operator's console screen 100 that may be provided on the back of the tablet 1 to visually illustrate the calculated angle $\Omega$. The unbroken cross bars in FIG. 34 depict the image's desired angular orientation. The broken cross bars depict the image's present angular orientation. The angle between the unbroken and broken cross bars corresponds to the skew angle $\Omega$.

Figure 35:
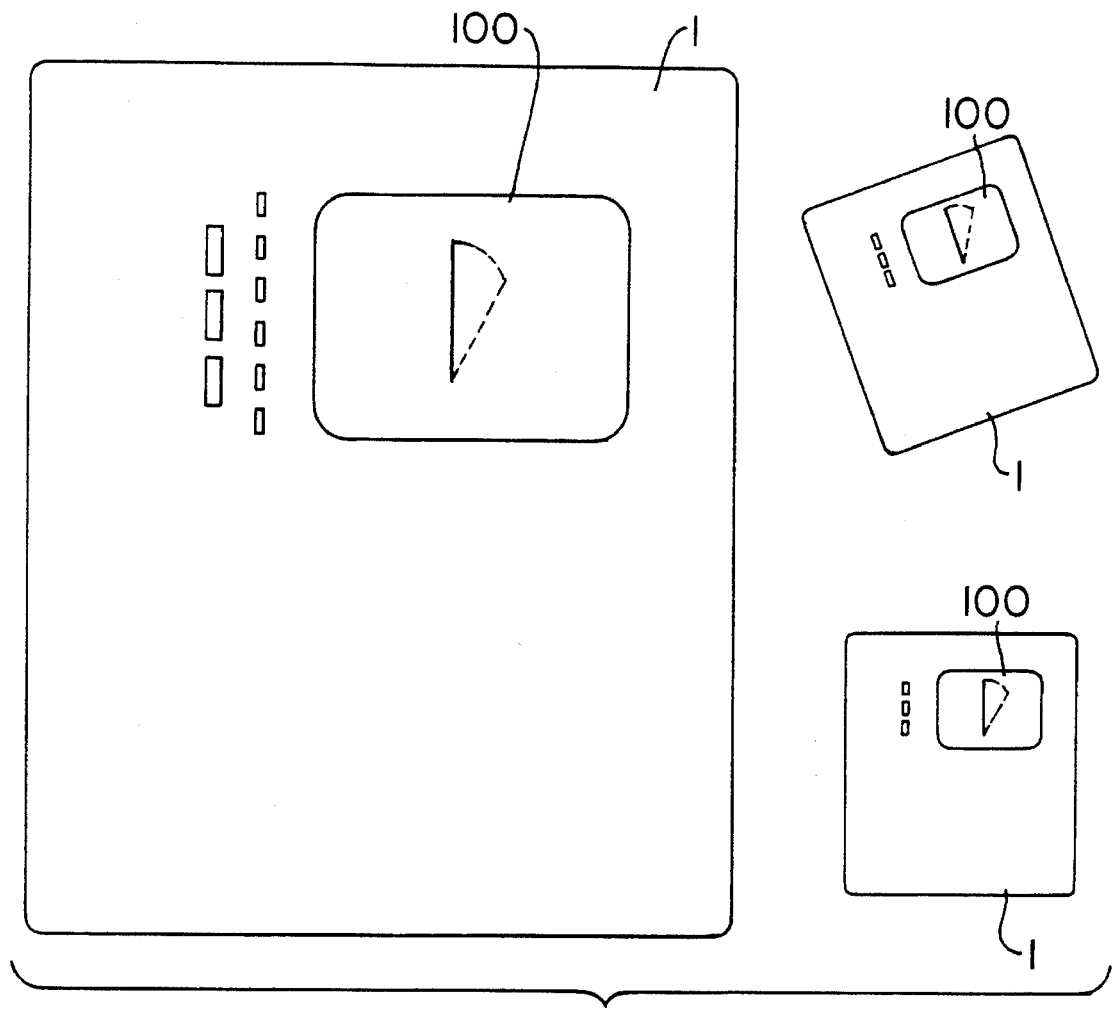
FIG. 35 illustrates an example of an alternative display in which a skew angle $\Omega$ is depicted as an arc of a circle.

FIG. 35 illustrates an example of an alternative display in which $\Omega$ is depicted as an arc of a circle.

FIG. 36 illustrates an example of a system for optimizing the rectilinear orientation of a hardcopy image generated by an image display screen of a tablet. The illustrated system enables the user to define one or more points on the printed page, and then move the image and/or tablet relative to the copier window so that the rectilinear orientation of the image may be optimized.

Figure 36A:
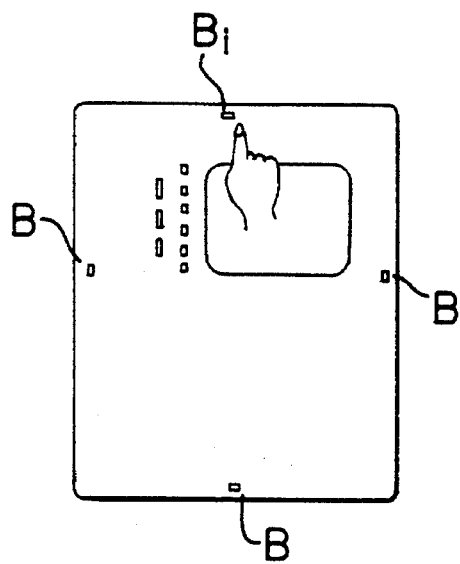
FIGS. 36(a)–36(d) illustrate an example of a system for optimizing the rectilinear orientation of a hardcopy image generated by an image display screen of a tablet.

As shown in FIG. 36(a), four buttons B may be provided on the back of the tablet 1. Each one of the four buttons B is associated with a corresponding one of the four edges of the tablet 1. The buttons B provide data input to the tablet's microprocessor. Depressing any one of the buttons B will cause the tablet 1 to produce an image of a dot D on the image display screen. The dot image will be located on the edge of the image display screen, at a position substantially corresponding to the location of the depressed button B. The hardcopy output P of the copier will then include a printed dot D at a location on the page P corresponding to the depressed button B, as illustrated in FIG. 36(b). Optionally, each button B on the back of the tablet 1 may include a small LED or other light generating device, so that the button B is illuminated after it is depressed.

Figure 36C:
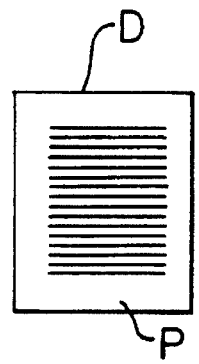
Figure 36B:
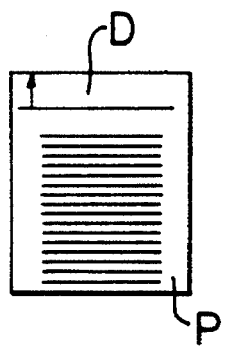

If the image is optimally aligned, then the dot D printed on the hardcopy output P will appear substantially adjacent the edge of the printed page (see FIG. 36(c)). The degree to which the printed dot D is spaced from the edge of the printed page P indicates the degree to which the image must be shifted to correct the rectilinear alignment of the image (see FIG. 36(b)).

Figure 36D:
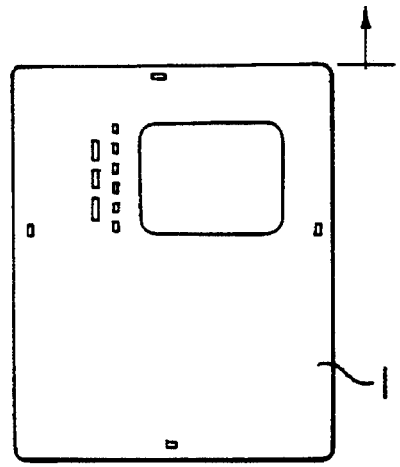

Once the distance of the dot D from the edge of the page P has been determined, the tablet 1 may be physically shifted by the indicated distance to thereby move the image to the desired rectilinear orientation (see FIG. 36(d)). Alternatively, the image may be shifted electronically from the image's present rectilinear orientation to the image's desired rectilinear orientation. Any number of known techniques may be used to electronically shift the image by the required distance.

Figure 37:
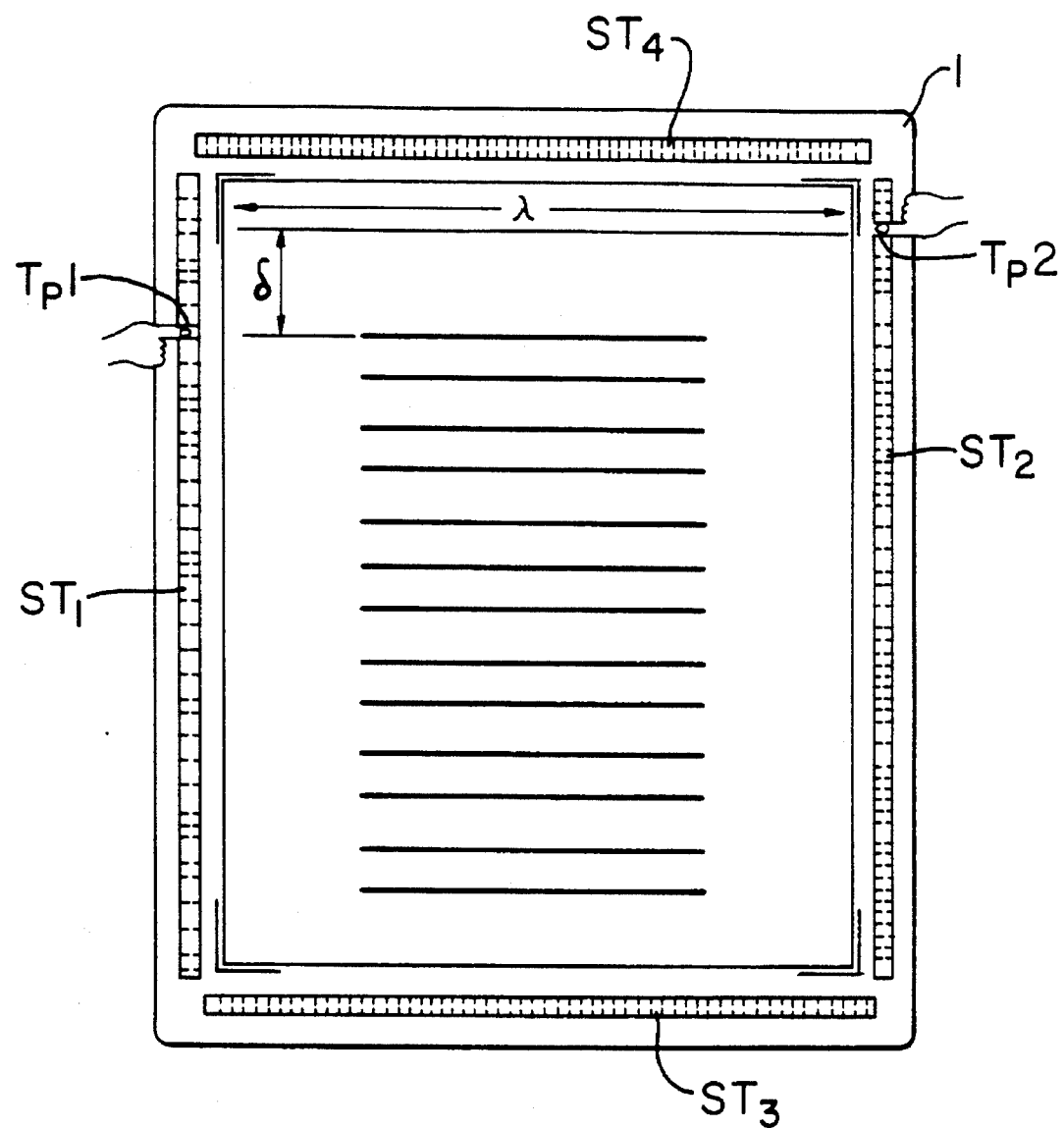
FIG. 37 illustrates an example of an alternative system for optimizing the rectilinear orientation of an image on a printed page.

FIG. 37 illustrates an example of an alternative system for optimizing the rectilinear orientation of the image on the printed page. As shown in FIG. 37, the back of the tablet 1 defines a rectangular frame configured to receive a printed page P from a copier. The rectangular frame defines four edges. Each of the four edges is provided with a corresponding electronic touch sensitive strip ST. The touch sensitive strips ST provide information to the tablet's microprocessor.

In the example shown in FIG. 37, the strip $ST_1$ illustrated on the left hand edge of the frame is designated as a "FROM" strip. The strip $ST_2$ illustrated on the right hand edge of the frame is designated as a "TO" strip. Similarly, the strip $ST_3$ illustrated on the lower edge of the frame is designated as a "FROM" strip, while the strip $ST_4$ illustrated on the upper edge of the frame is designated as a "TO" strip.

In operation, a printed page P from a copier is first placed into the frame on the back of the tablet 1. In the example illustrated in FIG. 37, the printed page P contains several lines of printed text. If the user wishes to shift the image upward, as shown in FIG. 37, then the user first touches a point on the left hand "FROM" strip $ST_1$ corresponding to the actual location of the first line of text on the printed page P. This sends an electronic signal to the microprocessor indicating the present position of the printed image. Next, the user touches a point on the right hand "TO" strip $ST_2$ corresponding to the desired location of the first line of text on the printed page P. This sends an electronic signal to the microprocessor indicating the desired position of the printed image. The microprocessor than uses the information received from the "FROM" and "TO" strips to electronically shift the image upward, from the image's present orientation (as indicated by the "FROM" strip signal) to the image's desired orientation (as indicated by the "TO" strip signal). Pages that are subsequently printed by the copier will provide images that are shifted upward by the indicated amount.

In a similar manner, the top and bottom edge strips may be used to reorient the printed image horizontally. If, for example, the user wishes to shift the image rightward, as shown in FIG. 37, then the user first touches a point on the lower edge "FROM" strip $ST_3$ corresponding to the actual location of the text on the printed page P. Next, the user touches a point on the upper edge "TO" strip $ST_4$ corresponding to the desired location of the text on the printed page P. The microprocessor than uses the information received from the "FROM" and "TO" strips to electronically shift the image rightward, from the image's present orientation (as indicated by the "FROM" strip signal) to the image's desired orientation (as indicated by the "TO" strip signal). Pages that are subsequently printed by the copier will provide images that are shifted rightward by the indicated amount.

It should be appreciated that either strip of the pair of strips parallel to the length of the tablet, or of the pair of strips parallel to the width of the tablet, may serve as a "FROM" strip or as a "TO" strip. The designation of "FROM" or "TO" is relative to which strip of the pair is touched first.

Figure 38:
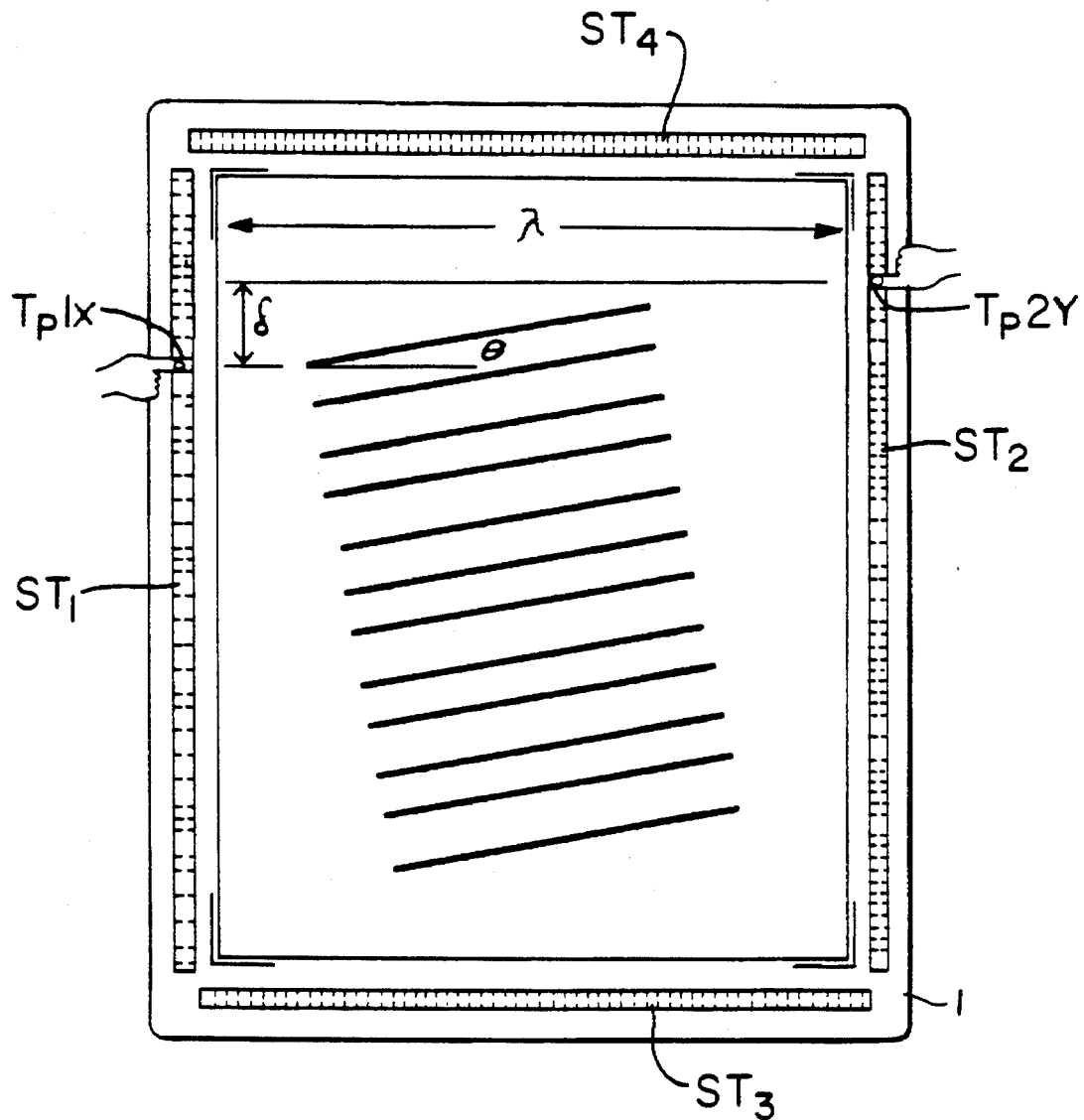
FIG. 38 illustrates an example of an alternative system for optimizing the angular orientation of an image on a printed page.

FIG. 38 illustrates an example of an alternative system for optimizing the angular orientation of the image on the printed page P. The system for optimizing angular orientation shown in FIG. 38 is essentially similar to the system for optimizing rectilinear orientation shown in FIG. 37.

As shown in FIG. 38, the back of the tablet 1 defines a rectangular frame configured to receive a printed page P from a copier. The rectangular frame defines four edges. Each of the four edges is provided with a corresponding electronic touch sensitive strip ST. The touch sensitive strips ST provide information to the tablet's microprocessor.

In the example shown in FIG. 38, the strip $ST_1$ illustrated on the left hand edge of the frame is designated as a "FROM" strip. The strip $ST_2$ illustrated on the right hand edge of the frame is designated as a "TO" strip. Similarly, the strip $ST_3$ illustrated on the lower edge of the frame is designated as a "FROM" strip, while the strip $ST_4$ illustrated on the upper edge of the frame is designated as a "TO" strip.

In operation, a printed page P from a copier is first placed into the frame on the back of the tablet 1. In the example illustrated in FIG. 38, the printed page P contains several lines of printed text. If the user wishes to rotate the image clockwise by an angle θ, as shown in FIG. 38, then the user first touches a point on the left hand "FROM" strip $ST_1$ corresponding to the actual location of the first line of text on the printed page P. This sends an electronic signal to the microprocessor indicating the present position of the printed image. Next, the user touches a point on the right hand "TO" strip $ST_2$ corresponding to the desired location of the first line of text on the printed page P. This sends an electronic signal to the microprocessor indicating the desired position of the printed image.

The width λ of the printed page P is a known constant that may be stored in the microprocessor memory. The vertical distance δ between the actual location of the image and the desired location of the image may be calculated by the microprocessor, based upon the information received from the "FROM" and "TO" strips. The desired angle of rotation θ may also be calculated by the microprocessor in accordance with the following formula:

$$\theta = \tan^{-1} \delta/\lambda$$

The microprocessor thus uses the information received from the "FROM" and "TO" strips to electronically rotate the image clockwise by an angle θ, from the image's present angular orientation to the image's desired angular orientation. Pages that are subsequently printed by the copier will provide images that are rotated by the indicated amount.

Embodiments of the present invention enable a conventional copier to function as a "receiving end" facsimile printer. In one embodiment a facsimile module may be plugged into the tablet to enable fax data transmitted over standard telephone lines to be intercepted, interpreted, and converted into displayable form. Once present on an image forming screen, the graphical data may be reproduced by a copier. The facsimile information may be directly viewed off of the image forming screen, and thus need not be printed unless desired.

In this manner the present invention provides for both "optical fax" and conventional "hardcopy fax" and permits the user to inspect a transmitted document in its entirety before deciding whether all or only portions are to be printed. Variations on this theme include embodiments possessing document scanning capabilities, so that data transmission is possible, in addition to data reception. Other embodiments may be equipped with storage means so that incoming data may be saved, then printed in a time-shifted fashion at another moment. The information received via fax transmission may include both visual information as well as audio information.

Examples of systems that use the present invention as a fax device are discussed in greater detail below in connection with FIGS. 39 through 52.

Figure 39:
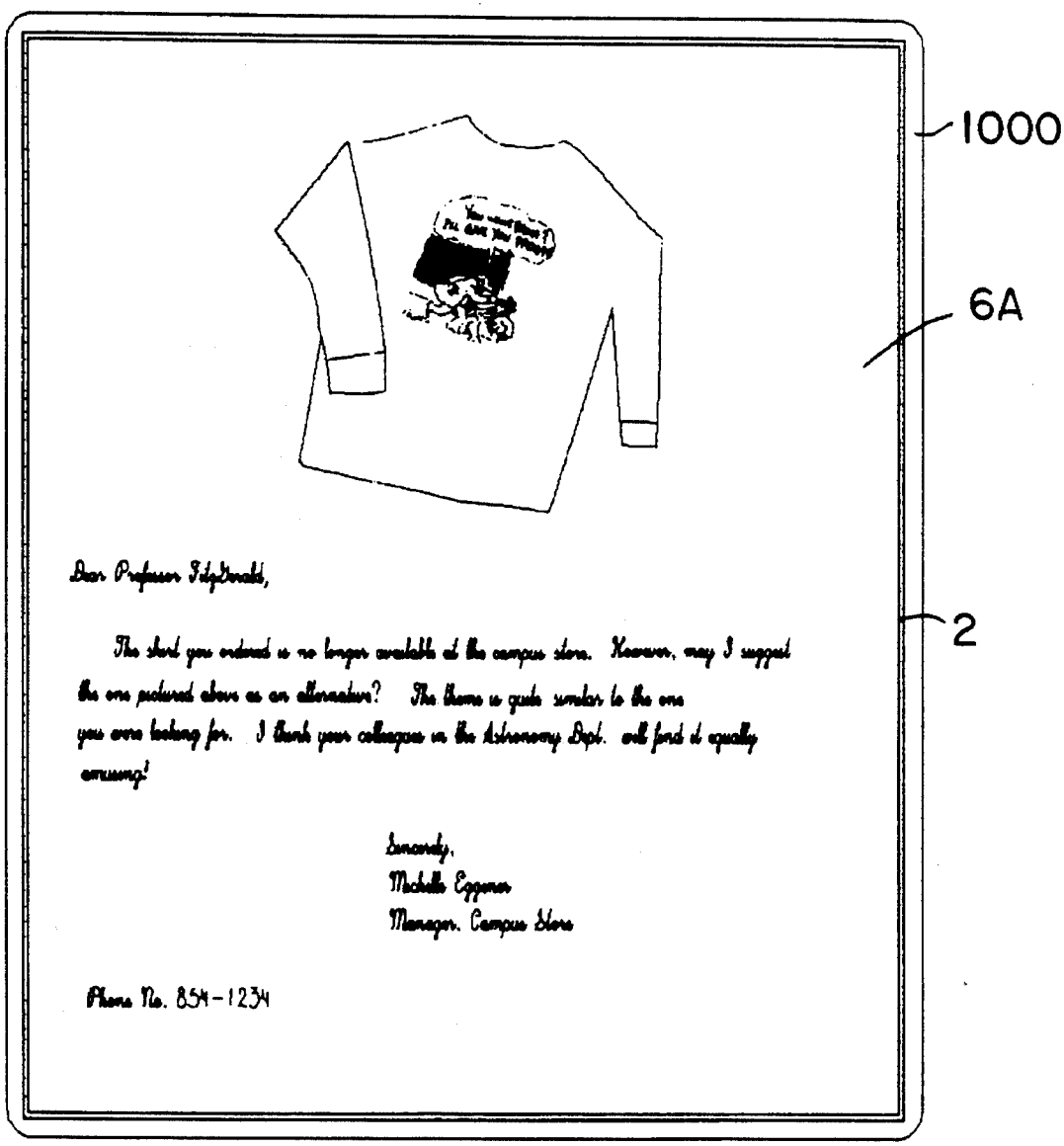
FIG. 39 illustrates an example of how a fax document might appear displayed on an image display screen of a fax tablet.

FIG. 39 illustrates an example of how a fax document might appear displayed on the image display screen 6A of a fax tablet 1000. As shown in FIG. 39, the fax document includes the image of a shirt, a body of handwritten text, and a telephone number. Also represented in the figure is a light gasket 2, located along the perimeter of the display element 6A. The light gasket performs the function of keeping stray, ambient light from leaking in between the display 6A of the tablet and the copier window of the copier while the tablet 1000 is being used with a copier to create hardcopy.

Figure 40:
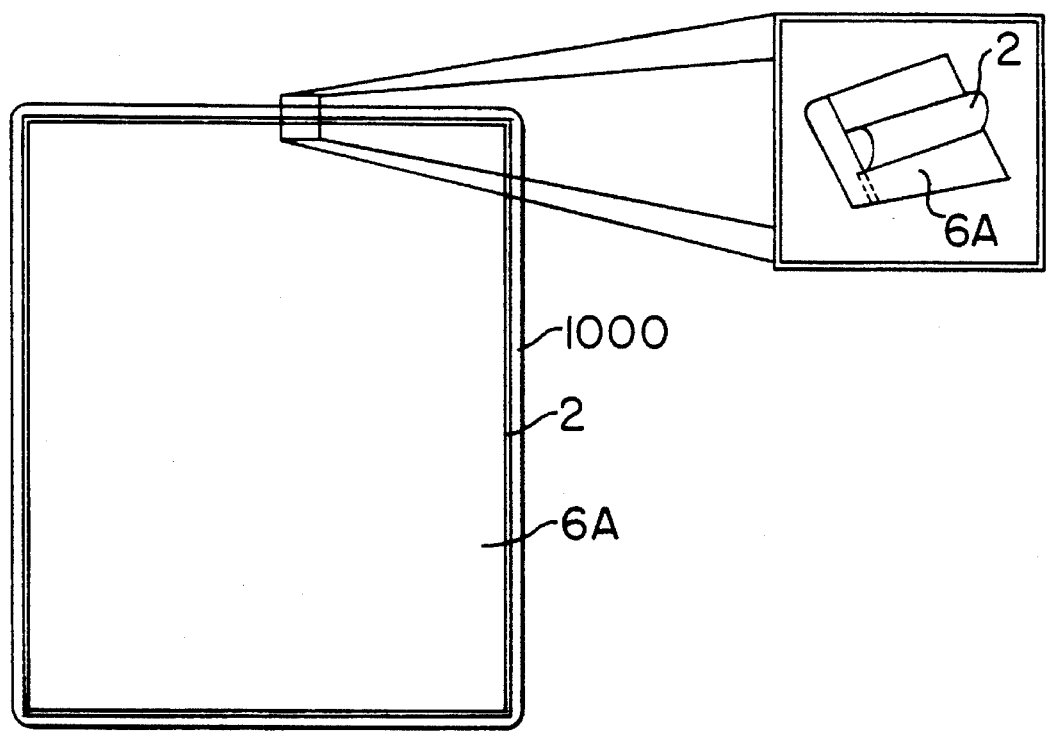
FIG. 40 illustrates an example of a light gasket of a fax tablet.

FIG. 40 illustrates an example of the light gasket 2 of the fax tablet 1000. A portion of the tablet 1000 is shown in an enlarged view to better illustrate the light gasket 2. As shown, the light gasket 2 is in the form of a soft, deformable material layer situated along the perimeter of the display element 6A, that is minutely elevated above the surface of the display screen. The light gasket 2 may be constructed of any suitable, flexible material (e.g. rubber).

Figure 41A:
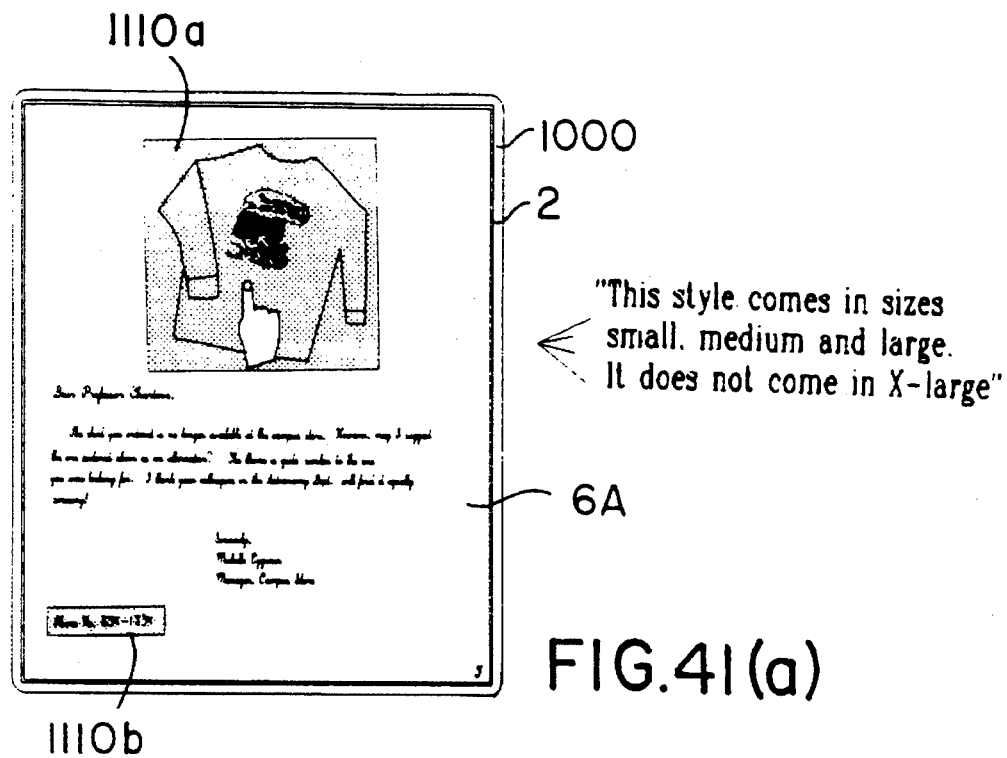
FIGS. 41(a)–41(b) illustrate an example of a procedure for retrieving "Voice Notes" from fax documents containing audio components.

FIGS. 41(a) and (b) illustrate an example of a procedure for retrieving "Voice Notes" from fax documents containing audio components. "Voice Notes" and "Audio Overlays" are novel features of the present fax unit. They permit an audio component, such as a note or memo dictated in the voice of a person sending a fax document, to be incorporated into otherwise conventional fax transmissions. The present invention enables audio overlays to be incorporated into hardcopy fax documents. This permits voice notes to be accessible not only from just-received fax documents, but from fax documents that may have been received long ago, as well as from ones that may have been received by fax units other than the one currently in use. As will be seen, a preferred method employed by the present invention to incorporate audio signals into hardcopy fax documents preserves the "look and feel" of the conventional, plain paper fax documents.

Looking now at FIG. 41(a), the fax document first appearing in FIG. 39 may again be seen on the display screen 6A of the fax tablet 1000. Depicted are a picture of a shirt, a body of handwritten text, and a telephone number. Both the image of the shirt 1110a and the telephone number 1110b are graphically enclosed by boxes that are darkened or otherwise highlighted. These highlighted boxes indicate that there are audio messages associated with the highlighted portions of the fax letter.

The image-forming screen 6A of the fax tablet 1000 is an ATM-style touch-sensitive screen. By touching any of the highlighted regions appearing on the screen 6A, the user may play back the audio message associated with the highlighted portion of the document. A loudspeaker (not shown) included in the tablet may be used to play back the audio messages.

Figure 41B:
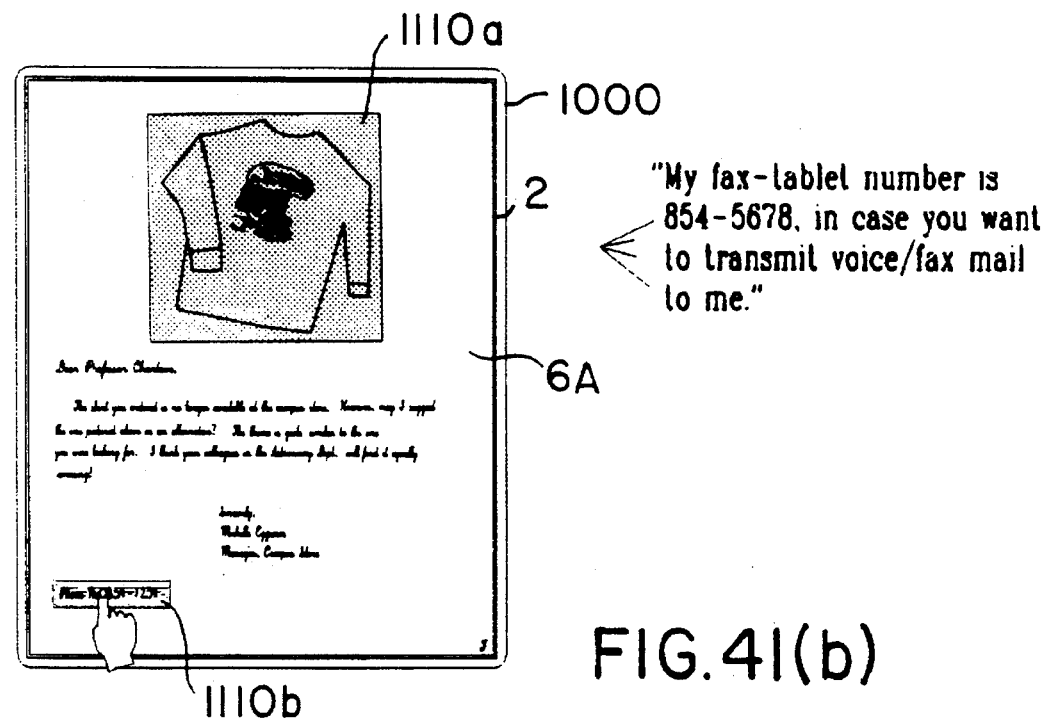

FIGS. 41(a) and (b) illustrate an example of a procedure for playing back the audio component of a fax message. By touching the highlight box 1110a enclosing the image of the shirt as shown in FIG. 41(a), the user causes the tablet 1000 to play back an audio message stating that "This style comes in sizes small, medium and large. It does not come in extra large." By touching the highlight box enclosing the telephone number 1110b as shown in FIG. 41(b), the user will cause the tablet 1000 to play back a received audio message stating that "My fax tablet number 854-5678, in case you want to transmit voice/fax mail to me."

FIGS. 42(a)–(d) illustrate an example of the document scanner facility of the fax tablet 1000. The document scanner facility includes both an audio sub-assembly and a conventional graphic sub-assembly. The audio assembly includes two sub-components: an audio read/write head, and an "audio patch" applicator.

Figure 42A:
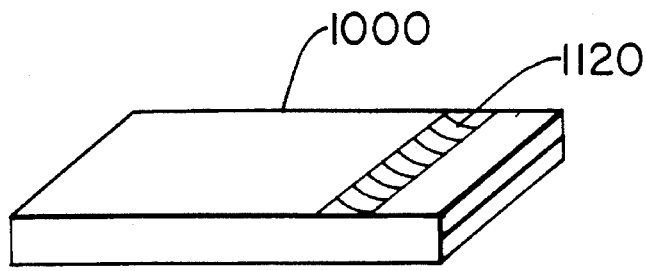
FIGS. 42(a)–42(d) illustrate an example of a document scanner facility of a fax tablet.
Figure 42B:
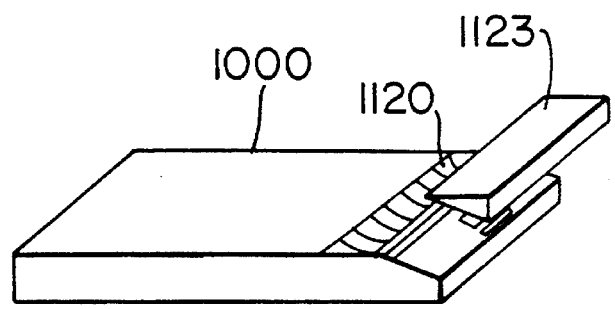
Figure 42C:
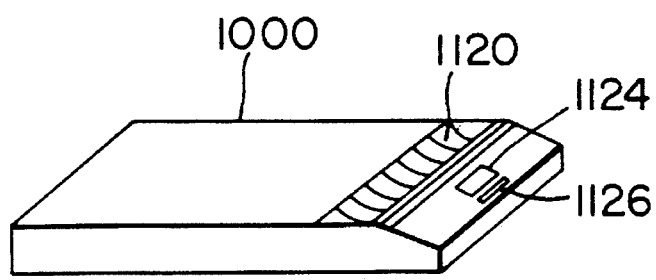
Figure 42D:
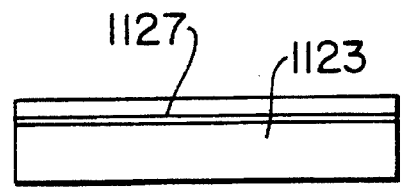

In FIG. 42(a), a document input tray 1120 is shown. The user would place a document into the document input tray 1120 to have the document processed by the document scanner facilities. A document input through the document scanner tray 1120 is transported through the scanner assembly and exits at exit slit 1121. FIG. 42 (b) illustrates the removal of a part 1123 of the tablet 1000 so as to reveal the components of the scanner assembly. FIG. 42(c) shows the audio components of the scanner assembly. Audio read/write means 1126 are pictured as well as an "audio patch" applicator 1124. The audio read/write means 1126 performs the function of reading from and/or writing to an audio patch as a document is being transported through the scanning assembly. The audio read/write means 1126 may comprise a magnetic read/write head, similar to those used in tape recording equipment or to those employed to store and to retrieve data onto an from computer diskettes. The "audio patch" applicator 1124 is in essence a label applicator that applies adhesive labels, having, for instance, a magnetic recording surface layer coated onto the non-adhesive face, onto documents passing through the scanner pathway. FIG. 42(d) shows an optical scanner 1127 on the cut-away portion 1123 of the fax tablet 1000. The optical scanner 1127 may comprise a linear photodetector array similar to those found in optical scanners currently available.

The audio patch retains information for the audio component of a fax document, when the document possesses such a component. In a preferred embodiment, an audio path may comprise a small strip of flexible magnetic material, although other types of recording media may be used (e.g. optical). The substrate of an audio patch might be constructed of a flexible polymer, of treated paper, or it might be constructed of a flexible metal such as aluminum, onto which a recording medium may be applied. The audio patch applicator 1124 applies the audio patch to the back of a document sheet, generated by a copier. The audio patch technique of the present invention enables a fax document to retain the "look and feel" of a conventional, plain paper fax document. Yet it permits the document to retain audio information in addition to the conventional, graphical information.

An entire fax transmission, including both audio and visual information, may be received by the tablet 1000 from a remote audio-capable fax unit and stored in the tablet's memory. The visual information may be played back on the tablet's image display screen, while the audio information may be played back on the tablet's loudspeaker.

Figure 43A:
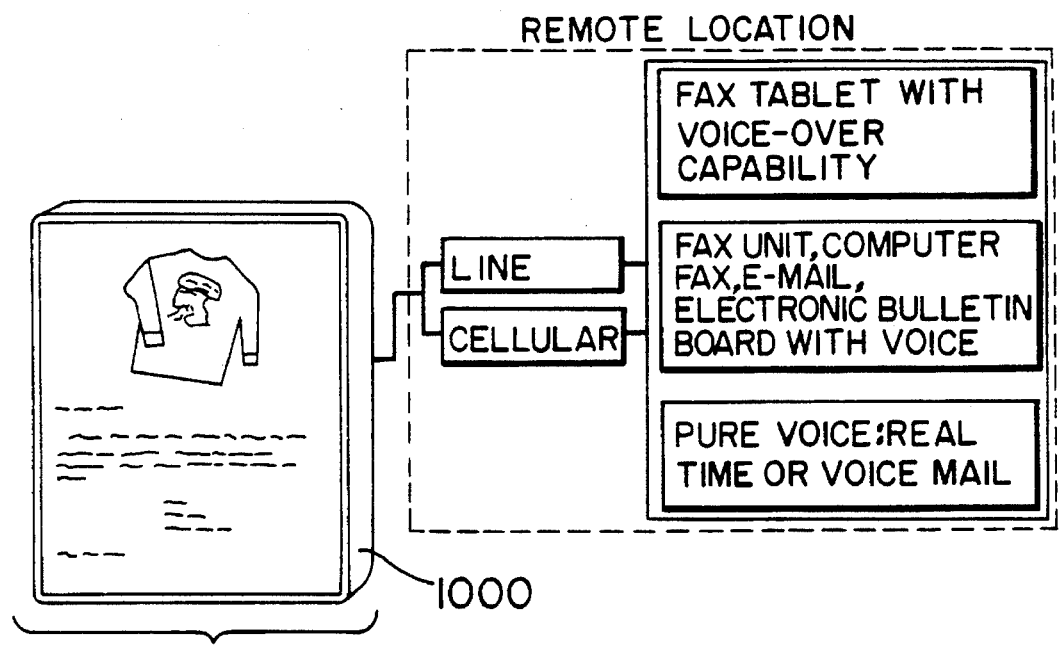
Figure 43B:
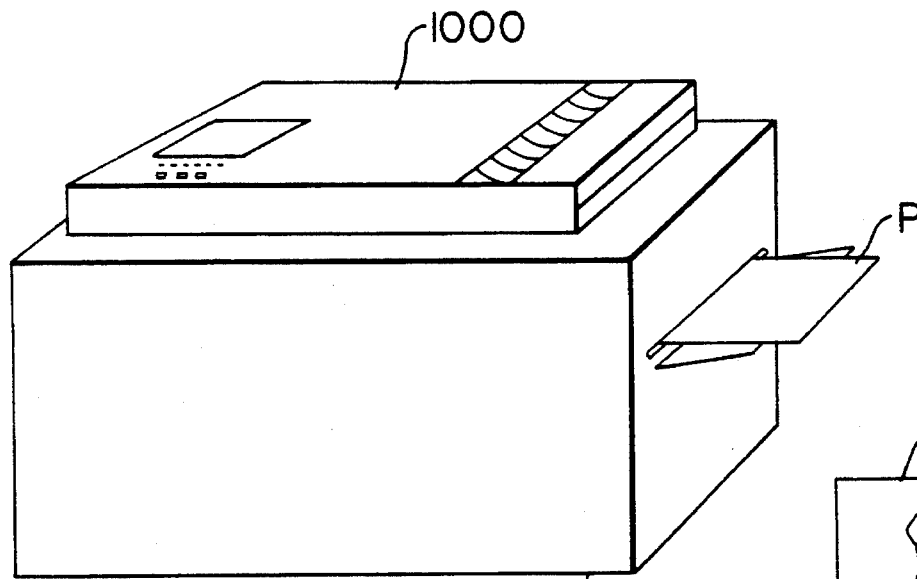
Figure 43C:
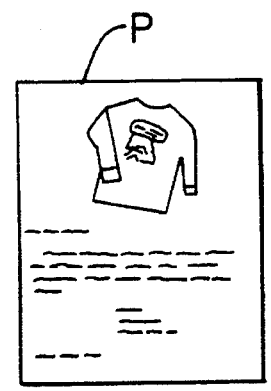

FIGS. 43 and 44 illustrate an example of the process of producing hardcopy of an entire audio-fax document that includes the associated audio messages. The tablet 1000 may first be placed on a copier 4 and plain paper hardcopy P may be generated by the copier in a manner previously described. The plain paper hardcopy P (which is similar in appearance and mechanical properties to that produced by a conventional plain paper fax machine) may then be taken from the copier 4 and fed through the scanning assembly of the fax tablet 1000. As the sheet P is being fed through the scanning assembly, the audio patch applicator 1124 will generate an appropriate audio patch AP (based on the audio information in the tablet's memory) and will apply the audio patch AP to the back of the fax document P. The audio patch AP enables the user to keep the recording of the audio portion of the fax transmission.

FIGS. 44(a) and (b) respectively illustrate an example of the front and back of a page P printed by the copier 4. The back of the page P is blank and has not yet received an audio patch. The printed page P is fed into the scanning assembly as if the user were scanning the page for transmission. The audio patch AP is then applied to the back of the printed page P, as shown in FIG. 44(e).

In an alternative embodiment, the tablet may simply create an audio patch but not apply the audio patch to the back of the printed page. In such an embodiment, the audio patch may be manually applied to the back of the printed page as a separate procedure. The back of the printed page may be provided with printed guide markers to assist in positioning the audio patch.

FIG. 45 illustrates an example of a system for playing back a printed page P having an audio patch AP. FIG. 45(a) illustrates the front of the printed page P containing both text and graphic information. FIG. 45(b) illustrates the back of the printed page P to which an audio patch AP has been applied. The printed page P may be fed through the scanning assembly of the tablet 1000, as shown in FIG. 45(c). The text and graphic information on the front of the printed page P may be scanned by an optical scanner 1127, in a manner well known in the art. The text and graphic information scanned by the optical scanner 1127 may be stored in the memory and displayed on the display image display screen 6 (see FIG. 45 (d)).

The audio patch AP on the back of the printed page P may be read by an audio read/write head 1126. The audio information read by the audio read/write head 1126 may be stored in the tablet's memory and played back through the tablet's loudspeaker.

Figure 45A:
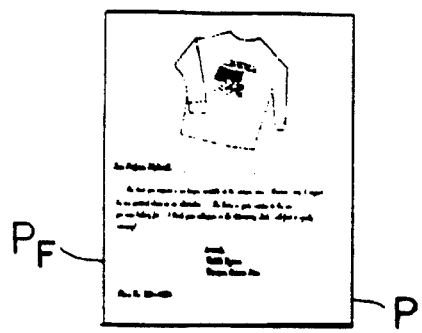
FIGS. 45(a)–45(f) illustrates an example of a system for playing back a printed page having an audio patch.
Figure 45B:
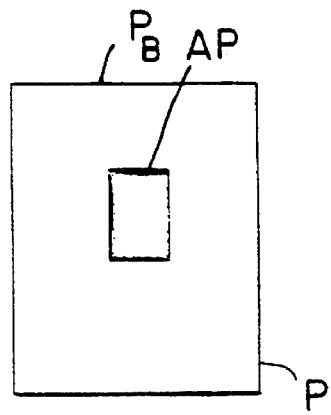
Figure 45C:
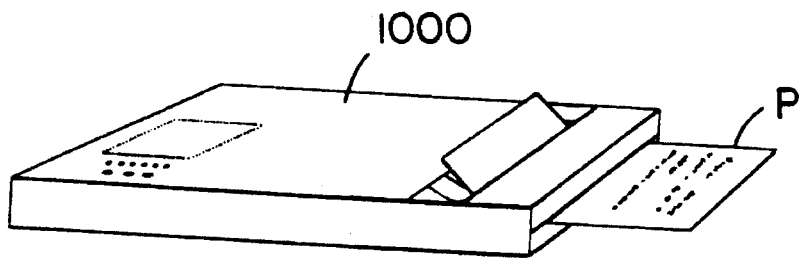
Figure 45D:
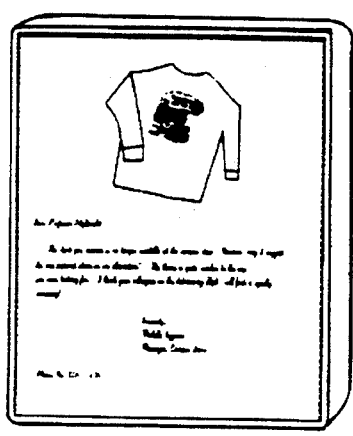
Figure 45E:
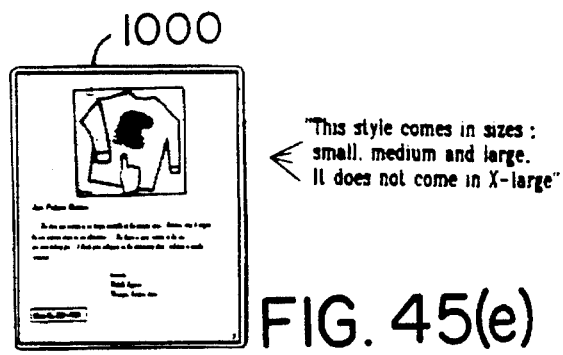
Figure 45F:
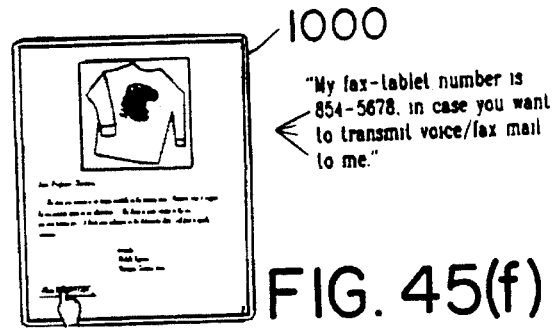
Figure 46A:
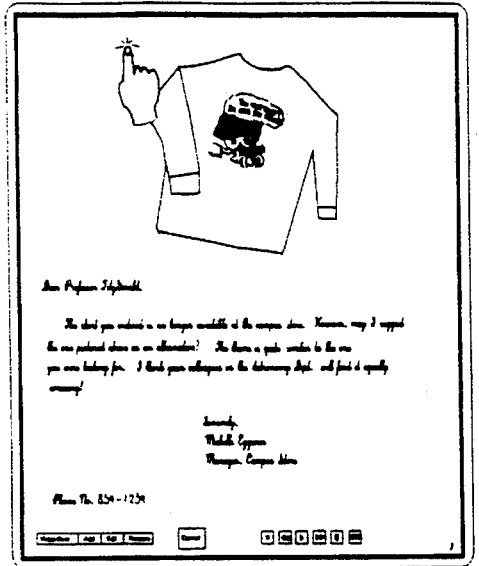
FIGS. 46(a)–46(d) and 47(a)–47(b) illustrate an example of how the audio portion of a fax document ]nay be recorded.
Figure 46B:
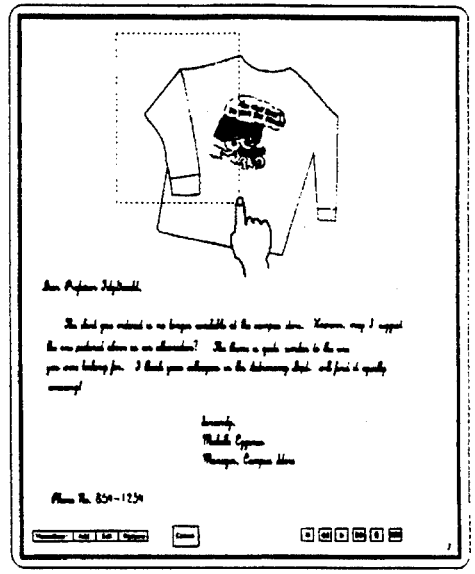
Figure 46C:
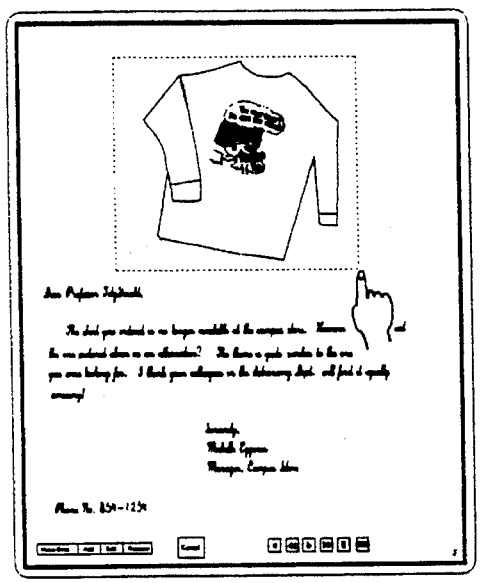
Figure 46D:
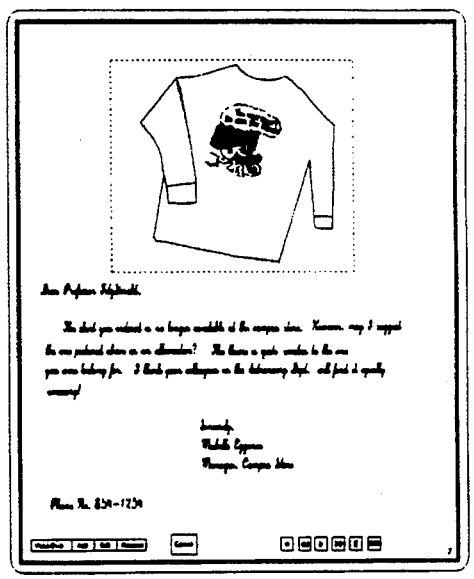

The text and graphic information displayed by the image display screen may include highlight boxes (see FIGS. 45(e) and (f)). Touching a highlight box on the tablet's touch sensitive image display screen causes an associated audio message to be played back through the tablet's loudspeaker. This system enables the user to access the audio information of a fax transmission that may have been received years earlier, or that may have been received by another fax machine.

FIGS. 46 and 47 illustrate an example of how the audio portion of a fax document may be recorded. In FIGS. 46(a) a user's finger is shown on the upper left corner of what will be an audio highlight box. In FIG. 46(b) the user's finger is shown dragging the bottom right corner of the forming highlight box to enclose the image of the shirt. In FIGS. 46(c) the image of the shirt has been completely enclosed within the borders of a highlight box. FIG. 46(d) portrays a completed highlight box defining a region of a fax document for which an audio message may now be recorded.

Figure 47A:
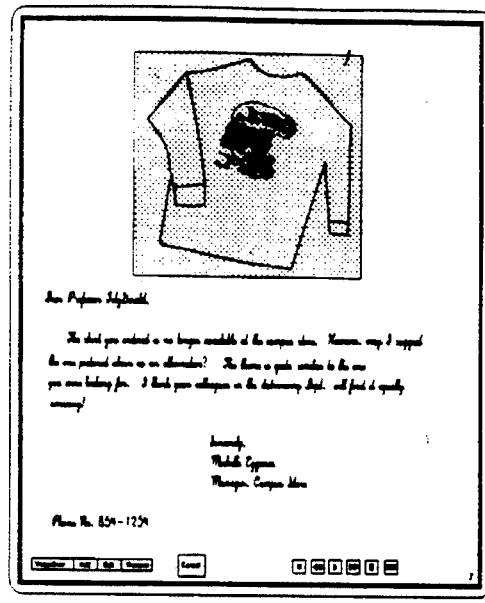
Figure 47B:
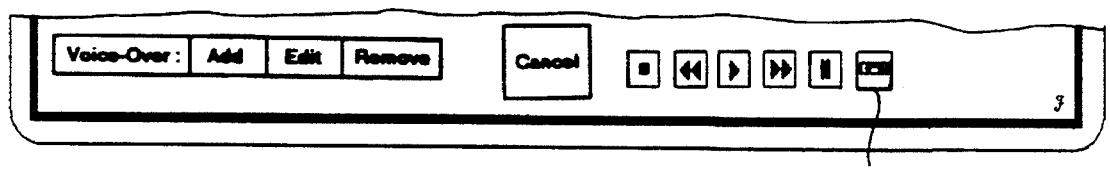

FIG. 47(b) shows an enlargement of several on-screen buttons, including a screen button having the icon of a tape cassette. The screen button may blink to indicate that a region of the document has been selected (highlighted) and is awaiting the recording of an audio message. The user touches the screen button having the icon of the tape cassette, to initiate the audio recording sequence, and begins speaking into a microphone supplied with the tablet. When the dictation of the audio message has been completed, the same screen button is again pressed. An audio overlay message has now been created for that particular, highlighted portion of the document. In FIG. 47(a) the highlight box is darkened to indicate that an audio message is present. In contrast, in FIG. 46(d) the highlight box is clear, and is formed of dotted lines. This indicates that a region has been defined for incorporation of an audio overlay, but that no audio message has yet been recorded.

While the audio overlay examples described above have involved human voice dictations, it is possible for audio overlays to comprise other forms of acoustic material. For example, a fax document containing a list of musical recordings, such as a listing of compact discs, may have a few seconds of sample music included with each title listed. Other varieties of acoustical information may also be with the audio overlays of the present fax unit.

A fax tablet in accordance with the present invention may communicate via either a cellular link or a conventional wire link. A fax tablet in accordance with the present invention may communicate with other, conventional fax machines that do not have audio message capabilities and that do not have image display screen capabilities.

Figure 48:
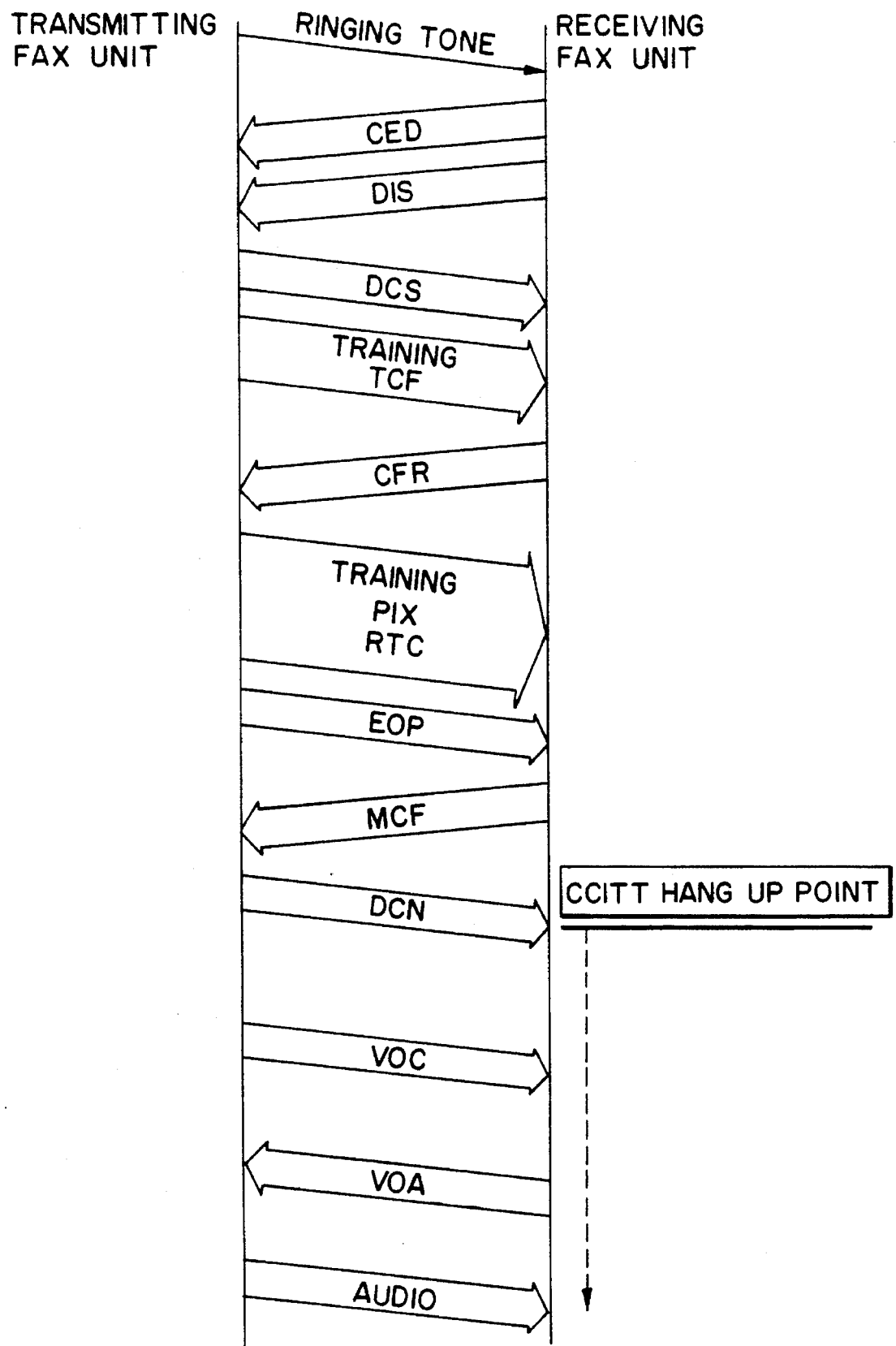
FIG. 48 illustrates an example of a communications protocol for fax transmission.

FIG. 48 illustrates an example of a communications protocol for fax transmission. The illustrated protocol enables a receiving fax unit having audio capability in accordance with the present invention to be used with both prior art transmitting fax units as well as transmitting fax units having audio capability.

As illustrated in FIG. 48, when the transmitting fax unit has completed transmitting conventional (i.e., non-audio) fax information, the transmitting fax unit transmits a disconnect signal ("DCN") to the receiving fax unit. A conventional receiving fax unit will hang up upon receipt of such a disconnect signal.

In the illustrated example, a receiving fax unit having audio capability in accordance with the present invention will not hang up immediately upon receipt of the disconnect signal. Instead, the receiving fax unit waits for a predetermined period of time (for example, fifteen seconds). If the transmitting fax unit is an audio capable unit, then the transmitting fax unit transmits an audio capable signal ("VOC") shortly after transmitting the conventional disconnect signal ("DCN"). If the audio capable receiving fax unit receives the audio capable signal from the transmitting fax unit, then the receiving fax unit sends an audio acknowledge signal ("VOA") back to the transmitting fax unit. Then, the transmitting fax unit begins transmitting the audio component of the fax transmission. After transmission of the audio component is completed, the transmitting unit sends another disconnect signal. The disconnect signal may be identical to the previously sent conventional disconnect signal ("DCN"), with the receiving fax unit being designed to hang up after receiving two cycles of disconnect signals.

Figure 49A:
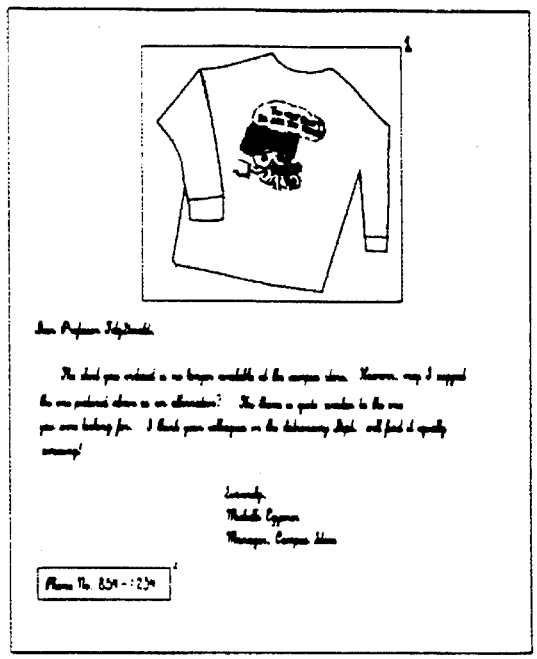
FIGS. 49(a)–49(b) illustrates examples of highlight boxes that are labeled with small superscript identification numerals.
Figure 49B:
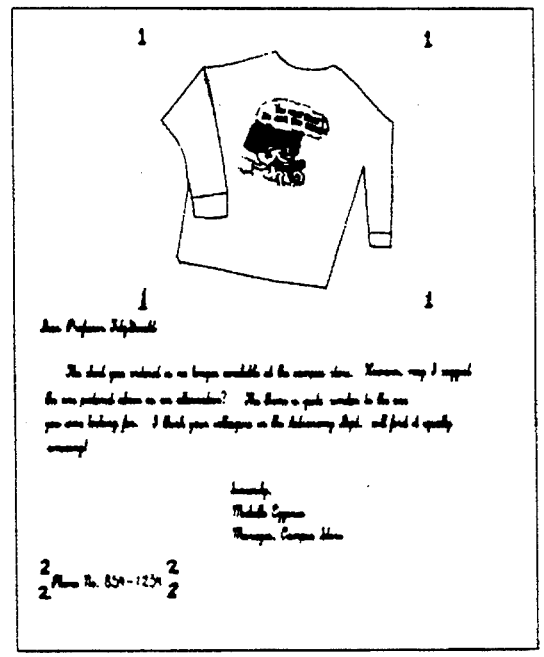

When a fax tablet displays a fax transmission, it may also be programmed to label each separate highlight box with a corresponding identification letter or numeral. FIGS. 49(a) and (b) illustrate examples of highlight boxes that are labeled with small superscript identification numerals. In the illustrated example, the highlight box containing the image of the shirt has been labeled with a superscript identification numeral "1" and the highlight box containing the telephone number has been labeled with superscript identification numeral "2". The primary purpose for such identification numerals is to allow a user to identify and play back specific audio messages without requiring the use of a touch sensitive image display screen.

FIG. 50 illustrates an example of a voice capable desktop fax unit containing an image display screen that is not touch sensitive. In the illustrated example, if the user wanted to hear the audio message identified by the numeral "2" then the user would first place the fax document having an audio patch in the scanning tray of the desktop fax unit. The user would then push a button on the operator's console that says "play voice note #02". The document would be transported through the scanning assembly and an audio read/write means in the desktop fax unit would read and play back the audio message identified by the numeral "2".

Figure 51:
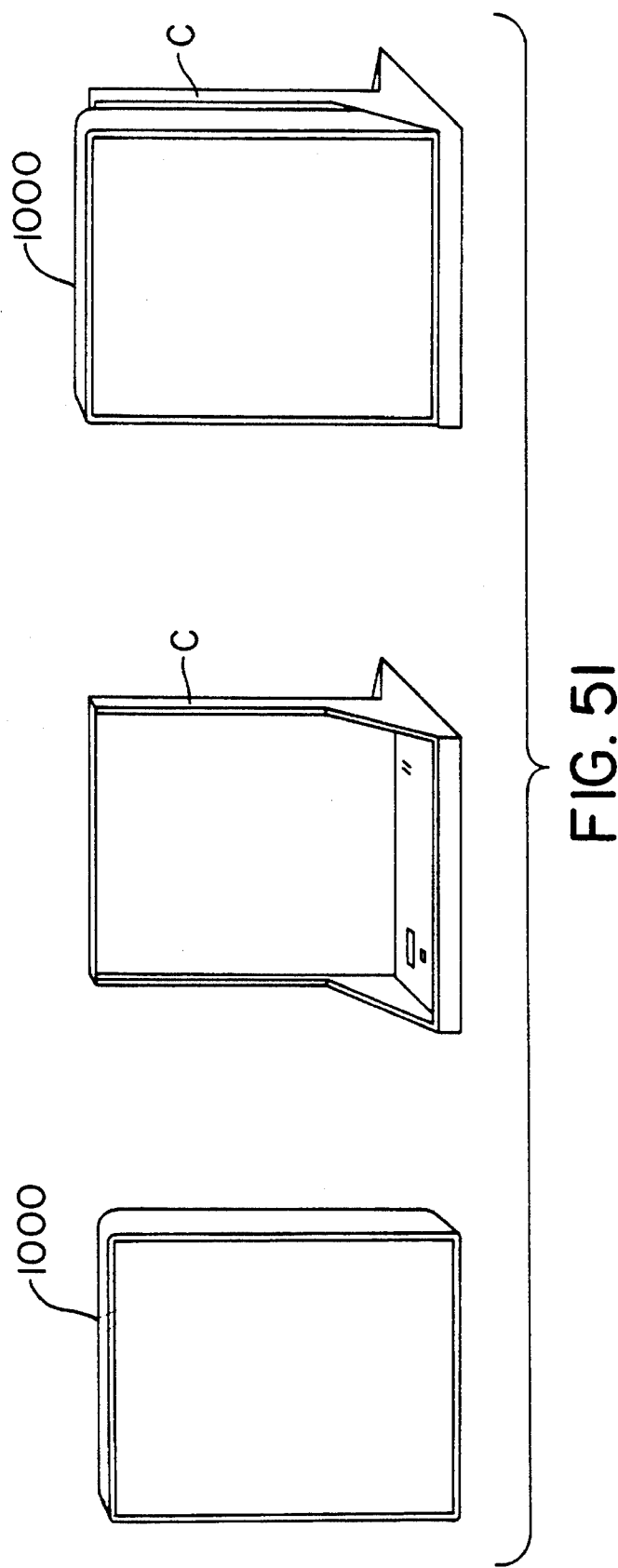
FIG. 51 illustrates an example of a cradle into which a fax tablet may be placed.

FIG. 51 illustrates an example of a cradle C into which a fax tablet 1000 may be placed. The cradle C may provide many or all of the electrical connections between the tablet 1000 and the outside environment. For example, the cradle C may include a phone connector for connecting the fax tablet 1000 to a phone line. The cradle C may include a computer connector for connecting the tablet 1000 with a computer or computer printer. The cradle C may also include a power supply for powering and/or charging the tablet 1000.

Figure 52:
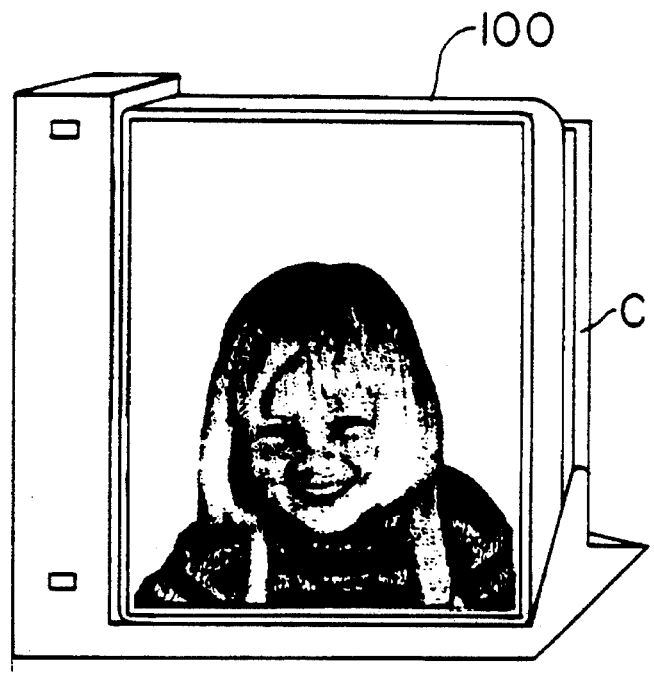
FIG. 52 illustrates an example of a cradle equipped with a video camera which enables the fax tablet docked in the cradle to send, receive and display video images.

FIG. 52 illustrates an example of a cradle C equipped with a video camera VC which enables the fax tablet 1000 docked in the cradle to send, receive and display video images.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer for presenting images to a photocopier through a photocopier window to enable reproduction of the images by the photocopier, the computer comprising:

display means for placement on the photocopier window for displaying images through the photocopier window, light gasket means substantially disposed around the display means for preventing ambient light from leaking in between the display means and the photocopier window, detecting means including a plurality of sensors for detecting the occurrence of a copying operation performed by the photocopier, and control means, responsive to the detecting means, for controlling the display means to display a first image prior to the detection of a copying operation and to display a second image following the detection of a copying operation by each of the plurality of sensors.

2. A computer as in claim 1, including:

switching means for diverting a data stream queued for printout by the computer to the display means, whereby execution of a print command from within an applications program run on the computer causes the data stream intended for printout to be sent to the display means.

3. A computer as in claim 2, wherein the switching means includes:

processing means for converting at least a portion of the diverted data stream into display means control code.

4. A computer for presenting images to a photocopier through a photocopier window to enable reproduction of the images by the photocopier, the computer comprising:

display means for placement on the photocopier window for displaying images through the photocopier window, light gasket means substantially disposed around the display means for preventing ambient light from leaking in between the display means and the photocopier window, switching means for diverting a data stream queued for printout by the computer to the display means, whereby execution of a print command from within an applications program run on the computer causes the data stream intended for printout to be sent to the display means.

5. A computer for presenting images to a photocopier through a photocopier window to enable reproduction of the images by the photocopier, the computer comprising:

display means for placement on the photocopier window for displaying images through the photocopier window, light gasket means substantially disposed around the display means for preventing ambient light from leaking in between the display means and the photocopier window, switching means for diverting a data stream queued for printout by the computer to the display means, whereby execution of a print command within an applications program, run on the computer causes the data stream intended for printout to be sent to the display means, and processing means for converting at least a portion of the diverted data stream into display means control code.

6. A computer for presenting images to a photocopier through a photocopier window to enable reproduction of the images by the photocopier, the computer comprising:

display means for placement on the photocopier window for displaying images through the photocopier window, detection means including a plurality of sensors for detecting the occurrence of a copying operation performed by the photocopier, and control means, responsive to the detecting means, for controlling the display means to display a first image prior to the detection of a copying operation and to display a second image following the detection of a copying operation by each of the plurality of sensors.

7. A computer as in claim 6, including:

switching means for diverting a data stream queued for printout by the computer to the display means, whereby execution of a print command from within an applications program run on the computer causes the data stream queued for printout to be sent to the display means.

8. A computer as in claim 7, wherein the switching means includes processing means for converting at least a portion of the data stream sent to the display means into display means control code.

9. A computer for presenting images to a photocopier through a photocopier window to enable reproduction of the images by the photocopier, the computer comprising:

display means for placement on the photocopier window for displaying images through the photocopier window, switching means for diverting a data stream queued for printout by the computer to the display means, whereby execution of a print command from within an applications program run on the computer causes the data stream queued for printout to be sent to the display means.

10. A computer for presenting images to a photocopier through a photocopier window to enable reproduction of the images by the photocopier, the computer comprising:

display means for placement on the photocopier window for displaying images through the photocopier window, switching means for diverting a data stream queued for printout by the computer to the display means, whereby execution of a print command from within an applications program run on the computer causes the data stream queued for printout to be sent to the display means, and processing means for converting at least a portion of the data stream into display means control code.

11. A computer for presenting images to a photocopier through a photocopier window to enable reproduction of the images by the photocopier, the computer comprising:

display means for placement on the photocopier window for displaying images through the photocopier window;

detecting means including a plurality of sensors for detecting the occurrence of error conditions arising during the copying operations, control means, responsive to the detecting means, for halting the display of images subsequent to the detection of an error condition, and switching means for diverting a data stream queued for printout by the computer to the display means, whereby execution of a print command from within an applications program run on the computer causes the data stream intended for printout to be sent to the display means.

12. A computer for presenting images to a photocopier through a photocopier window to enable reproduction of the images by the photocopier, the computer comprising:

display means for placement on the photocopier window for displaying images through the photocopier window;

detecting means including a plurality of sensors for detecting the occurrence of a copying operation performed by the photocopier and for detecting the occurrence of error conditions arising during the copying process;

control means, responsive to the detecting means, for controlling the display means to display a first image prior to the detection of a copying operation and to display a second image following the detection of a copying operation by each of the plurality of sensors, miscopy protection means for preventing the display of images subsequent to the detection of an error condition, and switching means for diverting a data stream queued for printout by the computer to the display means, whereby execution of a print command from within an applications program run on the computer causes the data stream intended for printout to be sent to the display means.

13. A computer as in claim 11, wherein the switching means includes:

processing means for converting at least a portion of the diverted data stream into display means control code.

14. A computer as in claim 12, wherein the switching means includes:

processing means for converting at least a portion of the diverted data stream into display means control code.

* * * * *